United States Patent
Iwamoto et al.

(10) Patent No.: US 6,540,275 B1
(45) Date of Patent: Apr. 1, 2003

(54) STRUCTURE OF THE FRONT OF A VEHICLE BODY

(75) Inventors: Tatsuhiko Iwamoto; Arihiro Furumoto; Yutaka Tsukiji; Masao Hara; Yushi Matsuda; Daisaburou Adachi; Masanori Ogawa; Takayuki Nakamae; Sakayu Terada; Kazuma Kondou, all of Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/596,649

(22) Filed: Jun. 19, 2000

(30) Foreign Application Priority Data

| Sep. 28, 1999 | (JP) | 11-274278 |
| Aug. 6, 1999 | (JP) | 11-223877 |
| Jun. 28, 1999 | (JP) | 11-181556 |
| Jun. 28, 1999 | (JP) | 11-181557 |

(51) Int. Cl.$^7$ .............................................. B60R 21/34
(52) U.S. Cl. ..................... 293/24; 293/15; 293/109; 293/120; 293/121; 293/146
(58) Field of Search ................. 293/15, 107, 109, 293/112, 120, 121, 131, 138, 143, 146, 24, 42, 122

(56) References Cited

U.S. PATENT DOCUMENTS

| 1,486,913 A | * | 3/1924 | Moore | 293/42 |
| 1,566,681 A | * | 12/1925 | Moore | 293/42 |
| 3,847,427 A | * | 11/1974 | Eshelman | 293/107 X |
| 3,917,332 A | * | 11/1975 | Puleo | 293/109 |
| 3,992,047 A | * | 11/1976 | Barenyi et al. | 293/24 X |
| 5,031,947 A | * | 7/1991 | Chen | 293/122 X |
| 5,066,057 A | * | 11/1991 | Furuta et al. | 293/121 |
| 5,106,137 A | * | 4/1992 | Curtis | 293/107 |
| 5,201,912 A | * | 4/1993 | Terada et al. | 293/120 |

FOREIGN PATENT DOCUMENTS

| DE | 196 11 934 C | 4/1997 |
| EP | 0 839 690 A | 5/1998 |
| EP | 1 036 715 A | 9/2000 |
| GB | 2 328654 A | 3/1999 |
| JP | 3-243439 A | * 10/1991 ................. 293/112 |

* cited by examiner

Primary Examiner—Stephen T. Gordon
Assistant Examiner—Patricia Engle
(74) Attorney, Agent, or Firm—Brooks & Kushman, P.C.

(57) ABSTRACT

The invention provides a structure of a front part of a vehicle body that is simple and free from the risk of maloperation. In the event of a collision between the vehicle and a pedestrian, a projecting part sweeps the pedestrian by parts of his or her legs lower than the knees in the event of a collision between the vehicle and the pedestrian, causing the pedestrian to be thrown over toward the vehicle, and after an energy-absorbing member has absorbed impact energy exerted on the legs, the pedestrian is caused to drop onto the top of a hood and protected from secondary damage. In one specific example, a structure of a front part of a vehicle body in which a bumper (9) is provided at a lower front position of a hood (1) of the vehicle comprises a lateral supporting member (7) provided in the front part of the vehicle body and extending in the direction of vehicle width, an energy-absorbing member (8) provided ahead of the lateral supporting member (7), and a projecting part (12) provided at a lower part of the bumper 9 in such a manner that a forward end of the projecting part (12) juts out more frontward than the lateral supporting member (7).

16 Claims, 40 Drawing Sheets

STRUCTURE OF THE FRONT OF A VEHICLE BODY

BACKGROUND OF THE INVENTION AND RELATED ART STATEMENT

1. Field of the Invention

This invention relates to a structure of a front part of a vehicle body that is designed to provide enhanced safety to a pedestrian in the event of a collision between the vehicle and the pedestrian.

2. Description of the Related Art

An example of a conventionally known structure of this kind is found in Japanese Unexamined Patent Publication No. 11-1149, in which a bumper provided at the front of a vehicle body includes a bumper face, a foam material which serves as a shock-absorbing material, and a bumper reinforcement. To provide a sufficient shock-absorbing effect in the event of a collision between the vehicle and a pedestrian with this structure, it has been necessary to construct the bumper such that the bumper face would easily deform on impact. When the bumper is so constructed, however, there has been a problem that it could be deformed even by a minor contact.

To provide a solution to the aforementioned problem, Japanese Unexamined Patent Publication No. 6-72248 proposes an air bag system for a vehicle.

This system includes an air bag accommodated in a front bumper and a sensor (ultrasonic sensor) for detecting obstacles like a pedestrian ahead of the vehicle, whereby the system predicts the risk of collision between the vehicle and the pedestrian based on sensing signals output from the ultrasonic sensor and a driving condition sensor and causes the air bag in the front bumper to inflate in the running direction of the vehicle when a collision with the pedestrian has been predicted to prevent direct contact between the vehicle and the pedestrian and thereby achieve the safety of the pedestrian.

Although the aforementioned conventional system is advantageous in that it can provide increased safety of the pedestrian, it involves a complex construction due to the need for such obstacle sensing means as the ultrasonic sensor as well as the air bag. In addition, the system is associated with the possibility of such malfunction that the air bag could unexpectedly inflate even when no collision has actually taken place.

SUMMARY OF THE INVENTION

In view of the aforementioned problems, it is an object of the invention to provide a simple and trouble-free structure of a front part of a vehicle body comprising a bumper which is associated with a lateral supporting member extending in the direction of vehicle width and an energy-absorbing member located ahead of the lateral supporting member, and a projecting part which is provided at a lower part of the bumper in such a manner that a forward end of the projecting part juts out more frontward than the lateral supporting member, whereby the projecting part sweeps legs of a pedestrian in the event of a collision between the vehicle and the pedestrian, causing the pedestrian to be thrown over toward the vehicle, and after the energy-absorbing member has absorbed impact energy exerted on the legs, the pedestrian is caused to drop onto the top of a hood and protected from secondary damage.

To accomplish the above object, the invention provides a structure of a front part of a vehicle body in which a bumper is provided at a lower front position of a hood at the front of the vehicle, the structure comprising a lateral supporting member provided in the front part of the vehicle body and extending in the direction of vehicle width, an energy-absorbing member provided ahead of the lateral supporting member, and a projecting part provided at a lower part of the bumper in such a manner that a forward end of the projecting part juts out (protrudes) more frontward than the lateral supporting member.

Since the energy-absorbing member is provided ahead of the lateral supporting member and the projecting part is provided at the lower part of the bumper with the forward end of the projecting part jutting out more frontward than the lateral supporting member in the aforementioned structure, the projecting part first sweeps the pedestrian by parts of his or her legs lower than the knees in the event of a collision between the vehicle and the pedestrian, and after the energy-absorbing member has absorbed impact energy exerted on the legs of the pedestrian who is thrown over toward the vehicle, the pedestrian is caused to drop onto the top of the hood. Consequently, there is produced such an advantageous effect that the pedestrian can be protected from secondary damage.

These and other objects, features and advantages of the present invention will become more apparent upon reading the following detailed description and accompanying drawings.

DETAILED DESCRIPTION OF THE PREFERRED EMBODIMENTS OF THE INVENTION

Figure 1:
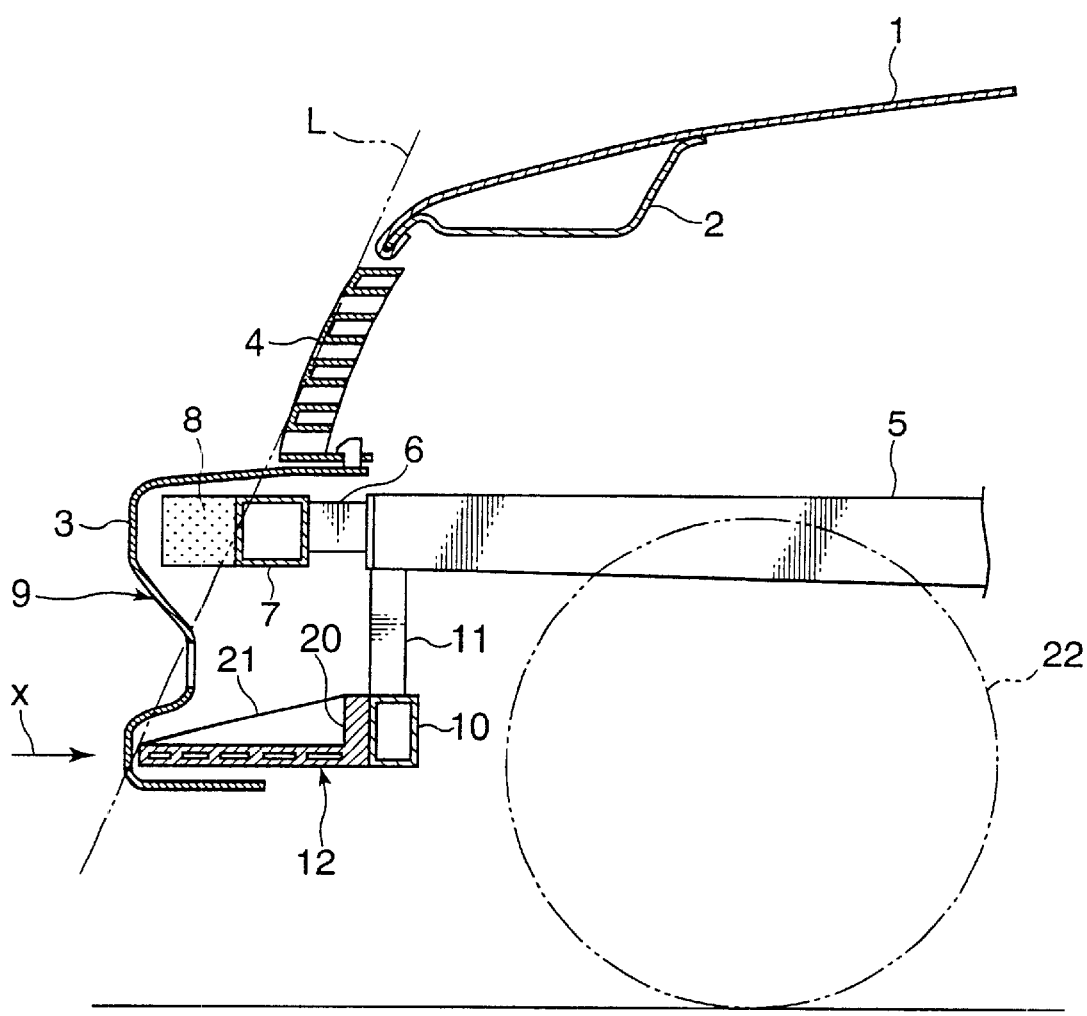
FIG. 1 is a side view showing the structure of a front part of a vehicle body according to a first embodiment of the invention.

The structure of a front part of a vehicle body according to a first embodiment of the invention is now described in detail with reference to the drawings. FIG. 1 shows the structure of the front part of the vehicle body which includes a hood 1 covering the top of an engine compartment.

The hood 1 is furnished with a hood reinforcement 2 as illustrated, and a radiator grille 4 is provided between a front lower part of the hood 1 and an upper part of a bumper face 3 which is made of resin.

Figure 2:
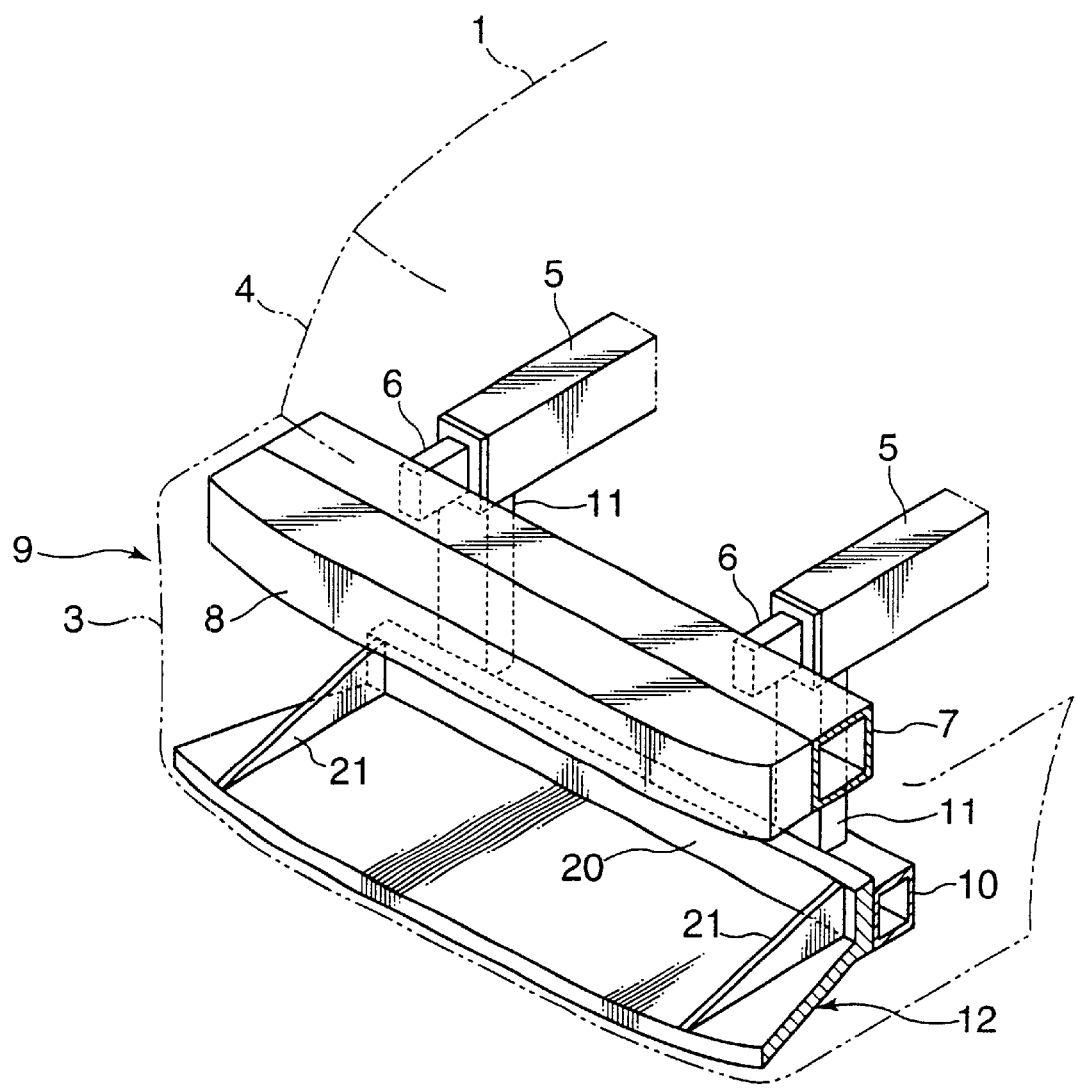
FIG. 2 is a perspective view generally showing the vehicle body structure of FIG. 1.

The vehicle structure includes left and right front side frame members 5 constituting part of a body frame which extends in a longitudinal direction of the vehicle, and a bumper reinforcement 7 is attached to forward ends of the front side frame members 5 via bumper brackets 6 as shown in FIGS. 1 and 2.

The bumper reinforcement 7 is a lateral supporting member extending in a lateral direction of the front part of the vehicle body. An energy absorber 8 is attached to the front of the bumper reinforcement 7 at the same height.

The energy absorber 8 is an element extending almost all the way across the width of the vehicle body along the bumper face 3 on its inner (or rear) surface. The installation height of the energy absorber 8 is so determined that it corresponds to the height of the knees of a pedestrian.

The bumper face 3, the bumper brackets 6, the bumper reinforcement 7 and the energy absorber 8 together constitute a front bumper 9 which is situated at a lower front position of the hood 1.

Further, there is provided a front cross member 10 (so-called No. 1 cross member) extending widthwise which serves as a structural member of the vehicle body at a bottom front portion of the front side frame members 5, and a bracket 11 such as a radiator shroud member, for instance, is connected to the front cross member 10.

A front surface of the front cross member 10 supports a rear end of a projecting part 12 as illustrated. The projecting part 12 protrudes generally horizontally frontward from the front cross member 10 at a lower part of the front bumper 9. A forward end of the projecting part 12 juts out frontward beyond the bumper reinforcement 7 and is located almost at the same longitudinal position as or at a more frontward position than the energy absorber 8.

In the present embodiment depicted in FIG. 1, the forward end of the projecting part 12 protrudes more frontward than the energy absorber 8. The height of the projecting part 12 is determined such that it would come into contact with the shanks (the part between the knee and ankle) of the pedestrian in the event of a collision. The height of the projecting part 12 is set to be less than 400 mm from a ground, more preferably, in a range of 90 mm to 300 mm.

Moreover, the longitudinal position of the energy absorber 8 is so determined that it would be located ahead of a line L connecting a forward end of the hood 1 and that of the projecting part 12.

Figure 3:
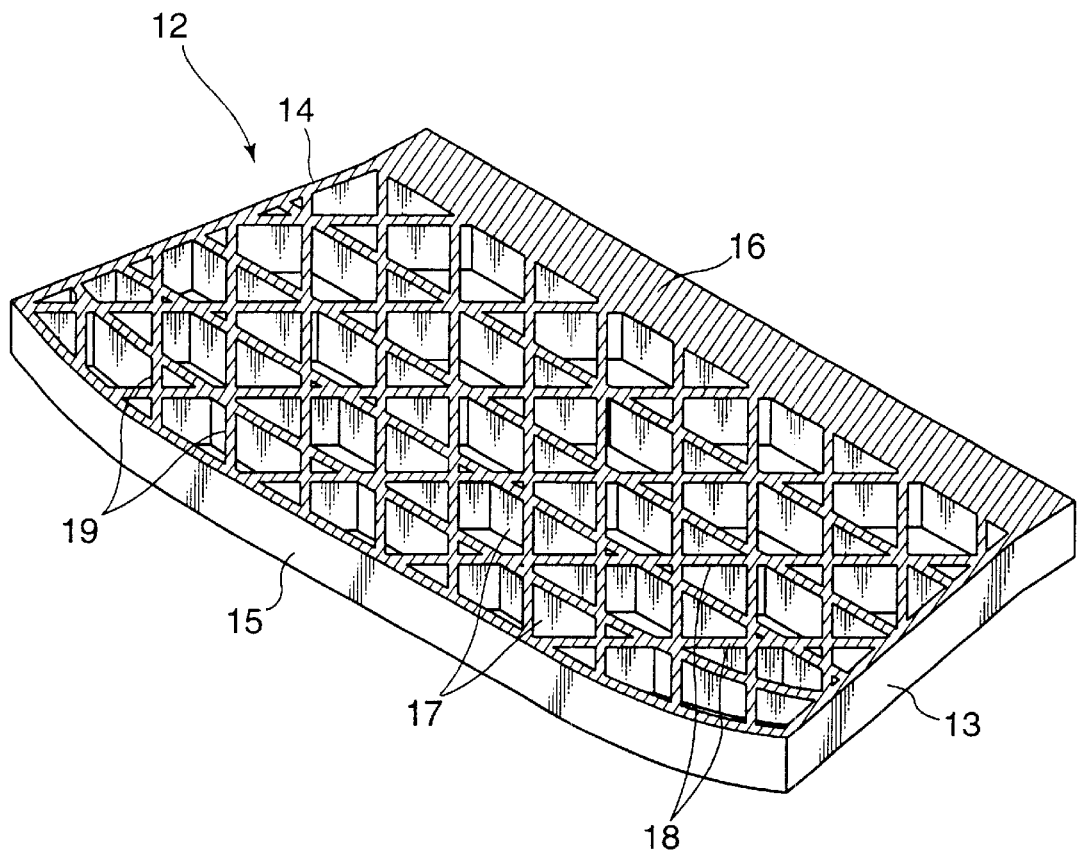
FIG. 3 is a perspective view showing a specific construction of a projecting part of the structure of FIG. 1.

Here, the aforementioned projecting part 12 is arranged such that it spans all along a lower part of the bumper face 3 in the direction of the vehicle width. The projecting part 12 is made of synthetic resin like polypropylene (PP) or polyethylene (PE), for example, into a shape shown in FIG. 3.

Specifically, the projecting part 12 is formed of left, right, front and rear frame elements 13–16 which together form a rectangular frame, ribs 17 spanning in the direction of the vehicle width between the left and right frame elements 13, 14 and arranged at specific intervals in the vehicle's longitudinal direction, ribs 18, 19 spanning in oblique directions inside the rectangular frame (frame elements 13–16), a support 20 protruding upward from an upper part of the rear frame element 16, and reinforcement plates 21 which connect the support 20 to the front frame element 15. These elements of the projecting part 12 are molded into a single resin structure (honeycomb structure) which has a generally fanlike shape as a whole in plan view.

This resin structure is constructed such that it would provide desired load characteristics by properly selecting the thickness of the frame elements 13–16 and the spacings and directions of the ribs 17–19. Alternatively, the aforementioned reinforcement plates 21 may be eliminated from this structure.

The projecting part 12 thus constructed is mounted such that it would receive an input load exerted from the front of the vehicle in the direction of an arrow x shown in FIG. 1 with the support 20 at the rear of the projecting part 12 attached to the front surface of the front cross member 10 as shown in FIGS. 1 and 2.

Figure 4:
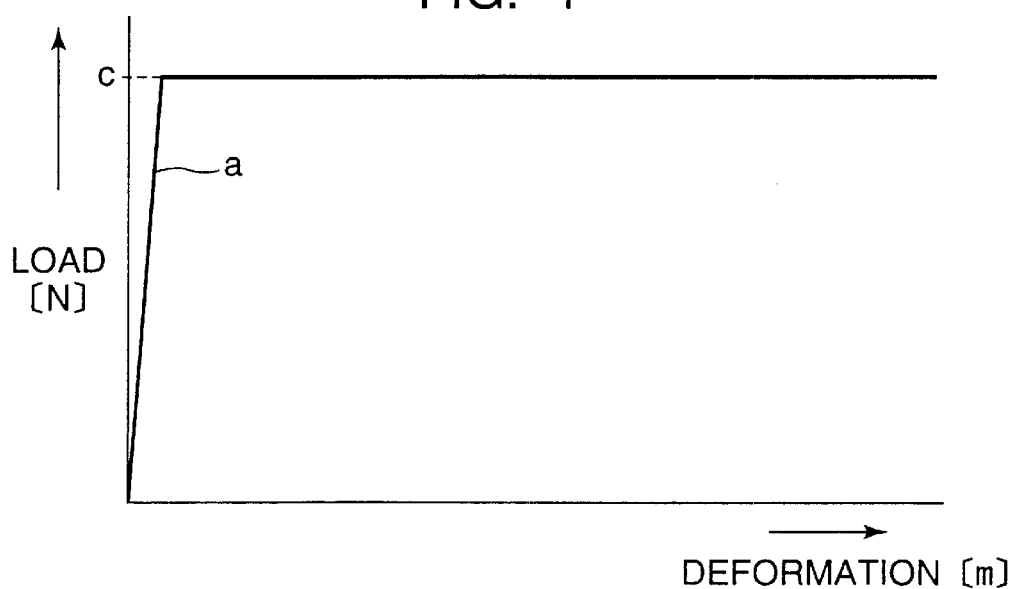
FIG. 4 is a graphical representation of the load characteristics of the projecting part.
Figure 5:
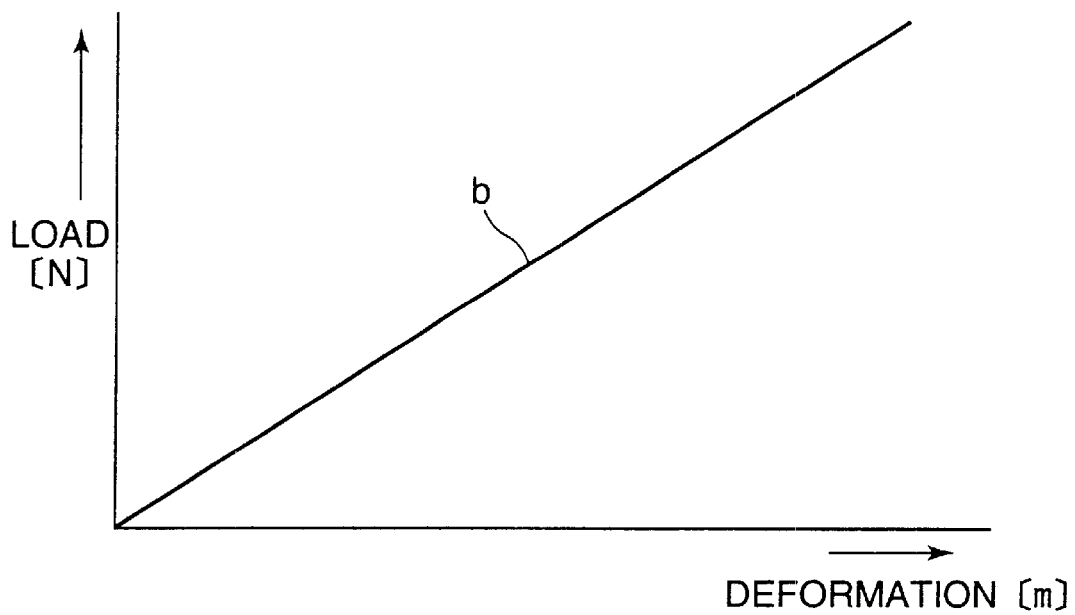
FIG. 5 is a graphical representation of the load characteristics of an energy absorber.

The load characteristics of the projecting part 12 and the energy absorber 8 are set as shown in FIGS. 4 and 5, respectively.

FIG. 4 is a graphical representation of the load characteristics "a" of the projecting part 12, in which the horizontal axis represents the amount of deformation (or collapse) while the vertical axis represents the load (dynamic collapsing load). The load characteristics "a" of the projecting part 12 are determined such that the input load (expressed in newtons) first increases rapidly from the zero point to a specific load level c in proportion to the amount of deformation and, then, after the projecting part 12 has begun to plastically deform when the input load has reached the load level c, the amount of deformation increases under approximately a constant load.

Also, FIG. 5 is a graphical representation of the load characteristics "b" of the energy absorber 8, in which the horizontal axis represents the amount of deformation (or collapse) while the vertical axis represents the load (dynamic collapsing load). The load characteristics "b" of the energy absorber 8 are determined such that the load (expressed in newtons) increases in proportion to the amount of deformation. The rigidity of the projecting part 12 is set to a value larger than that of the energy absorber 8, so that the amount of energy absorbed by the projecting part 12 is larger than the amount of energy absorbed by the energy absorber 8 when they deform by the same amount.

This embodiment employs energy absorber foam material like styrofoam for the energy absorber 8. The energy absorber 8 made of the energy absorber foam material may have either a solid or hollow internal structure, or a structure having a plurality of ribs. Whichever structure is used, the energy absorber 8 is so constructed that it would provide the load characteristics "b" shown in FIG. 5. The numeral 22 in FIG. 1 designates a front wheel.

The aforementioned bumper face 3 is attached by its multiple portions to parts of the vehicle body, including front members of the vehicle like the radiator grille 4, front fenders and the front cross member 10, for instance.

Functional features of the aforementioned structure of the front of the vehicle of the present embodiment are now described.

In the event of a collision between the vehicle and a pedestrian, an impact load is exerted on the projecting part 12 via the resin bumper face 3 from the front of the vehicle in the direction shown by the arrow x of FIG. 1. This load is usually smaller than the load level c shown in FIG. 4. The frontal impact load is received by the projecting part 12 whose rear part is sustained by the front cross member 10.

Thus, in the event of a collision between the vehicle and a pedestrian, the pedestrian is swept by parts of his or her legs lower than the knees by the projecting part 12 and thrown over toward the vehicle. After impact energy has been absorbed by a portion of the laterally extending bumper face 3 where the energy absorber 8 is located at the moment of contact between the parts of the legs and the upper part of the bumper face 3, the pedestrian drops onto the top of the hood 1 so that the pedestrian is protected.

According to the present embodiment shown in FIGS. 1–5, the energy absorber 8 is provided at the front of the lateral supporting member formed of the bumper reinforcement 7 and the projecting part 12 is provided in such a way that its forward end protrudes more frontward than the lateral supporting member at the lower part of the front bumper 9 as seen above. As a consequence, the pedestrian is swept by the parts of his or her legs lower than the knees by the projecting part 12 upon collision, the impact energy exerted on the parts of the legs of the pedestrian thrown over toward the vehicle is absorbed by the energy absorber 8 and the pedestrian drops onto the top of the hood 1, whereby the pedestrian can be protected from secondary damage.

It is also possible to provide increased safety of the legs of the pedestrian by selecting appropriate design of the projecting part 12, that is, by setting proper values of the load characteristics "a". Furthermore, the foregoing embodiment has such an advantageous effect that the structure of the front of the vehicle can be simplified and the occurrence of malfunction can be prevented as compared to the earlier-mentioned conventional structure in which the air bag accommodated in the front bumper is caused to inflate based on sensor outputs.

As the aforementioned lateral supporting member is formed of the bumper reinforcement 7, an additional advantage is obtained in that the aforementioned advantageous effect is achieved by effectively using the laterally extending bumper reinforcement 7 which already exists.

Also, since the forward end of the projecting part 12 is located at a more frontward position than a forward end of the energy absorber 8, there is such an advantageous effect that the pedestrian is swept by the parts of his or her legs lower than the knees by the projecting part 12 in a reliable fashion in the event of a collision between the vehicle and the pedestrian.

Furthermore, when the energy absorber 8 is located ahead of the line L connecting the forward end of the hood 1 and that of the projecting part 12 as stated earlier (FIG. 1), it is possible to absorb the impact energy exerted on the parts of the legs of the pedestrian thrown over toward the vehicle even more effectively. Thus, the structure of the front of the vehicle of this embodiment has such an advantageous effect that it can protect the legs of the pedestrian from the impact.

Also, when the rigidity of the projecting part 12 is set to a value larger than that of the energy absorber 8 as stated above, there is such an advantageous effect that the projecting part 12 can sweep the legs of the pedestrian by the lower parts than the knees in a reliable fashion.

Also, when the projecting part 12 is made of synthetic resin as stated above, there are produced such advantageous effects that the moldability of the projecting part 12 and ease of its assembly to the vehicle body as well as its flexibility to match the vehicle design are improved.

Furthermore, when the energy absorber 8 is formed as a resin structure made of energy absorber foam material like styrofoam as in the above-described embodiment, or of a different type of energy-absorbing member or damping device, there are produced such advantageous effects that it can positively absorb the impact energy before the pedestrian comes into contact with the hood 1, reduce the speed of the pedestrian as he or she is thrown over, and allow the pedestrian to drop onto the top of the hood 1 in a more reliable fashion.

Furthermore, since the projecting part 12 is attached to the front cross member 10 which is a structural member of the vehicle body at its front, the projecting part 12 can effectively receive the frontal impact load (in the direction of the arrow x shown in FIG. 1) in the event of a collision between the vehicle and a pedestrian and sweep the pedestrian by his or her legs in a reliable fashion. It is also possible to give the projecting part 12 sufficient strength to bear the impact load.

If the projecting part 12 is designed to have such strength that it would not cause damage to the legs of the pedestrian in the event of a collision, a resulting advantageous effect is that the safety of the legs is achieved more positively with the projecting part 12 when it sweeps the pedestrian.

Moreover, when the projecting part 12 is formed into a honeycomb resin structure as described in the foregoing embodiment, the same leg-sweeping and energy-absorbing effects are obtained no matter which part of front bumper 9 along its length (along the width of the vehicle) hits the pedestrian. Also, when the projecting part 12 is formed of resin material, it would flex when subjected to an upward input load from underneath. This is advantageous with respect to approach angle. In the load characteristics "a" of the projecting part 12 of this embodiment, the load level c of FIG. 4 is set to a value which will not cause damage to the legs of the pedestrian, such as 7000 N (newtons).

Figure 6:
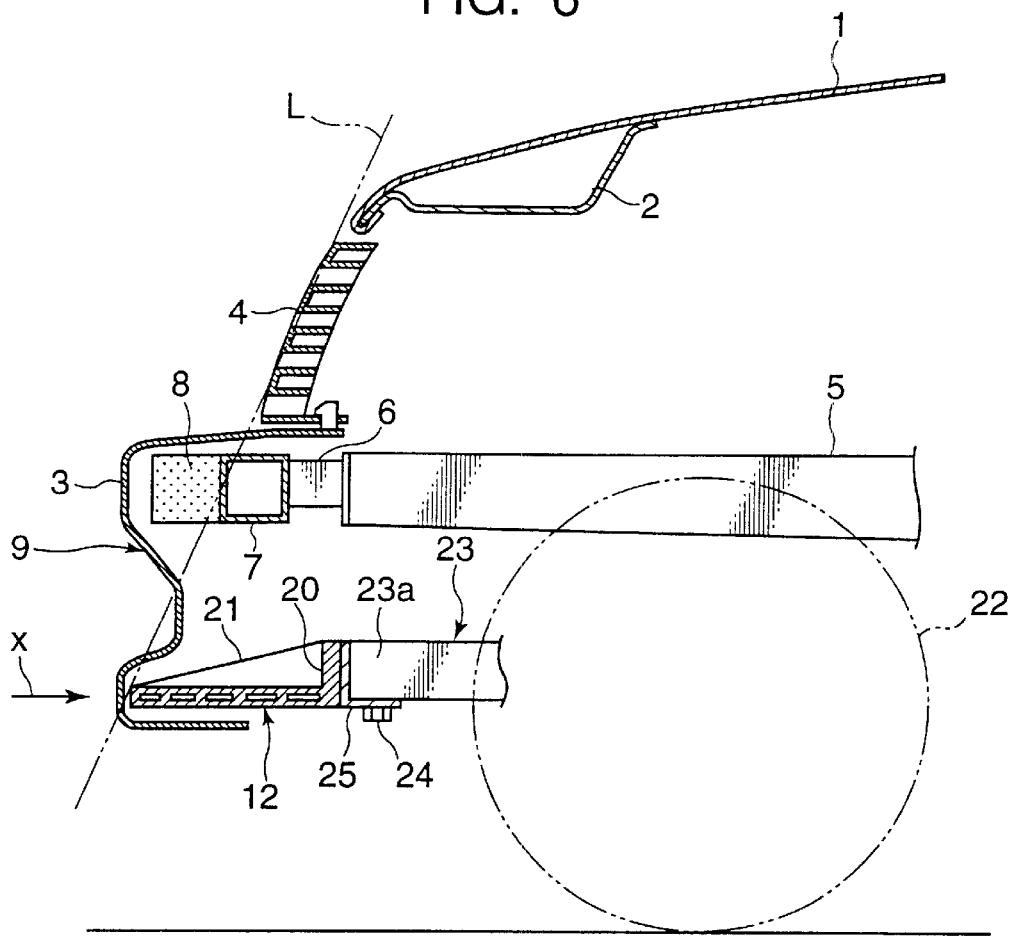
FIG. 6 is a side view showing the structure of a front part of a vehicle body according to a second embodiment of the invention.
Figure 7:
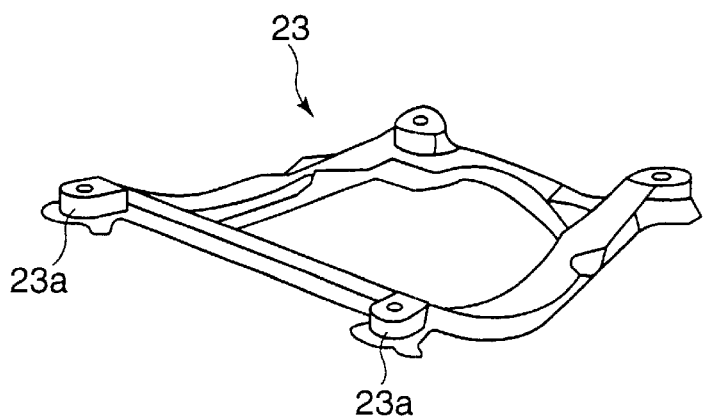
FIG. 7 is a perspective view of a rectangular frame used in the structure of FIG. 6.

FIGS. 6 and 7 show the structure of a front part of a vehicle body according to a second embodiment of the invention. Although the projecting part 12 is supported by its rear part by the front cross member 10 in the foregoing embodiment, there is provided a rectangular frame (reinforcing member) 23 which is secured at its both sides below the front side frame members 5 and, with a mounting plate 25 attached to front corners 23a of the rectangular frame 23 by set bolts 24, the rear part of the projecting part 12 is supported by the mounting plate 25 in the embodiment of FIGS. 6 and 7.

Since the structure of this embodiment is otherwise the same as the earlier-described first embodiment, elements identical to those included in the first embodiment are designated by the same reference numerals in FIGS. 6 and 7 and their detailed description is not given here. The projecting part 12 may be made of such synthetic resin as polypropylene (PP), polyethylene (PE) or nylon resin.

The structure of the second embodiment shown in FIGS. 6 and 7 provides substantially the same functional features and advantages as the first embodiment.

Figure 8:
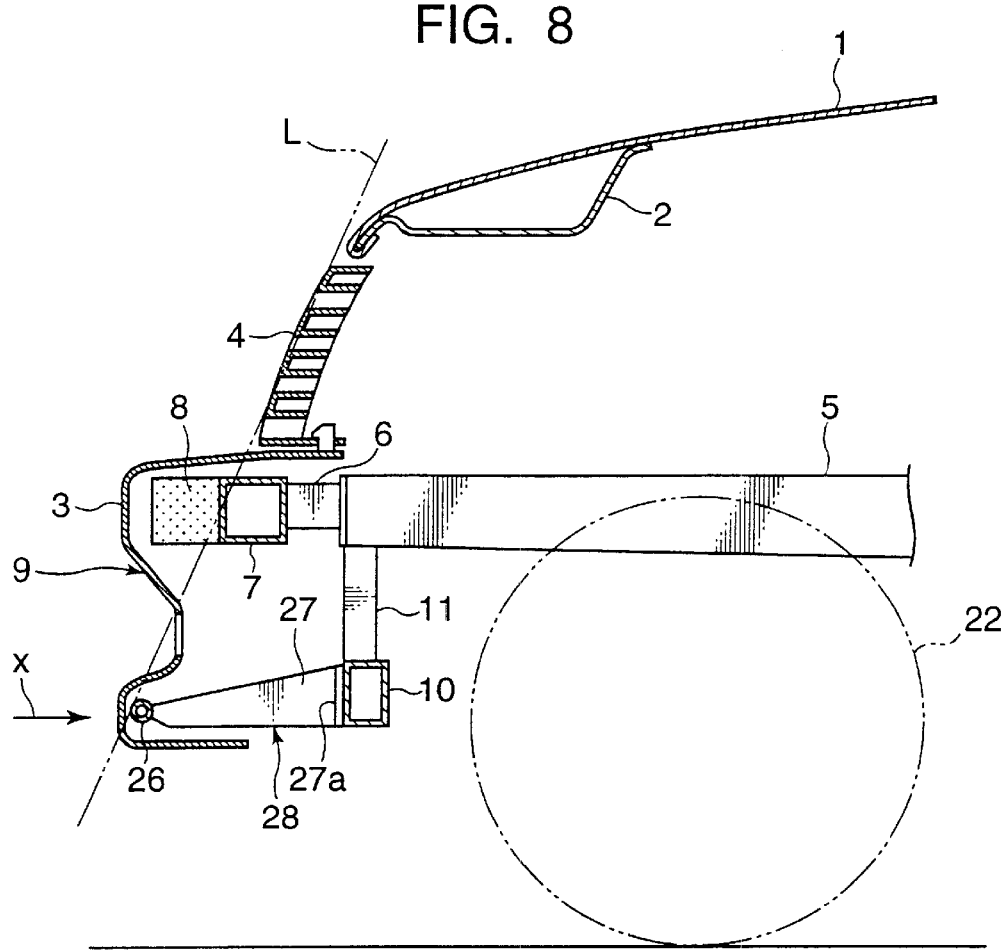
FIG. 8 is a side view showing the structure of a front part of a vehicle body according to a third embodiment of the invention.
Figure 9:
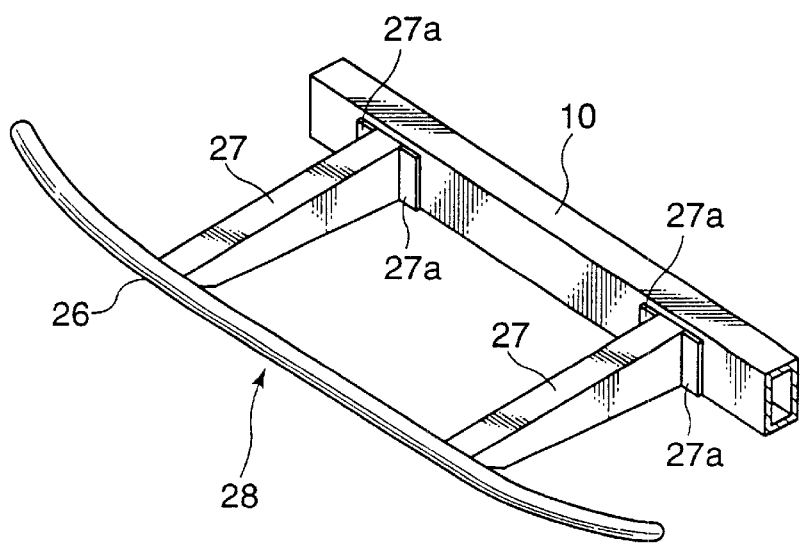
FIG. 9 is a perspective view showing a principal portion of the structure of FIG. 8.

FIGS. 8 and 9 show the structure of a front part of a vehicle body according to a third embodiment of the invention. Although the projecting part 12 is a resin member in the foregoing embodiments, a projecting part 28 of this embodiment is formed of a backing bar 26 which is a round-metal bar like an iron pipe extending along a lower part of the bumper face 3 and a pair of supporting arms 27 connecting the backing bar 26 to the front cross member 10 which is a structural member of the vehicle body.

Left and right ends of the backing bar 26 are curved or bent so that they are located slight rearward and the backing bar 26 matches the shape of the rear surface of the bumper face 3. Each of the supporting arms 27 is made by forming a piece of sheet metal into a gatelike cross-sectional shape having a top plate portion and left and right side plate portions. The thickness and cross-sectional area of the sheet metal are set to proper values to obtain the load characteristics "a" as depicted in FIG. 4.

The rear end of each supporting arm 27 is bent to form a pair of connecting flanges 27a. Each supporting arm 27 is fixed to the front surface of the front cross member 10 as these connecting flanges 27a are connected thereto. The structure of this embodiment is otherwise the same as the foregoing embodiments. In one alternative form of this embodiment, the supporting arms 27 may be structural resin members and the backing bar 26 may be made of a round resin bar.

According to the present embodiment shown in FIGS. 8 and 9, the projecting part 28 is formed of the backing bar 26 extending along the lower part of the bumper face 3 and the supporting arms 27 which are support members holding the backing bar 26 at the front of the vehicle body. This construction is advantageous in that the projecting part 28 having the desired strength and modulus of elasticity can be easily produced.

Since the structure of this embodiment otherwise provides substantially the same functional features and advantages as the foregoing embodiments, their detailed description is not given here.

Figure 10:
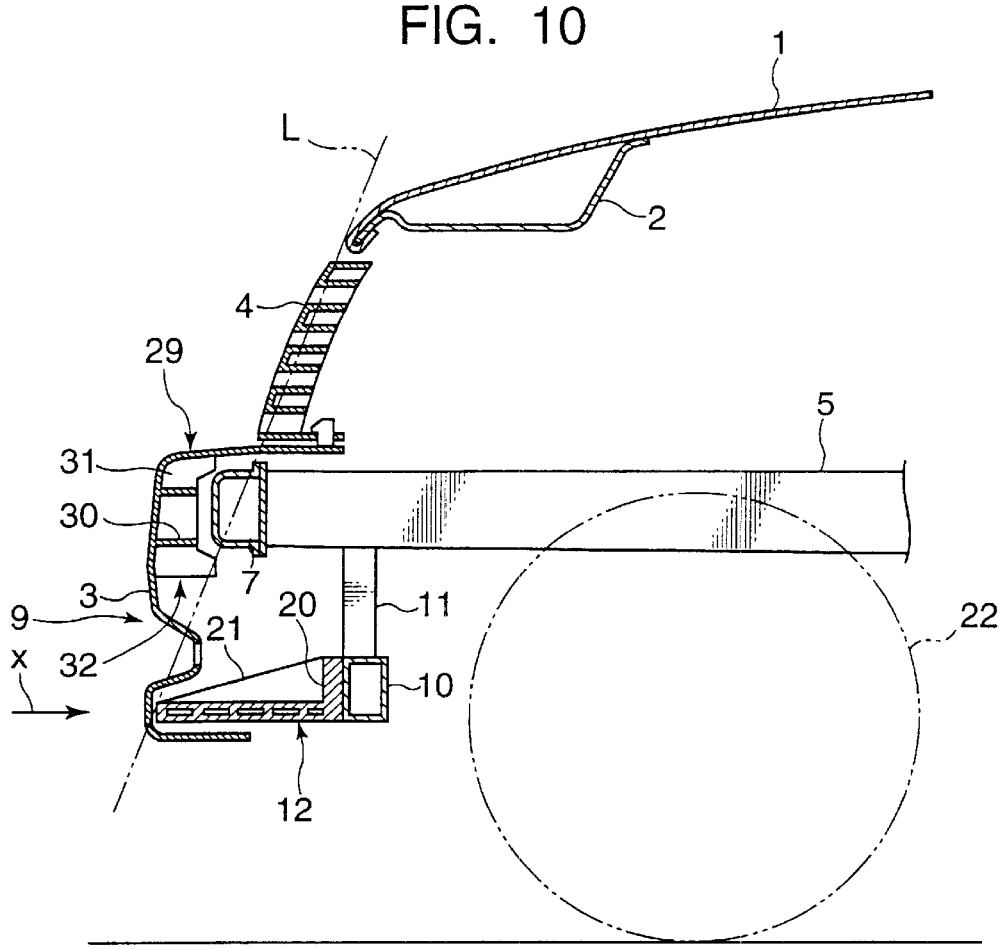
FIG. 10 is a side view showing the structure of a front part of a vehicle body according to a fourth embodiment of the invention.
Figure 11:
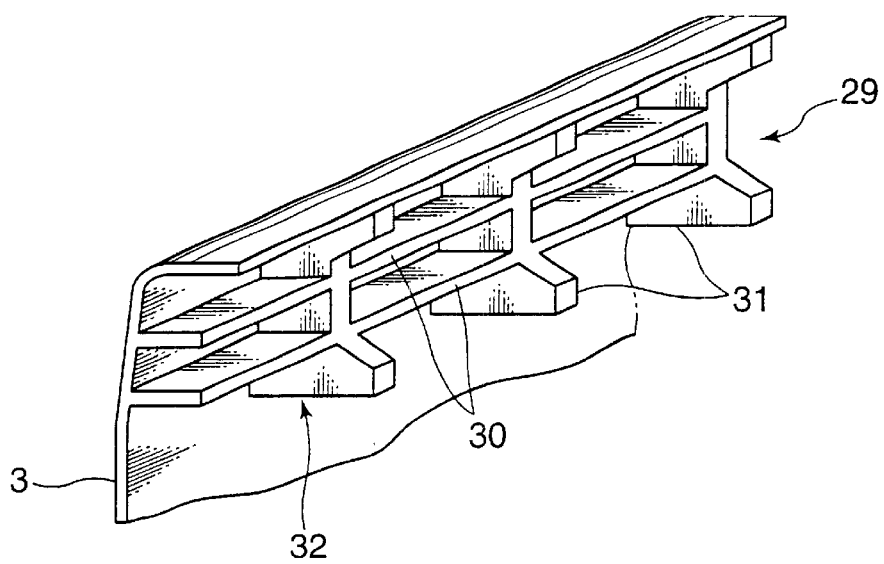
FIG. 11 is a perspective view showing a principal portion of the structure of FIG. 10.

FIGS. 10 and 11 show the structure of a front part of a vehicle body according to a fourth embodiment of the invention. Although the energy absorber 8 is made of energy absorber foam material like styrofoam in the foregoing embodiments, an energy absorber 29 is a structural resin member which is one-piece molded with the bumper face 3 in the embodiment of FIGS. 10 and 11.

Specifically, a plurality of horizontal ribs 30 extending widthwise at specific vertical intervals and a plurality of vertical ribs 31 arranged at specific intervals widthwise are formed on the rear surface of the bumper face 3. These ribs 30, 31 which are located at the height of the knees of the pedestrian together form a structural resin member 32 which constitutes the energy absorber 29.

This energy absorber 29 is designed such that its mounting height is approximately equal to that of the bumper reinforcement 7. In addition, the energy absorber 29 is so positioned that it is located ahead of the line L connecting the forward end of the hood 1 and that of the projecting part 12.

In the structure of this embodiment, the thickness, spacings and directions of the ribs 30, 31 are properly determined so that the energy absorber 29 provides the load characteristics "b" as depicted in FIG. 5. The structure of this embodiment is otherwise the same as the foregoing embodiments.

According to the above-described structure, the energy absorber 29 can be formed as an integral part of the bumper face 3 and, therefore, this embodiment is advantageous in that it enables reductions in man-hours required for assembly and the number of components.

Since the structure of this embodiment provides substantially the same functional features and advantages as the foregoing embodiments with respect to energy-absorbing effect, for example, their detailed description is not given here.

Figure 12:
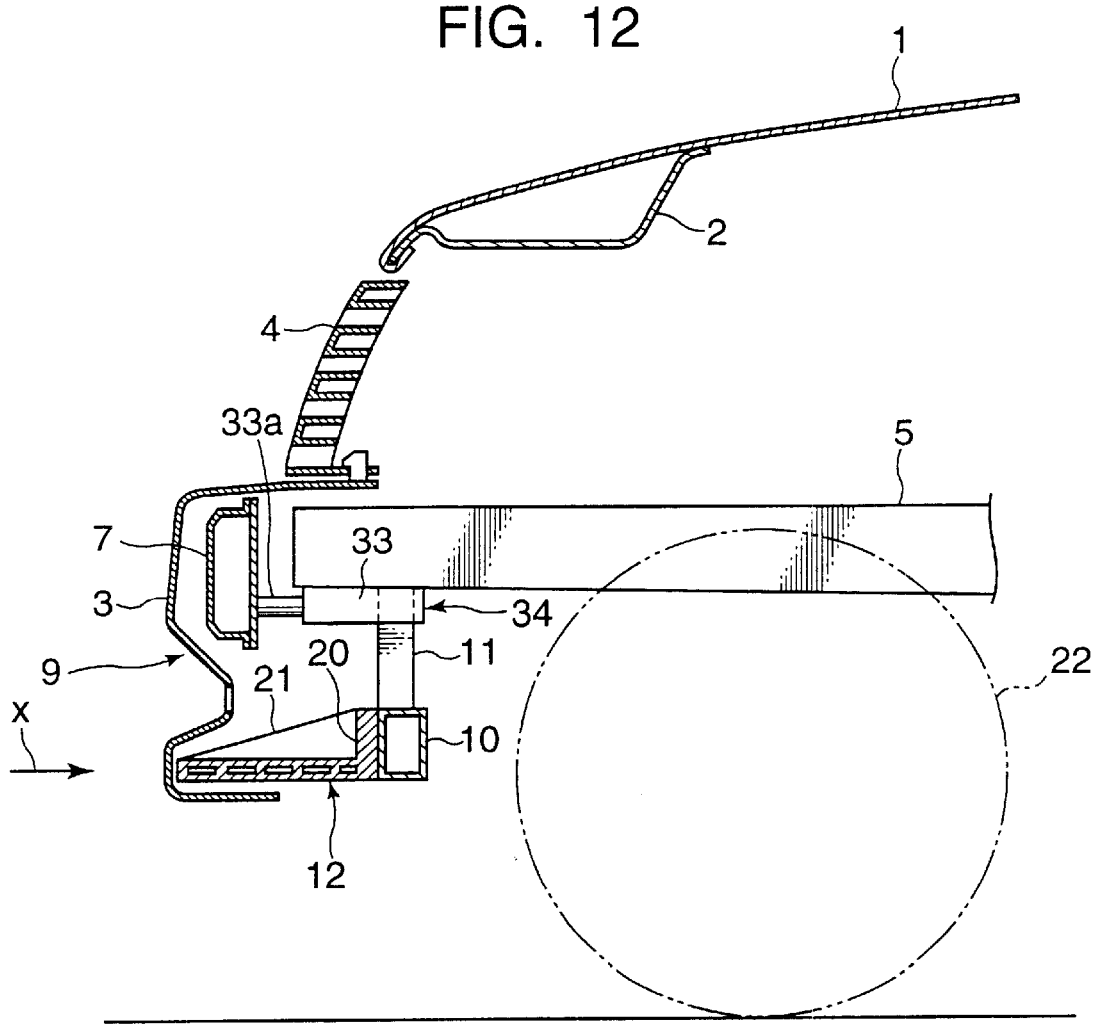
FIG. 12 is a side view showing the structure of a front part of a vehicle body according to a fifth embodiment of the invention.
Figure 13:
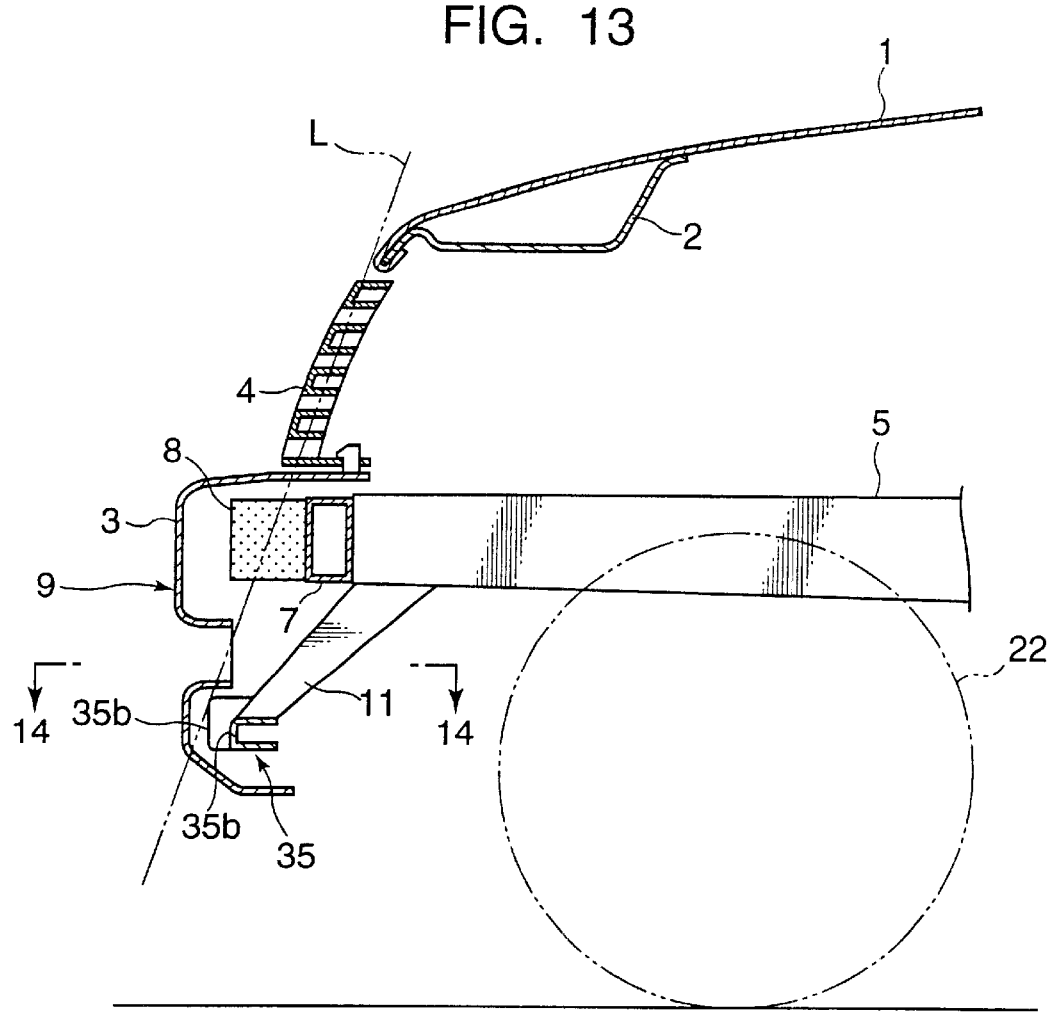
FIG. 13 is a side view showing the structure of a front part of a vehicle body according to a sixth embodiment of the invention.
Figure 14:
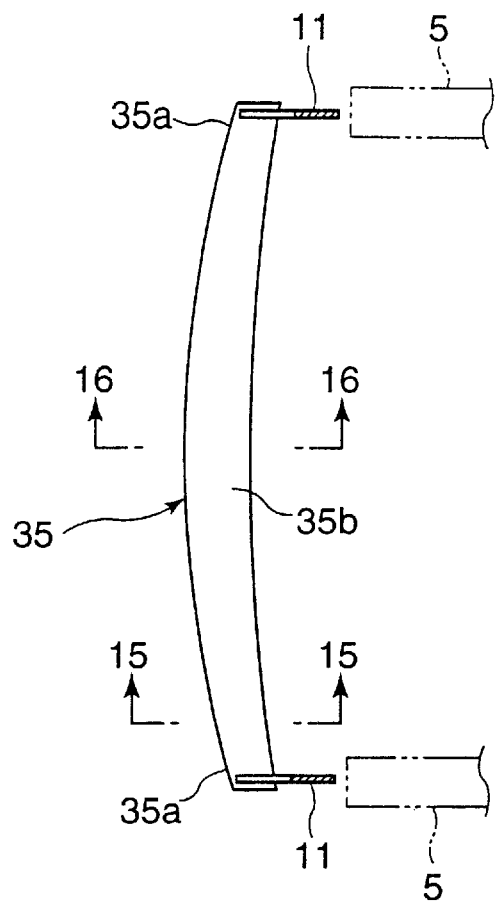
FIG. 14 is a sectional view taken along line 14—14 of FIG. 13.

FIG. 12 shows the structure of a front part of a vehicle body according to a fifth embodiment of the invention. This embodiment is characterized in that an energy absorber 34 is formed of oil dampers 33.

Specifically, the oil dampers 33 are attached to the bottom or other peripheral portions of the front side frame members 5 and the bumper reinforcement 7 is connected to forward ends of piston rods 33a of the oil dampers 33 such that the bumper reinforcement 7 can retracts rearward. These oil dampers 33 provides the load characteristics "b" as depicted in FIG. 5.

In the structure shown in FIG. 12, a frontal impact load (represented by arrow x) will act on the projecting part 12 via the resin bumper face 3 in the event of a collision between the vehicle and a pedestrian. This frontal input load is usually smaller than the load level c shown in FIG. 4 and is received by the projecting part 12 whose rear part is sustained by the front cross member 10.

Thus, in the event of a collision between the vehicle and a pedestrian, the pedestrian is swept by parts of his or her legs lower than the knees by the projecting part 12 and impact energy exerted on the legs of the pedestrian thrown over toward the vehicle is absorbed as the bumper reinforcement 7 supported by the oil dampers 33 retracts rearward.

Since the structure of this embodiment otherwise provides substantially the same functional features and advantages as the foregoing embodiments, their detailed description is not given here.

FIGS. 13–16 show the structure of a front part of a vehicle body according to a sixth embodiment of the invention. In this embodiment, a projecting part 35 is fixed along a lower part of the rear surface of the bumper face 3. This projecting part 35 is installed by its both lateral ends 35a by brackets 11 which serve as downward-extending support members in such a way that the projecting part 35 is installed ahead of and below the front side frame members 5.

The projecting part 35 has a generally channel-like cross section whose open side is directed rearward all along its length. The projecting part 35 is constructed such that its mechanical strength in the vehicle's longitudinal direction gradually increases from the lateral ends 35a of the projecting part 35 toward its middle part 35b.

Figure 15:
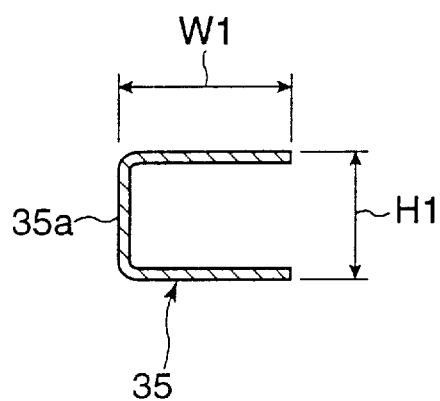
FIG. 15 is a sectional view taken along line 15—15 of FIG. 14.
Figure 16:
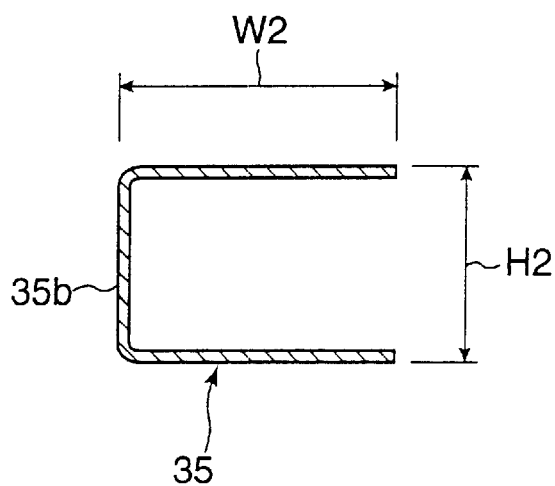
FIG. 16 is a sectional view taken along line 16—16 of FIG. 14.
Figure 17:
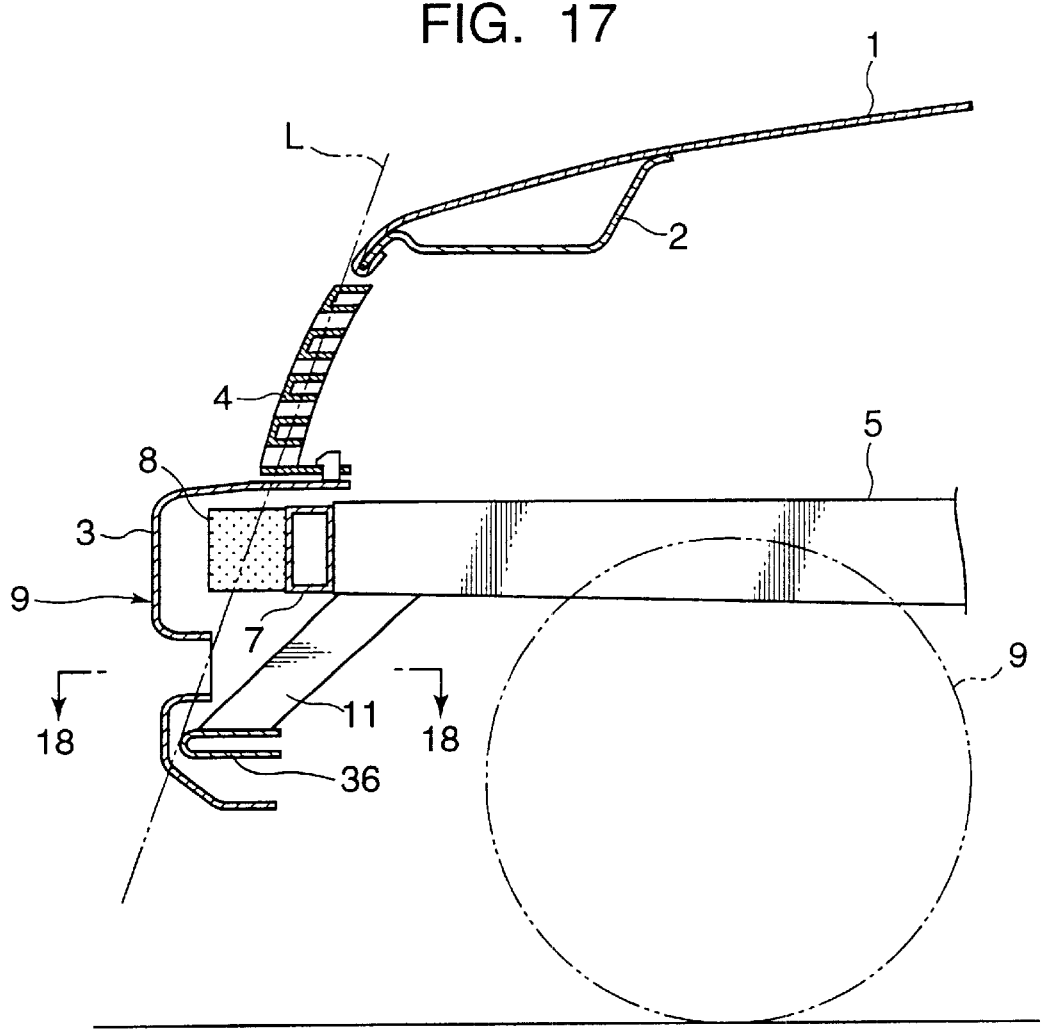
FIG. 17 is a side view showing the structure of a front part of a vehicle body according to a seventh embodiment of the invention.
Figure 18:
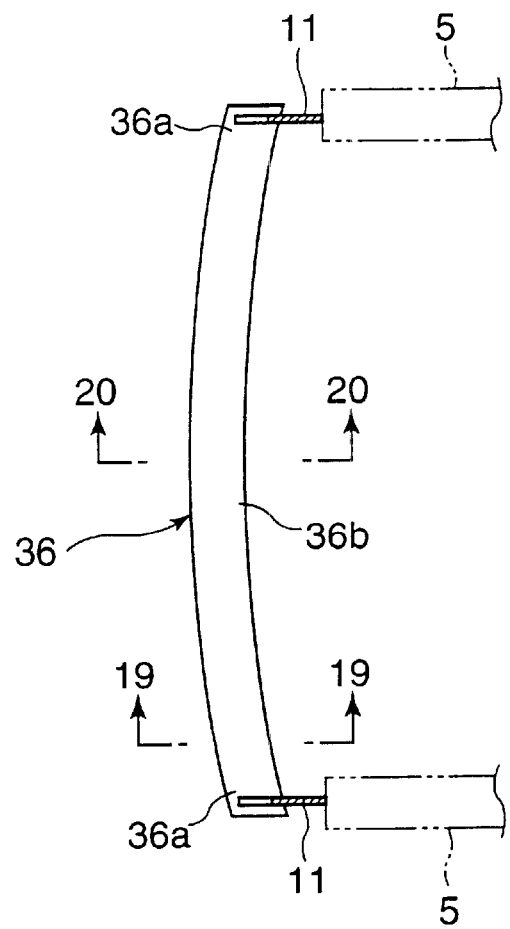
FIG. 18 is a sectional view taken along line 18—18 of FIG. 17.

More specifically, the width W1 and height H1 of the projecting part 35 at its lateral ends 35a shown in FIG. 15 are made smaller than the width W2 and height H2 of the middle part 35b of the projecting part 35 shown in FIG. 16, respectively, so that the strength of the projecting part 35 in the vehicle's longitudinal direction becomes smaller at its lateral ends 35a than at the middle part 35b.

The structure of this embodiment in which the strength of the projecting part 35 in the vehicle's longitudinal direction gradually increases from its lateral ends 35a toward its middle part 35b provides such advantageous effects that it could prevent the leg-sweeping effect from being deteriorated due to great deflection of the middle part 35b of the projecting part 35 as it hits against the legs of a pedestrian and the distribution of longitudinal load received by the projecting part 35 can be made approximately uniform.

Furthermore, since the projecting part 35 is formed of an elongate member having a generally channel-like cross section opening rearward, there is produced such an advantageous effect that the amount of energy absorbed by the projecting part 35 can be set to a desired value by properly adjusting the degree of its opening.

Moreover, since the earlier-mentioned lateral supporting member is formed of the a bumper reinforcement 7 and the projecting part 35 is installed ahead of and below the front side frame members 5 by means of the brackets 11, it is possible to give sufficient strength to the projecting part 35 with a simple construction.

FIGS. 17–20 show the structure of a front part of a vehicle body according to a seventh embodiment of the invention. In this embodiment, a projecting part 36 is made of an elongate member having a U-shaped cross section whose open side is directed rearward and the strength of the projecting part 36 in the vehicle's longitudinal direction gradually increases from its lateral ends 36a toward its middle part 36b.

Figure 19:
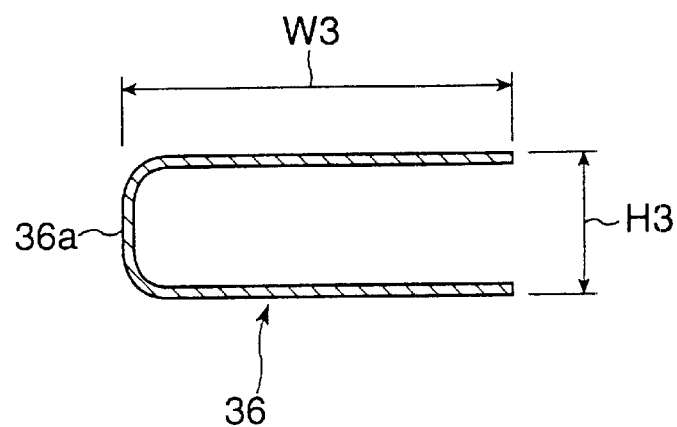
FIG. 19 is a sectional view taken along line 19—19 of FIG. 18.
Figure 20:
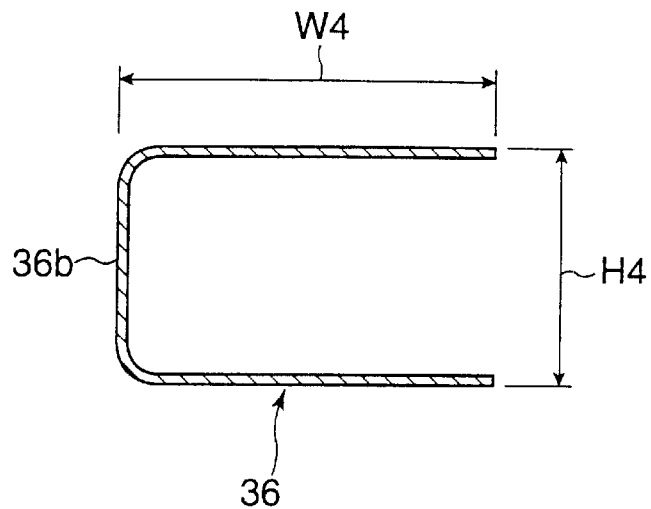
FIG. 20 is a sectional view taken along line 20—20 of FIG. 18.

More specifically, the height H3 of the projecting part 36 at its lateral ends 36a shown in FIG. 19 is made smaller than the height H4 of the middle part 36b of the projecting part 36 shown in FIG. 20, so that the strength of the projecting part 36 in the vehicle's longitudinal direction becomes smaller at its lateral ends 36a than at the middle part 36b. In this embodiment, the width W4 of the projecting part 36 at its lateral ends 36a is made equal to the width W4 at its middle part 36b.

Figure 21:
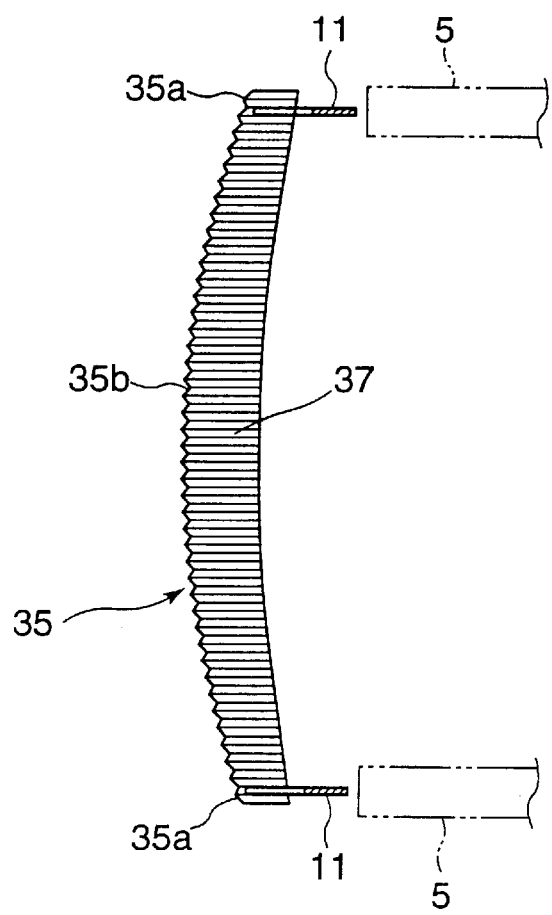
FIG. 21 is a plan view of a projecting part in one variation of the sixth embodiment.
Figure 22:
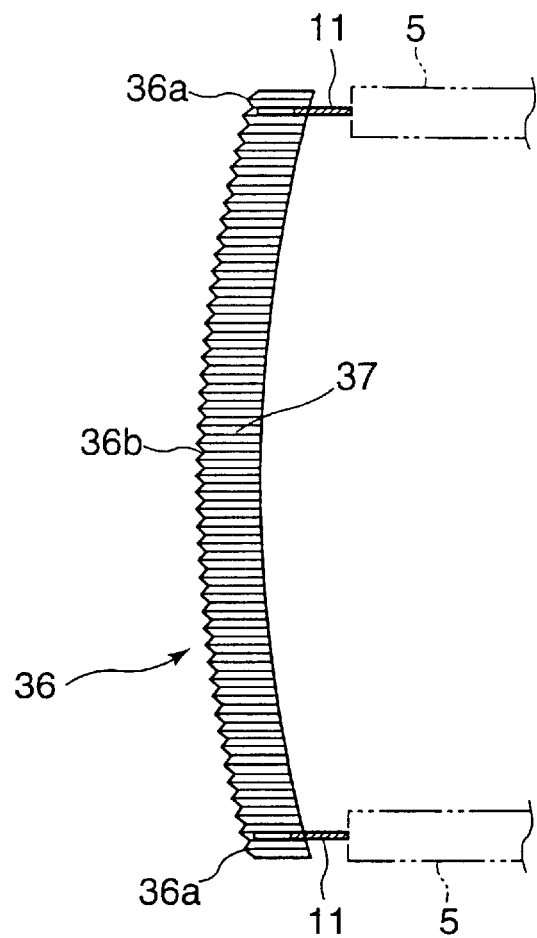
FIG. 22 is a plan view of a projecting part in one variation of the seventh embodiment.

FIGS. 21 and 22 show variations of the sixth and seventh embodiments shown in FIGS. 13–16 and 17–20, respectively. In these variations, the projecting parts 35 and 36 have corrugated surfaces 37 having alternating furrows and ridges formed parallel to the longitudinal direction of the vehicle body.

Figure 23:
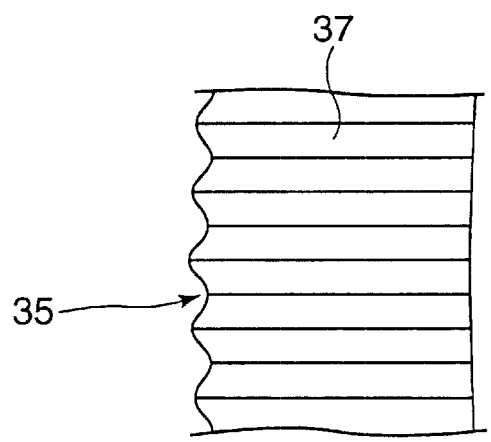
FIG. 23 is an enlarged fragmentary plan view of the projecting part.
Figure 24:
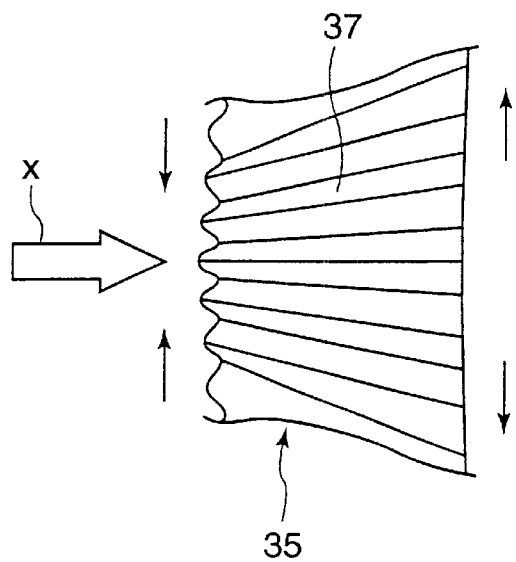
FIG. 24 is an enlarged fragmentary plan view of the projecting part which has been deformed due to a frontal impact load caused by a collision.

In this construction, the furrows and ridges of the corrugated surface 37 which have been spaced at regular intervals before impact as shown in FIG. 23 collapse upon impact as shown in FIG. 24, in which the furrows and ridges come close to each other at the front of the corrugated surface 37 and are separated from each other at the rear of the projecting part 35 (36) due to a frontal impact load (represented by arrow x). Since this deformation of the corrugated surface 37 sequentially propagates across the furrows and ridges in the direction of the vehicle width in the event of a collision, the projecting part 35 (36) can effectively absorb impact energy caused by the collision.

In addition, the provision of the corrugated surfaces 37 on the projecting parts 35, 36 adds rigidity to the projecting parts 35, 36. This reinforcing effect is advantageous in that it helps to achieve sufficient strength even when the projecting parts 35, 36 are made thinner.

Figure 25:
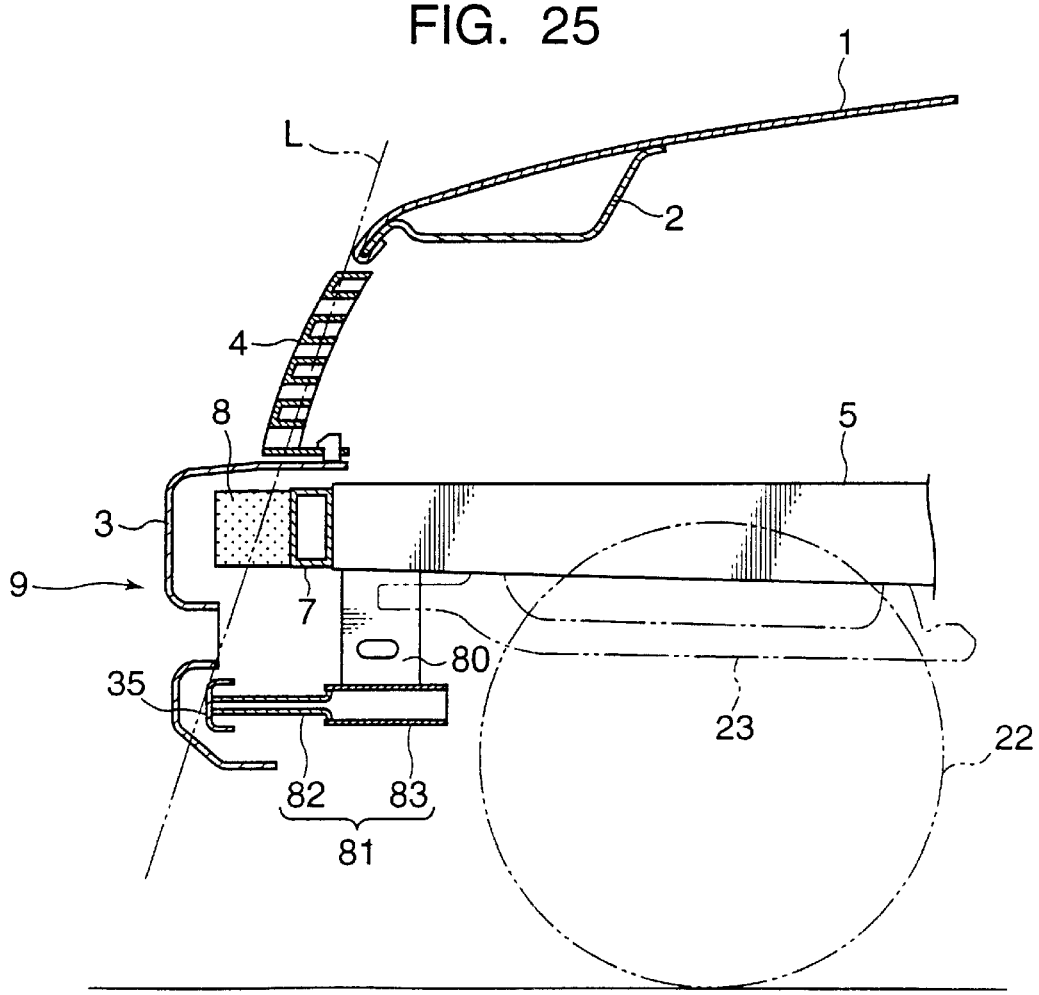
FIG. 25 is a side view showing the structure of a front part of a vehicle body according to an eighth embodiment of the invention.
Figure 26:
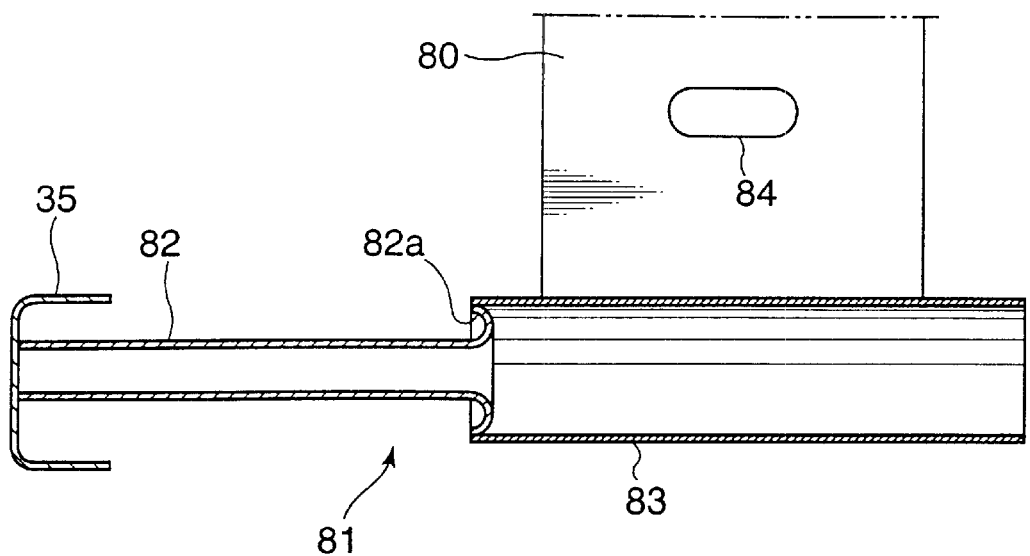
FIG. 26 is a sectional view mainly showing an energy-absorbing pipe assembly used in the structure of FIG. 25.
Figure 27:
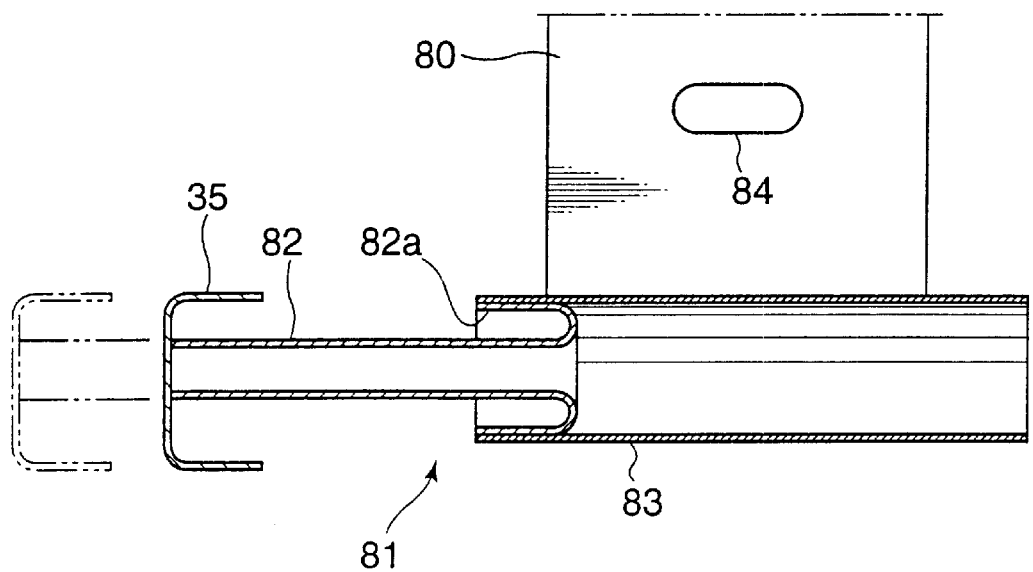
FIG. 27 is a sectional view showing operation of the energy-absorbing pipe assembly.

FIGS. 25–27 show the structure of a front part of a vehicle body according to an eighth embodiment of the invention.

In this embodiment, there are provided a projecting part 35 in such a way that a forward end of the projecting part 35 juts out frontward beyond the bumper reinforcement 7 at a lower part of the front bumper 9, and tie-down hook plates 80 ahead of and below the left and right front side frame members 5, wherein left and right ends of the projecting part 35 are sustained by the respective tie-down hook plates 80 via left and right energy-absorbing pipe assemblies 81.

The energy-absorbing pipe assemblies 81 absorb impact energy in the event of a collision as they retract when the projecting part 35 is forced rearward. Each energy-absorbing pipe assembly 81 is formed of a front pipe section (first tubular portion) 82 having a smaller diameter which is joined directly to the rear of the projecting part 35 and a rear pipe section (second tubular portion) 83 having a larger diameter whose forward end is fixed to a rear peripheral part of the front pipe section 82 by welding, for instance. A peripheral part of the rear pipe section 83 is then joined to the corresponding tie-down hook plate 80.

As shown in FIG. 26, the front pipe section 82 has a curved funnellike bend 82a at its rear end. This bend 82a is formed by radially folding back the rear end of the front pipe section 82 and firmly connected to the forward end of the rear pipe section 83. In FIGS. 25–27, designated by the numeral 84 is an opening for hooking and designated by the numeral 23 is a rectangular frame.

According to the above-described structure of this embodiment, when an impact load reaches a specified value in the event of a collision between the vehicle and a pedestrian, the front pipe section 82 of each energy-absorbing pipe assembly 81 deforms and is forced into the rear pipe section 83 as shown in FIG. 27, whereby the impact energy is absorbed at a constant input load.

As the projecting part 35 is sustained by the tie-down hook plates 80 which are rigid members, this embodiment provides such an advantageous effect that it is possible to obtain sufficient rigidity to support the projecting part 35.

Furthermore, since the projecting part 35 is backed by the energy-absorbing pipe assemblies 81 whose retracting motion serves to absorb the impact energy, there are such advantageous effects that the impact energy can be effectively absorbed between the projecting part 35 and the tie-down hook plates 80 in the event of a collision and the energy-absorbing pipe assemblies 81 can be securely supported by the tie-down hook plates 80.

Moreover, the front pipe section 82 (first tubular portion) of each energy-absorbing pipe assembly 81 provided at the rear of the projecting part 35 is forced rearward along and into the rear pipe section 83 (second tubular portion) while absorbing the impact energy in the event of a collision between the vehicle and a pedestrian. When this situation occurs, the front pipe section 82 retracts while maintaining prescribed conditions of joint between the rear peripheral part of the front pipe section 82 and the forward end of the rear pipe section 83.

Consequently, the structure of this embodiment provides such an advantageous effect that it can absorb the impact energy at a constant input load with the stroke (rearward movement) of the projecting part 35.

Since the structure of this embodiment otherwise provides substantially the same functional features and advantages as the foregoing embodiments, their detailed description is not given here.

Figure 28:
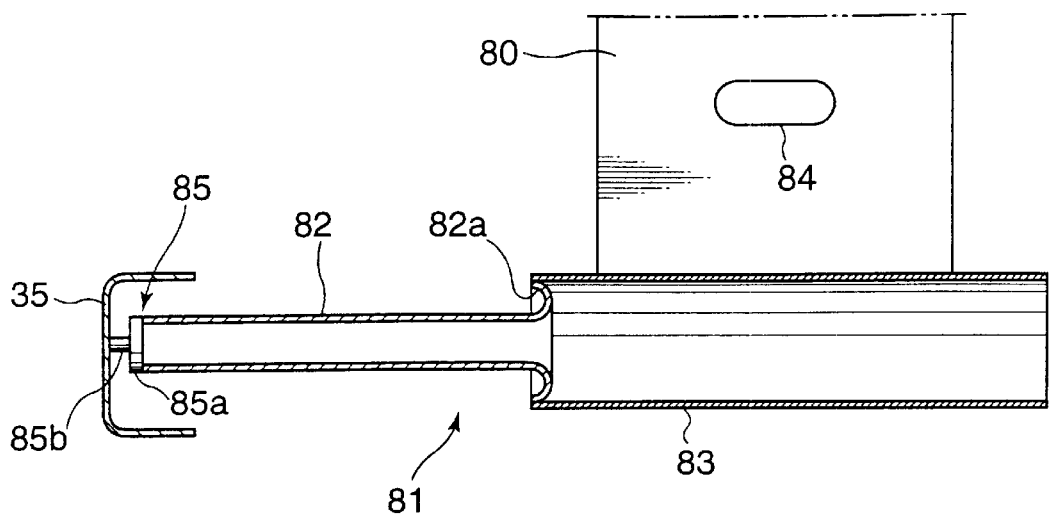
FIG. 28 is a sectional view mainly showing another example of an energy-absorbing pipe assembly.

FIG. 28 shows another example of energy-absorbing pipe assemblies 81 provided between the projecting part 35 and the tie-down hook plates 80, in which an attachment 85 is fitted to a forward end of the front pipe section 82 of each energy-absorbing pipe assembly 81.

More specifically, the attachment 85 has a load transmitting part 85a whose outside diameter is equal to that of the front pipe section 82 and a mounting part 85b which extends frontward from the load transmitting part 85a and whose outside diameter is smaller than that of the front pipe section 82. The attachment 85 is fitted by its mounting part 85b to the bottom of a channel-like opening of the projecting part 35 on its rear side.

When the energy-absorbing pipe assemblies 81 are constructed as described above, there is produced such an advantageous effect that deformation of the channel-like opening of the projecting part 35 is not hindered at all. Since the structure of this variation of the eighth embodiment otherwise provides substantially the same functional features and advantages as the foregoing embodiments, their detailed description is not given here.

Figure 29:
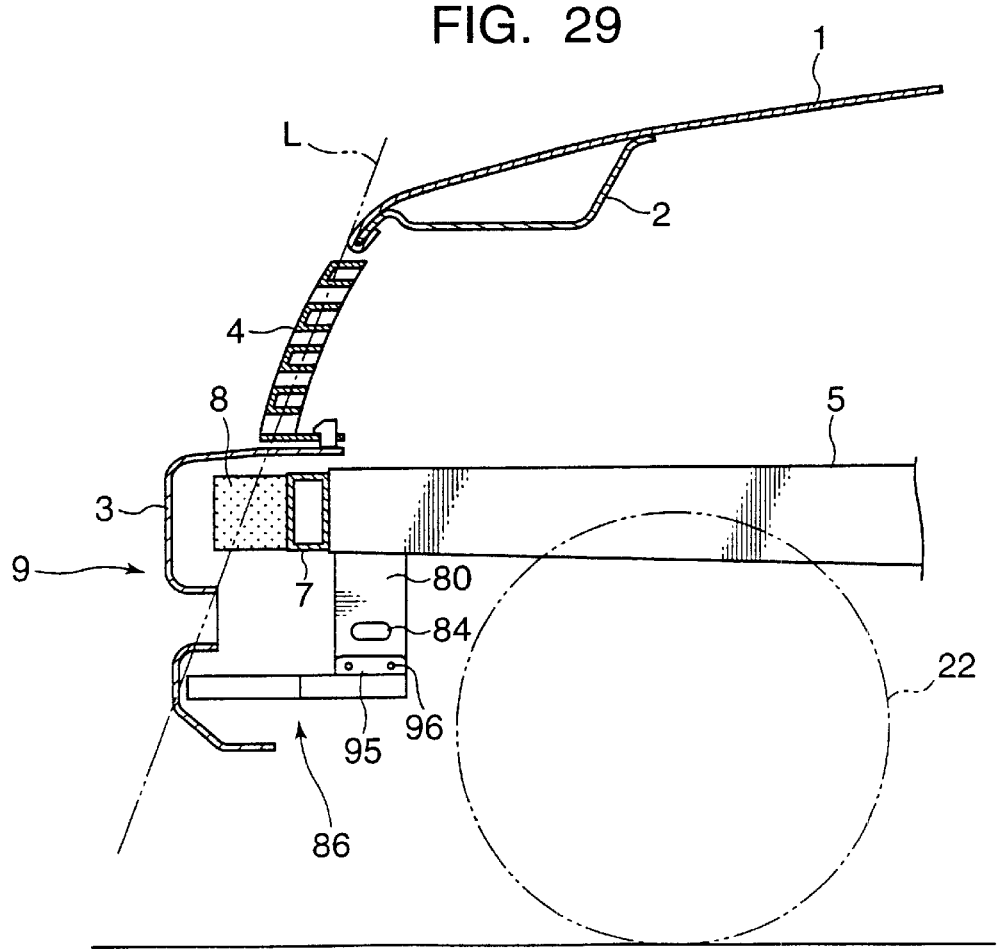
FIG. 29 is a side view showing the structure of a front part of a vehicle body according to a ninth embodiment of the invention.
Figure 30:
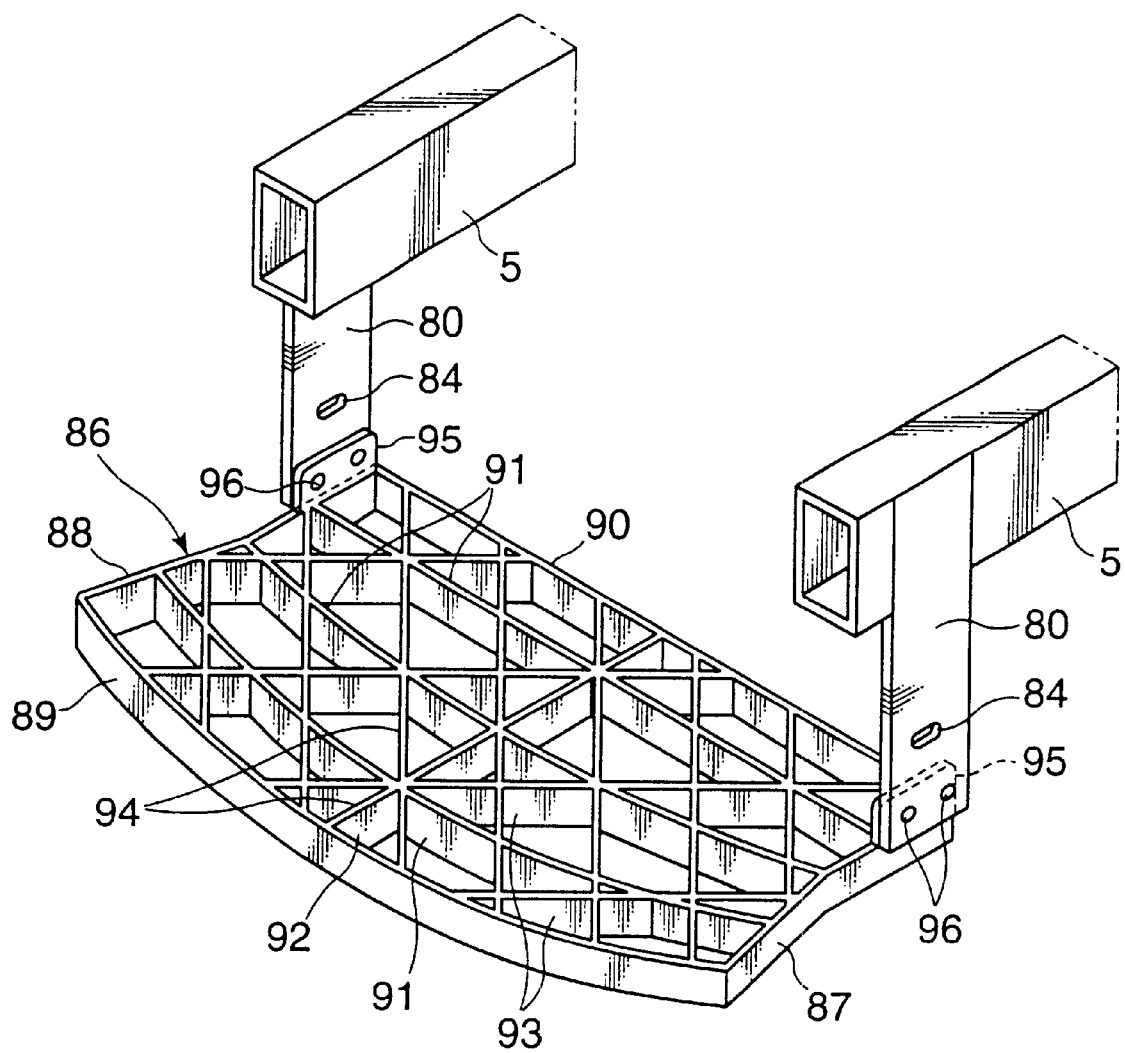
FIG. 30 is a perspective view showing a principal portion of the structure of FIG. 29.

FIGS. 29 and 30 show the structure of a front part of a vehicle body according to a ninth embodiment of the invention.

In this embodiment, there is provided a projecting part 86 made of resin instead of the aforementioned projecting part 35. The projecting part 86 is installed in approximately a horizontal position ahead of and below the front side frame members 5 by means of tie-down hook plates 80 such that a forward end of the projecting part 86 juts out frontward beyond the bumper reinforcement 7 at a lower part of the front bumper 9.

The projecting part 86 is made of synthetic resin like polypropylene (PP) or polyethylene (PE) into the shape shown in FIG. 30.

More specifically, the projecting part 86 is formed of left, right, front and rear frame elements 87–90 which together form a rectangular frame, ribs 91 spanning in the direction of the vehicle width between the left and right frame elements 87, 88 and arranged at specific intervals in the vehicle's longitudinal direction, a rib 92 extending in the longitudinal direction at the middle of the width of the projecting part 86, ribs 93, 94 spanning in oblique directions inside the rectangular frame (frame elements 87–90), and fixing tabs 95 projecting upward from upper rear terminal parts of the left and right frame elements 87, 88. These elements of the projecting part 86 are molded into a single resin structure (honeycomb structure) which has a generally fanlike shape as a whole in plan view. This resin structure is constructed such that it would provide desired load characteristics by properly selecting the thickness of the frame elements 87–90 and the spacings and directions of the ribs 91–94.

The resin projecting part 86 thus constructed is installed by securing the fixing tabs 95 to the tie-down hook plates 80 with fixing parts 96 such as bolts and nuts.

Since this projecting part 86 has the central longitudinal rib 92 and is formed into the generally fanlike shape in plan view, mechanical strength of the projecting part 86 in the vehicle's longitudinal direction gradually increases from its left and right ends to its middle part.

Functional features of the aforementioned structure of the front of the vehicle of the present embodiment are now described.

An impact load exerted on the resin bumper face 3 from the front in the event of a collision between the vehicle and a pedestrian is received by the projecting part 86 which is supported by the front side frame members 5 via the tie-down hook plates 80.

Thus, in the event of a collision between the vehicle and a pedestrian, the pedestrian is swept by parts of his or her legs lower than the knees by the projecting part 86. After impact energy exerted on the parts of the legs of the pedestrian who is thrown over toward the vehicle has been absorbed by the energy absorber 8, the pedestrian drops onto the top of the hood 1 so that the pedestrian is protected.

Furthermore, since the projecting part 86 is constructed such that its mechanical strength in the vehicle's longitudinal direction gradually increases from its left and right ends to its middle part, the structure of this embodiment provides such an advantageous effect that the projecting part 86 receives approximately the same level of frontal load in the event of a collision no matter which part of projecting part 86 along its length (along the width of the vehicle) hits the pedestrian. In addition, another advantage of using this structure is that the projecting part 86 can deform at any portion over the entire length of the projecting part 86 at substantially the same amount in the event of a collision.

In this embodiment, two fixing holes are made in each fixing tab 95 for fitting the fixing parts 96 when fixing the projecting part 86 to the tie-down hook plates 80. Of these two fixing holes, the front fixing hole may be formed into a vertically extending slot so that the projecting part 86 can be moved upward if it interferes (or collides) with the road surface or with an obstacle on the road surface. This would help prevent breakage and other damages to the projecting part 86 and confer an advantage with respect to approach angle.

Figure 31:
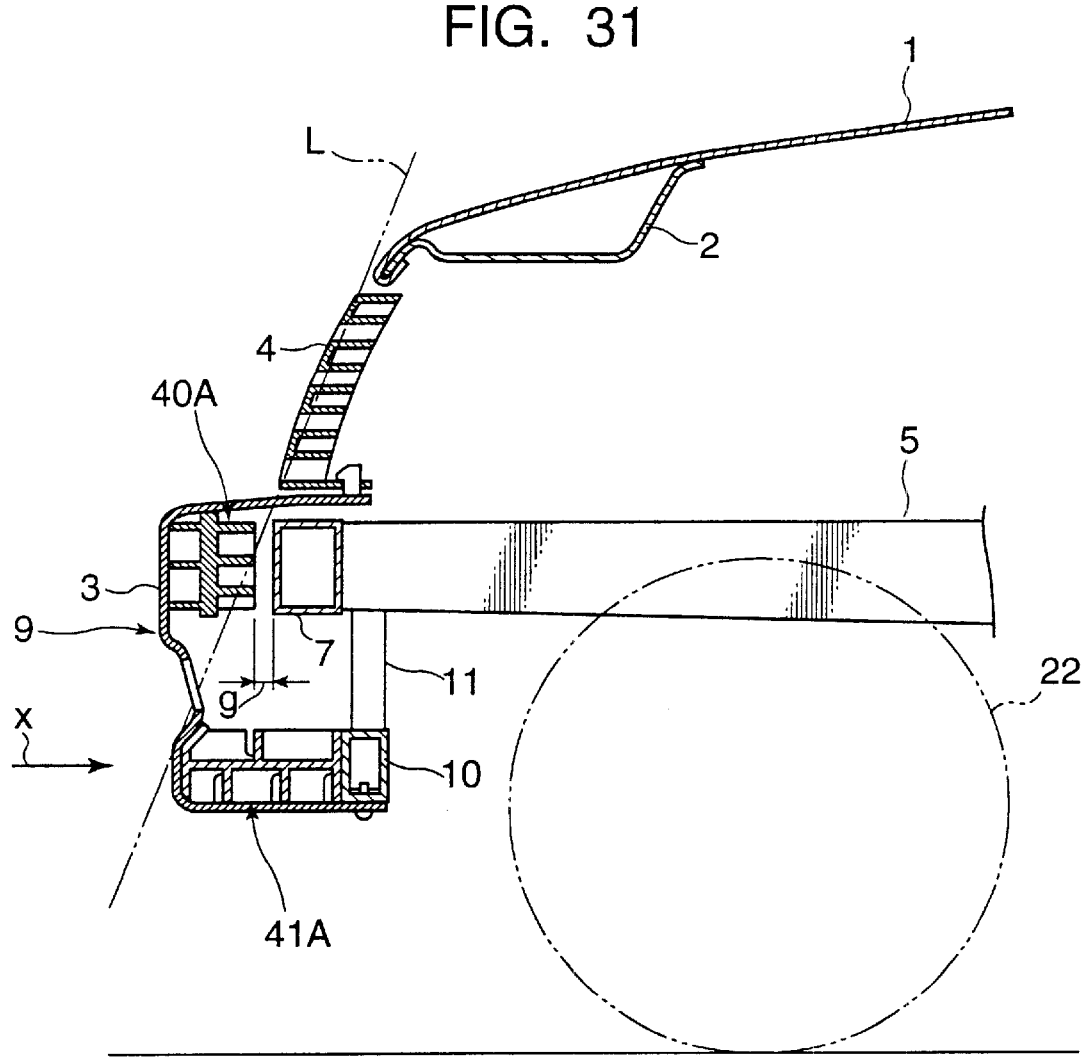
FIG. 31 is a side view showing the structure of a front part of a vehicle body according to a tenth embodiment of the invention.

FIG. 31 shows the structure of a front part of a vehicle body according to a tenth embodiment of the invention. In this embodiment, there is provided a bumper face 3 made of resin and an energy absorber 40A which is assembled with the bumper face 3 on its rear surface to together form a single structure. This energy absorber 40A is located at a position corresponding to the height of the knees of a pedestrian ahead of the bumper reinforcement 7 (lateral supporting member).

In a front bumper 9 including the bumper face 3, the bumper reinforcement 7 and the energy absorber 40A, a lower leg supporting part 41A extending in the direction of the vehicle width is provided integrally with the bumper face 3 at a lower part of its rear surface, and a rear portion of the lower leg supporting part 41A is supported by the front cross member 10 which is a specific example of a structural member of the vehicle body. The energy absorber 40A and the lower leg supporting part 41A are combined with the bumper face 3 all the way along the length of the front bumper 9 (i.e., across the vehicle width).

In one variation of this embodiment, a rectangular frame shown in FIG. 7 may be used as a structural member of the vehicle body instead of the front cross member 10. Also, in a vehicle which is not provided with the front cross member 10, stays (not shown) extended downward from the front side frame members 5 or from the bumper reinforcement 7 may be used as structural members of the vehicle body.

There is formed a gap g of a specific distance between a rear surface of the energy absorber 40A and a front surface of the bumper reinforcement 7 as shown in FIG. 31.

When the bumper face 3 is displaced rearward as a result of a collision between the vehicle and a pedestrian, the gap g is zeroed and a forward end of the lower leg supporting part 41A juts out more frontward than that of the energy absorber 40A. More particularly, although the forward end of the lower leg supporting part 41A is located more rearward than that of the energy absorber 40A under normal conditions shown in FIG. 31, the forward end of the lower leg supporting part 41A juts out more frontward than that of the energy absorber 40A when the bumper face 3 is displaced rearward and the gap g is zeroed in the event of a collision between the vehicle and the pedestrian.

Figure 32:
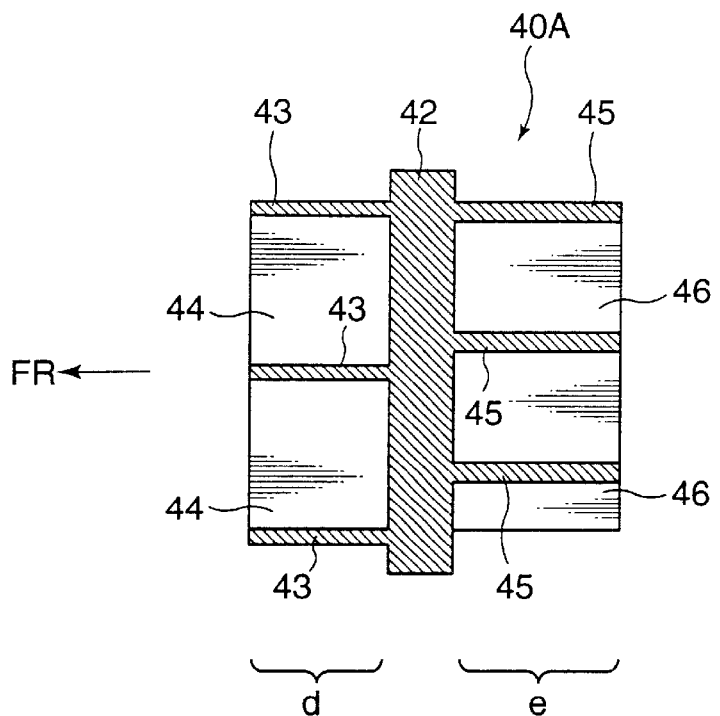
FIG. 32 is a sectional view of an energy absorber used in the structure of FIG. 31.
Figure 33:
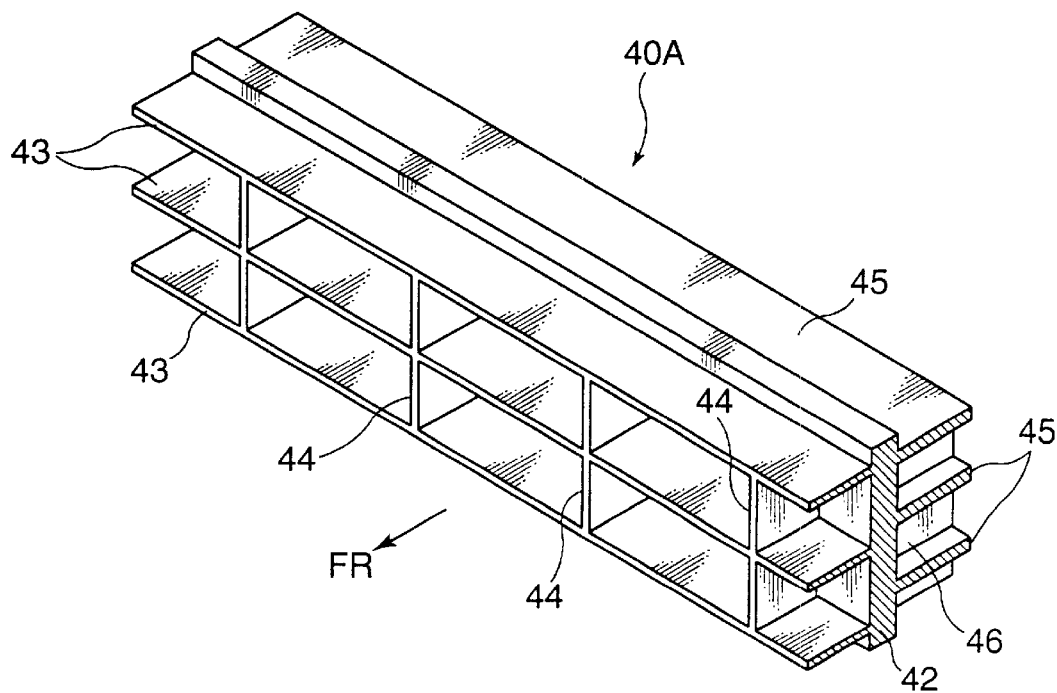
FIG. 33 is a perspective view of the energy absorber of FIG. 31.

A specific example of the construction of the energy absorber 40A of FIG. 31 is shown in FIGS. 32 and 33. The energy absorber 40A is made of the same synthetic resin material as the bumper face 3, such as polypropylene (PP), and is constructed such that it extends in the direction of the vehicle width along an upper part of the rear surface of the bumper face 3 ahead of the bumper reinforcement 7.

As shown in FIGS. 32 and 33, the energy absorber 40A is formed of a main structural part 42 extending in the direction of the vehicle width in an upright position, a plurality of horizontal front ribs 43 and vertical front ribs 44 extending frontward from a front surface of the main structural part 42, and a plurality of horizontal rear ribs 45 and vertical rear ribs 46 extending rearward from a rear surface of the main structural part 42.

Furthermore, the rigidity of the energy absorber 40A at root portions of the horizontal front ribs 43 is made smaller than that of the energy absorber 40A at root portions of the horizontal rear ribs 45.

Specifically, the thickness of the horizontal front ribs 43 is made smaller than that of the horizontal rear ribs 45 and the spacing between at least the horizontal front ribs 43 is made larger than that between the horizontal rear ribs 45.

In addition to setting the spacings of the horizontal front ribs 43 and the horizontal rear ribs 45 in the aforementioned fashion, the spacing between the vertical front ribs 44 may also be made larger than that between the vertical rear ribs 46.

The energy absorber 40A thus constructed is integrally joined to a specific part of the rear surface of the bumper face 3 by heat bonding, for instance.

Figure 34:
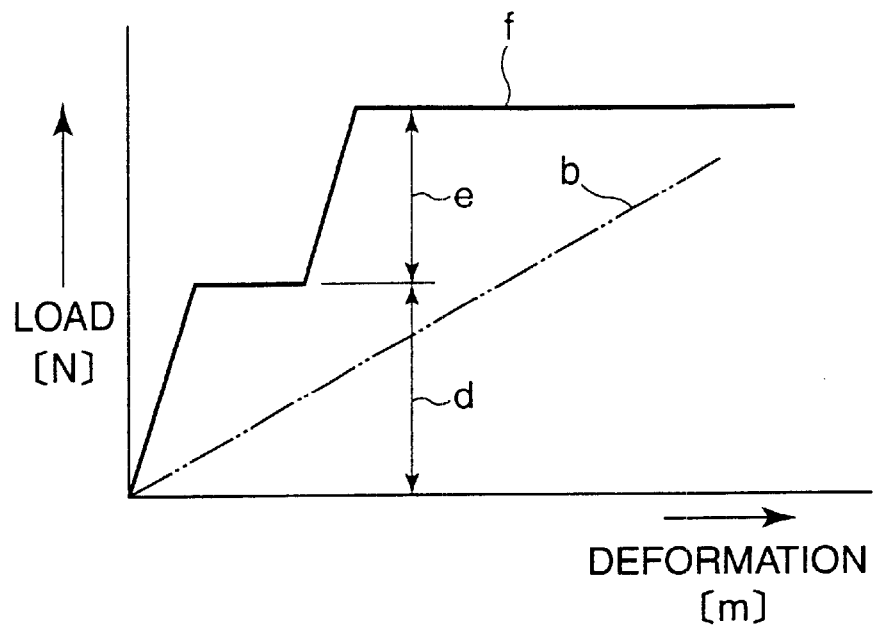
FIG. 34 is a graphical representation of the load characteristics of the energy absorber of FIG. 31.

In the event of a collision, the front ribs 43, 44 of the energy absorber 40A in a region d shown in FIG. 32 collapse with a relatively small impact load and, then, the rear ribs 45, 46 in a region e collapse with a larger impact load. Thus, the energy absorber 40A provides generally steplike load characteristics "f" (two-step energy-absorbing characteristics) as illustrated in FIG. 34. As a whole, the amount of energy absorbed by the energy absorber 40A is increased compared to the foregoing embodiments that provide the load characteristics "b".

A specific example of the construction of the lower leg supporting part 41A of FIG. 31 is described with reference to FIGS. 35–37. The lower leg supporting part 41A is made of the same synthetic resin material as the bumper face 3, such as polypropylene (PP), and is constructed such that it extends in the direction of the vehicle width along a lower part of the rear surface of the bumper face 3.

The lower leg supporting part 41A has a generally upright front strip 47, an upright rear strip 48, a horizontal main stiffening plate 49 which extends in the vehicle's longitudinal direction between the front strip 47 and the rear strip 48. These elements together constitute a main structural part 50 having a generally H-shaped cross section. Further, a plurality of upper ribs 51 extending in the longitudinal direction and an upper rib 52 extending in the direction of the vehicle width are formed on a top surface of the main stiffening plate 49 while a plurality of lower ribs 53 extending in the longitudinal direction and a lower rib 54 extending in the direction of the vehicle width are on a bottom surface of the main stiffening plate 49.

The spacings between the front strip 47, the upper rib 52 and the rear strip 48 in the vehicle's longitudinal direction and the spacings between the upper ribs 51 in the vehicle's lateral direction are made rather large on the top side of the main stiffening plate 49, whereas the spacings between the front strip 47, lower rib 54 and the rear strip 48 in the vehicle's longitudinal direction and the spacings between the lower ribs 53 in the vehicle's lateral direction are made smaller on the bottom side of the main stiffening plate 49.

In this construction, there is formed a clearance C1 (or cutout) as a marginal space between a rear end of each upper rib 51 on the front side and a front surface of the upper rib 52. Also, there is formed a clearance C2 (or cutout) as a marginal space between a rear end of each lower rib 53 and a front surface of the rear strip 48. These clearances C1, C2 allow deflection of the lower leg supporting part 41A and serves to increase the approach angle when an impact load is exerted upon the lower leg supporting part 41A in the event of a collision. Specifically, when the impact load is exerted upon the lower leg supporting part 41A, its forward end is lifted upward together with the bumper face 3.

The lower leg supporting part 41A thus constructed is integrally joined to a specific part of the rear surface of the bumper face 3 by heat bonding, for instance.

Figure 38:
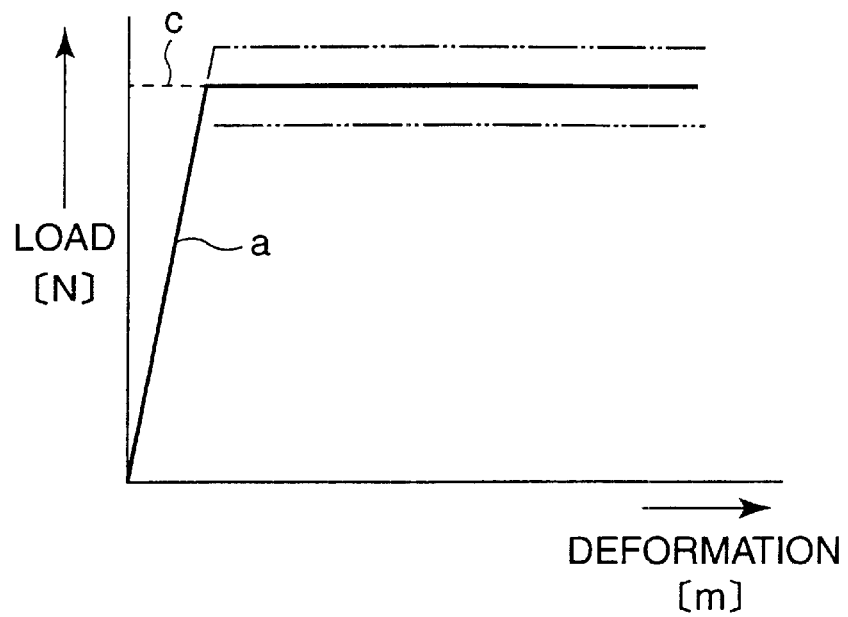
FIG. 38 is a graphical representation of the load characteristics of the lower leg supporting part of FIG. 31.

FIG. 38 is a graphical representation of the load characteristics "a" of the lower leg supporting part 41A, in which the horizontal axis represents the amount of deformation (or collapse) while the vertical axis represents the load (dynamic collapsing load). The load characteristics "a" of the lower leg supporting part 41A are determined such that the input load (expressed in newtons) first increases rapidly from the zero point to a specific load level c in proportion to the amount of deformation and, then, after the lower leg supporting part 41A has begun to plastically deform when the input load has reached the load level c, the amount of deformation increases under approximately a constant load.

Furthermore, the load level c of the aforementioned load characteristics "a" can be easily adjusted as to a desired level as shown by alternate long and two short dashed lines in FIG. 38 by changing the thickness and spacings of the individual ribs 51–54.

Figure 35:
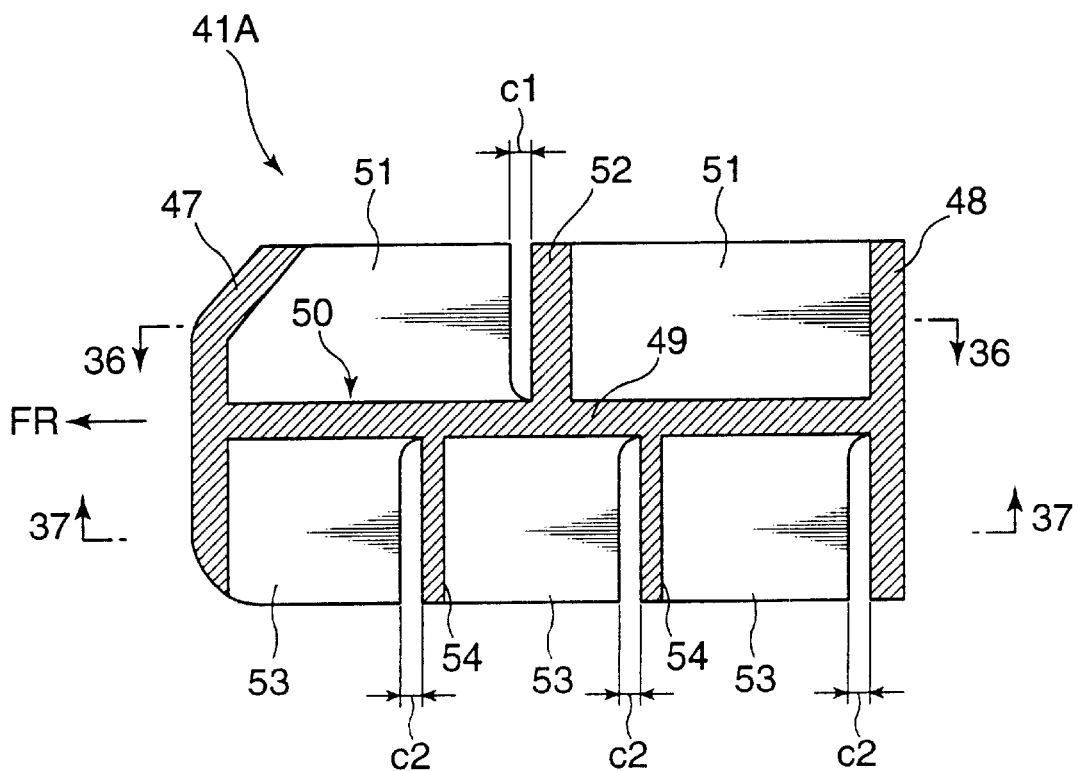
FIG. 35 is a sectional view showing a specific example of the construction of a lower leg supporting part used in the structure of FIG. 31.
Figure 36:
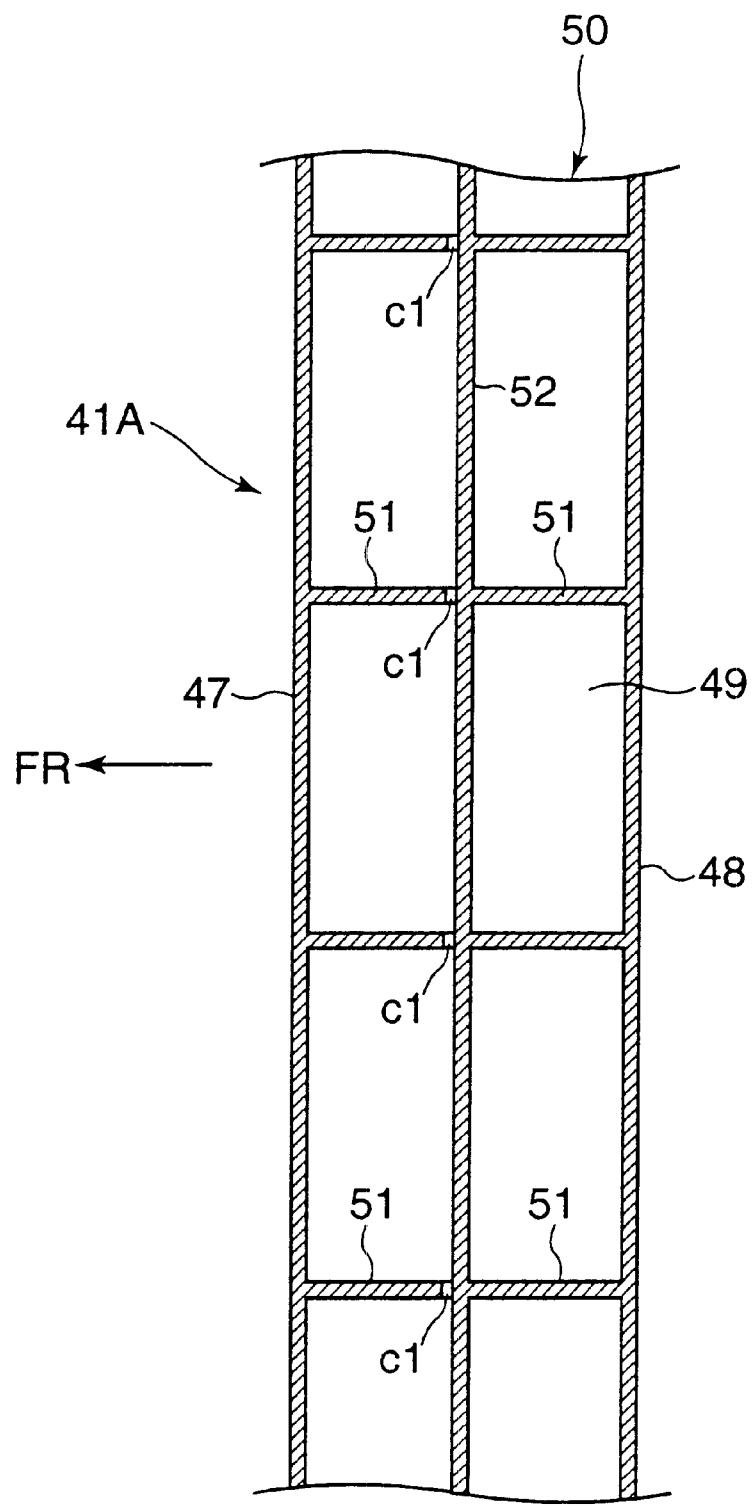
FIG. 36 is a sectional view taken along line 36—36 of FIG. 35.
Figure 37:
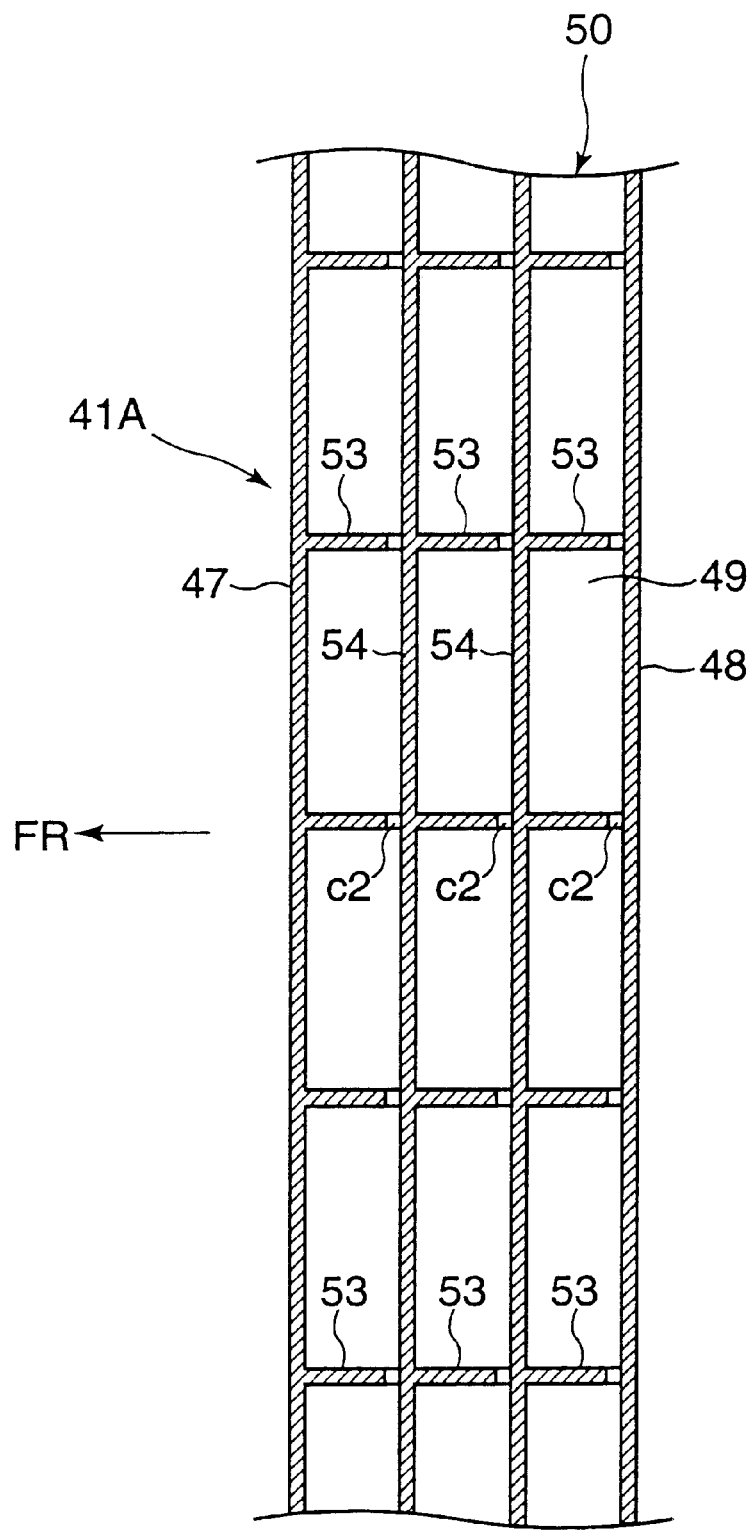
FIG. 37 is a sectional view taken along line 37—37 of FIG. 35.

Furthermore, the rigidity of the lower leg supporting part 41A depicted in FIGS. 35–37 is made smaller than that of the energy absorber 40A. In these Figures, "FR" designates the forward direction of the vehicle.

Functional features of the aforementioned structure of the front of the vehicle of the present embodiment are now described.

Since an impact load represented by an arrow x in FIG. 31 is exerted on the front bumper 9 in the event of a collision between the vehicle and a pedestrian, the bumper face 3 made of resin is displaced rearward at first and the gap g shown in FIG. 31 is zeroed and the forward end of the lower leg supporting part 41A juts out relatively frontward.

Consequently, the lower leg supporting part 41A sweeps the pedestrian by parts of his or her legs lower than the knees and the laterally extending energy absorber 40A absorbs impact energy exerted on the parts of the legs of the pedestrian who is thrown over toward the vehicle in two discrete steps as shown in FIG. 34. Then, the pedestrian drops onto the top of the hood 1 so that the pedestrian is protected.

According to the present embodiment shown in FIGS. 31–38, there is provided the front bumper 9 associated with the bumper face 3, the bumper reinforcement 7 (lateral supporting member) located behind the bumper face 3, and the lower leg supporting part 41A extending in the direction of the vehicle width at a lower part of the front bumper 9 with the rear portion of the lower leg supporting part 41A supported by the front cross member 10 (which is the structural member of the vehicle body) as seen above. Since the forward end of the lower leg supporting part 41A juts out relatively frontward compared to the bumper reinforcement 7 (lateral supporting member) when the bumper face 3 is displaced rearward, the structure of this embodiment provides the following advantageous effects.

Specifically, since the bumper face 3 is first displaced rearward in the event of a collision between the vehicle and a pedestrian, the forward end of the lower leg supporting part 41A juts out relatively frontward compared to the bumper reinforcement 7 (lateral supporting member) and the lower leg supporting part 41A whose rear portion is supported by the front cross member 10 (structural member of the vehicle body) receives a frontal impact load exerted in the direction of the arrow x in FIG. 31. Thus, the pedestrian is swept by parts of his or her legs lower than the knees by the lower leg supporting part 41A upon collision so that the pedestrian thrown over toward the vehicle is caused to drop onto the top of the hood 1 in a reliable fashion. There is produced such an advantageous effect that the pedestrian can be protected from secondary damage.

The present embodiment is also advantageous in that it is possible to provide increased safety of the legs of the pedestrian by properly selecting the strength (or load characteristics) of the lower leg supporting part 41A, simplify the structure of the front of the vehicle and prevent the occurrence of malfunction. Furthermore, there are no limitations in the design of the front bumper 9 so that its assembly can be simplified.

Also, since the aforementioned lateral supporting member is formed of the bumper reinforcement 7, it is possible to effectively use the already existing member, eliminating the need to additionally provide a member extending in the direction of the vehicle width.

Since the rigidity of the lower leg supporting part 41A (FIG. 38) is made larger than that of the energy absorber 40A (FIG. 34) provided ahead of the bumper reinforcement 7 (lateral supporting member), there are produced such advantageous effects that it is possible to sweep the pedestrian by his or her lower legs in a reliable fashion and the energy absorber 40A can effectively absorb impact energy exerted on the lower legs of the pedestrian who is thrown over toward the vehicle.

Furthermore, since the aforementioned energy absorber 40A is formed of the main structural part 42 and the ribs 43–46 and joined to the bumper face 3 to together form a single structure, there is such an advantageous effect that it is possible to increase the amount of absorbed energy and adjust the amount of absorbed energy more easily by determining the thickness and spacings of the individual ribs 43–46 as appropriate.

Since there is provided the gap g of the specific distance between the energy-absorbing ribs 45, 46 of the energy absorber 40A and the bumper reinforcement 7, the lower leg supporting part 41A is allowed to relatively juts out when the bumper face 3 is displaced rearward in the event of a collision between the vehicle and a pedestrian. As a result, there is produced such an advantageous effect that the lower leg supporting part 41A can sweep the pedestrian by his or her lower legs in a reliable fashion.

Furthermore, since the aforementioned lower leg supporting part 41A has the ribs 51–54 and the spacings between the upper ribs 51, 52 are made relatively large while the spacings between the lower ribs 53, 54 are made smaller, it allows deflection of the lower leg supporting part 41A and provides an increased approach angle when a load is exerted from the road surface. It is to be pointed out that if the spacings between both the upper ribs 51, 52 and the lower ribs 53, 54 are small, deflection of the lower leg supporting part 41A would be hindered.

Furthermore, since the energy absorber 40A is provided with the front ribs 43, 44 and the rear ribs 45, 46, and the modulus of elasticity of the front ribs 43, 44 is set to a small value while that of the rear ribs 45, 46 is set to a large value, there is produced such an advantageous effect that the impact energy exerted on the lower legs of the pedestrian is initially alleviated and a sufficient amount of energy is later absorbed.

In particular, as steplike energy-absorbing characteristics (FIG. 34) are obtained with the structure of this embodiment, the amount of the absorbed energy is increased as a whole. Also, the provision of the ribs 43–46, 51–54 serves to facilitate the adjustment of the amount of the absorbed energy.

Furthermore, since the thickness of the front ribs 43, 44 of the energy absorber 40A is made relatively small and that of the rear ribs 45, 46 is made larger, there is produced such an advantageous effect that the energy absorber 40A can initially alleviate the impact energy upon collision and eventually absorb a sufficient amount of energy.

Moreover, since the spacings between the front ribs 43, 44 of the energy absorber 40A are made relatively large and the spacings between the rear ribs 45, 46 are made smaller, there is produced such an advantageous effect that the energy absorber 40A can initially alleviate the impact energy upon collision and eventually absorb a sufficient amount of energy.

Figure 39:
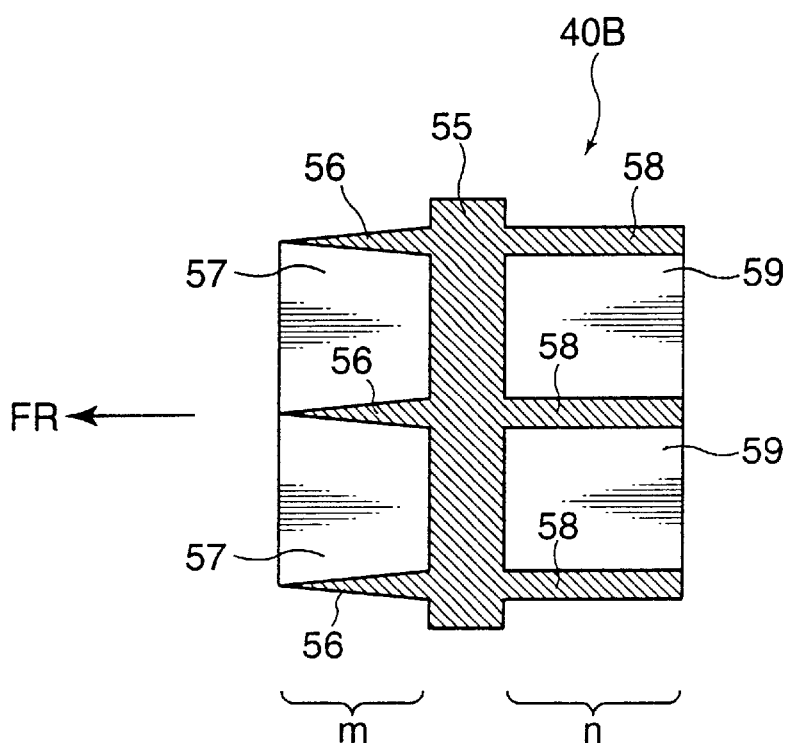
FIG. 39 is a sectional view of an energy absorber in one variation of the tenth embodiment.
Figure 40:
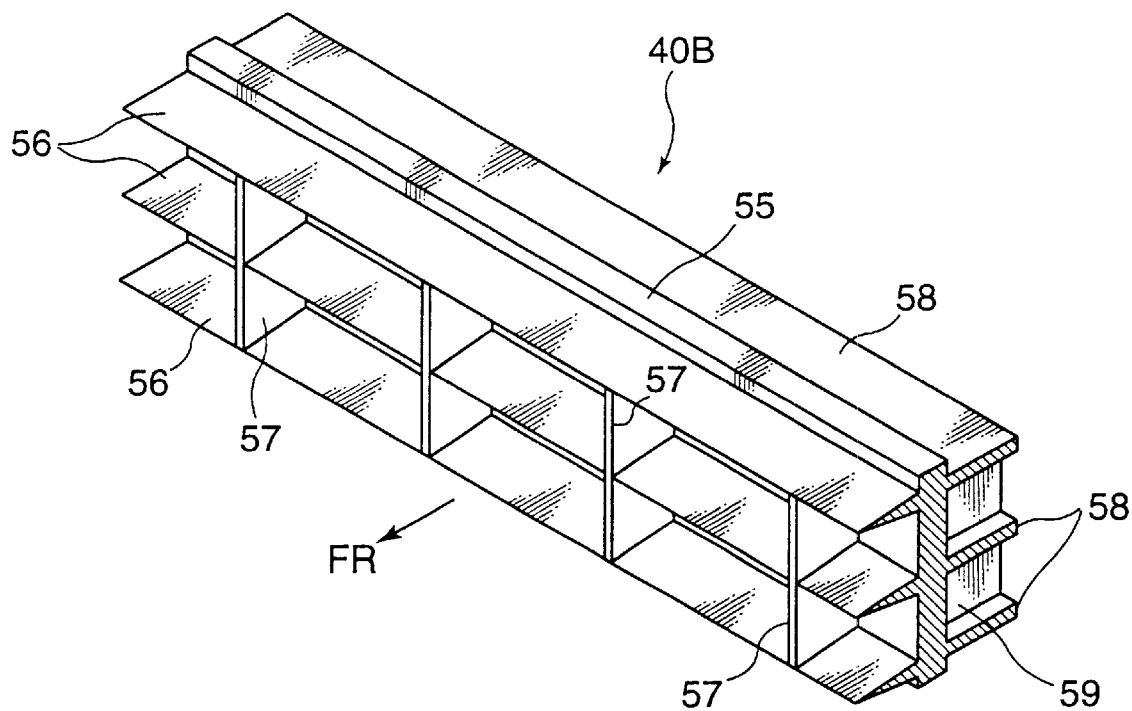
FIG. 40 is a perspective view of the energy absorber of FIG. 39.

FIGS. 39 and 40 show an energy absorber 40B (energy-absorbing ribs) in one variation of the tenth embodiment, in which the energy absorber 40B is integrally joined to the rear surface of the bumper face 3 by heat bonding, for instance, such that the energy absorber 40B is positioned face to face with the bumper reinforcement 7.

This energy absorber 40B is made of the same synthetic resin material as the bumper face 3, such as polypropylene (PP), and is constructed such that it extends in the direction of the vehicle width along the bumper face 3 ahead of the bumper reinforcement 7.

As shown in FIGS. 39 and 40, the energy absorber 40B is formed of a main structural part 55 extending in the direction of the vehicle width in an upright position, a plurality of horizontal front ribs 56 and vertical front ribs 57 extending frontward from a front surface of the main structural part 55, and a plurality of horizontal rear ribs 58 and vertical rear ribs 59 extending rearward from a rear surface of the main structural part 55.

In this energy absorber 40B, the horizontal front ribs 56 extending frontward are tapered such that they become narrower from their rear root portions toward their front ends.

Furthermore, the energy absorber 40B is so constructed that the amount of energy absorbed by the horizontal front ribs 56 are relatively small as compared to the amount of energy absorbed by the horizontal rear ribs 58.

Specifically, the thickness (cross-sectional area) of the horizontal front ribs 56 is made smaller than that of the horizontal rear ribs 58 and the spacing between the vertical front ribs 57 is made larger than that between the vertical rear ribs 59.

The energy absorber 40B thus constructed is integrally joined to a specific part of the rear surface of the bumper face 3 by heat bonding, for instance.

Figure 41:
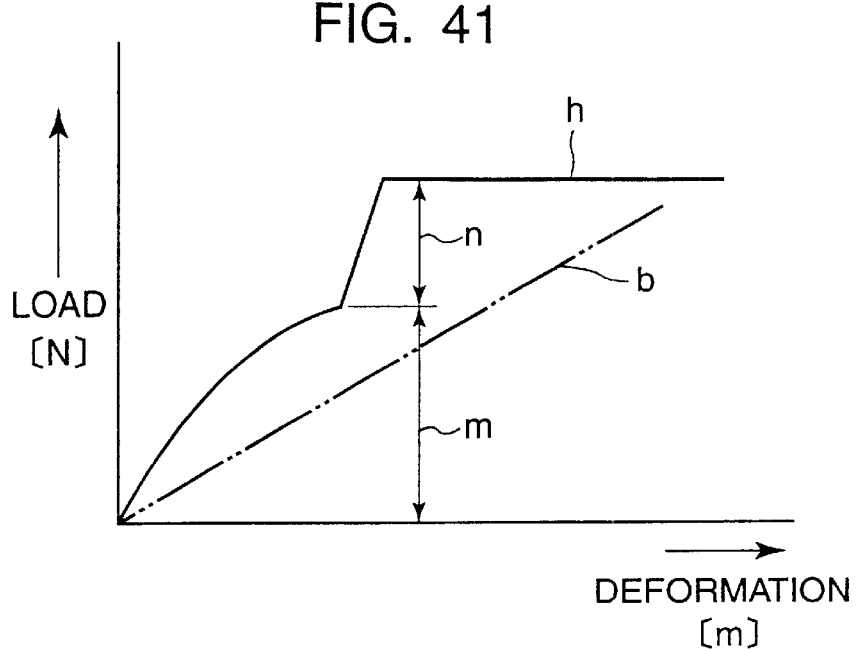
FIG. 41 is a graphical representation of the load characteristics of the energy absorber of FIG. 39.

In the event of a collision, the front ribs 56, 57 of the energy absorber 40B in a region m shown in FIG. 39 collapse with a relatively small impact load and, then, the rear ribs 58, 59 in a region n collapse with a larger impact load. Thus, the energy absorber 40B provides generally steplike load characteristics "h" (two-step energy-absorbing characteristics) as illustrated in FIG. 41. As a whole, the amount of energy absorbed by the energy absorber 40B is increased compared to the foregoing embodiments that provide the load characteristics "b".

FIG. 41 is a graphical representation of the load characteristics "h" of the energy absorber 40B, in which the horizontal axis represents the amount of deformation (or collapse) while the vertical axis represents the load (dynamic collapsing load).

The energy absorber 40B of FIGS. 39–41 provides substantially the same functional features and advantages as the foregoing embodiments.

Figure 42:
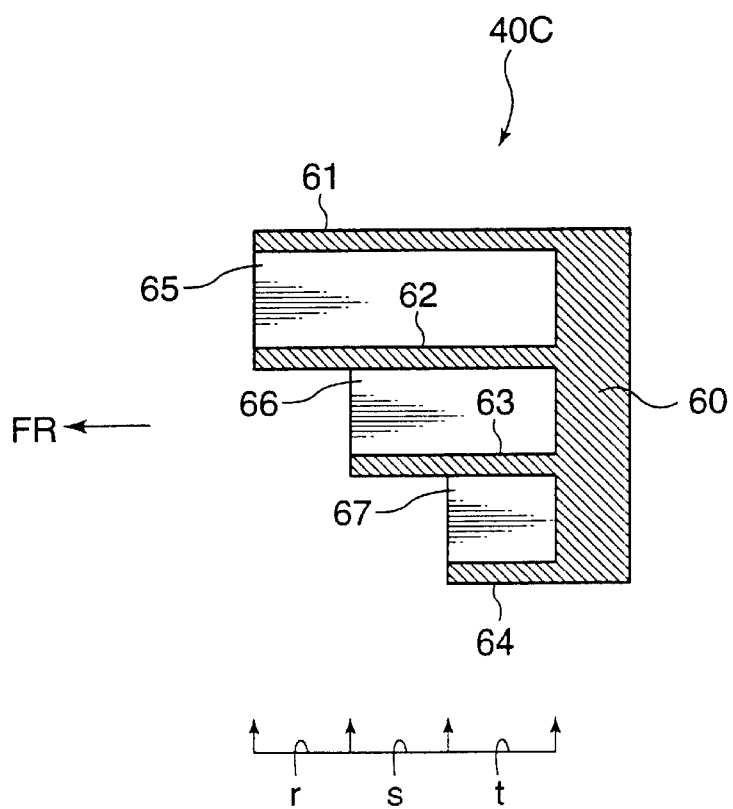
FIG. 42 is a sectional view of an energy absorber in another variation of the tenth embodiment.
Figure 43:
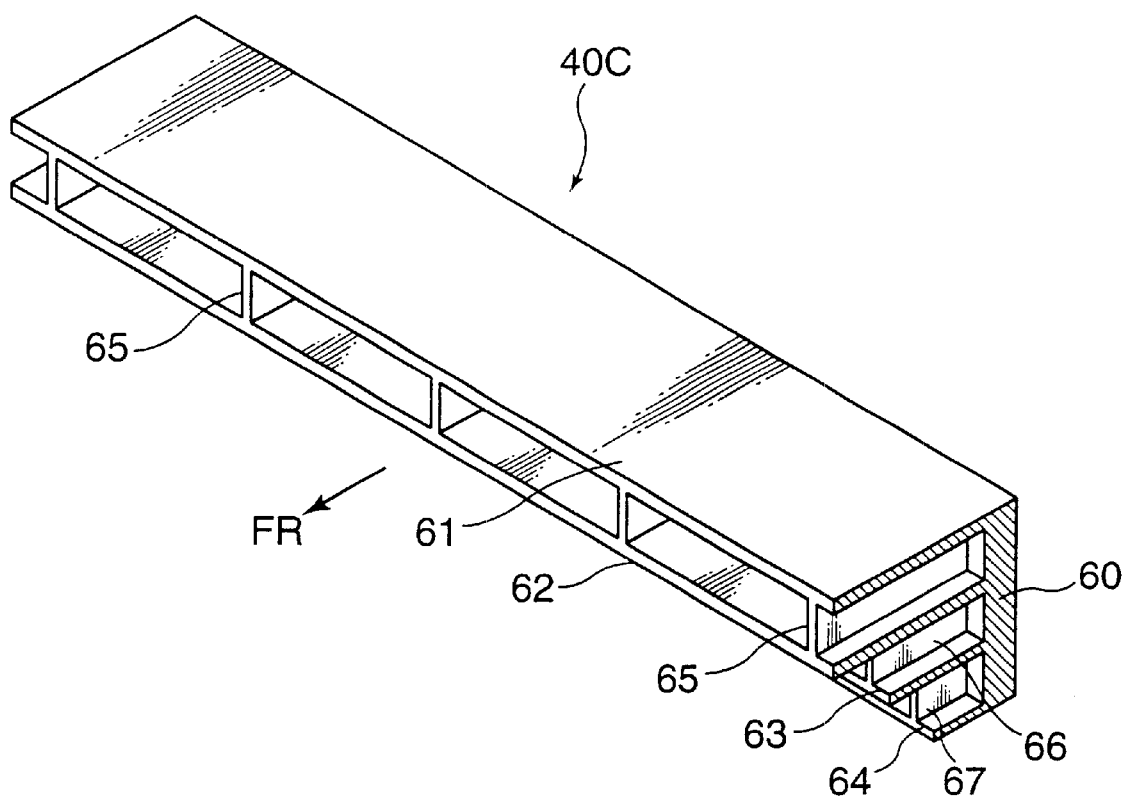
FIG. 43 is a perspective view of the energy absorber of FIG. 42.
Figure 44:
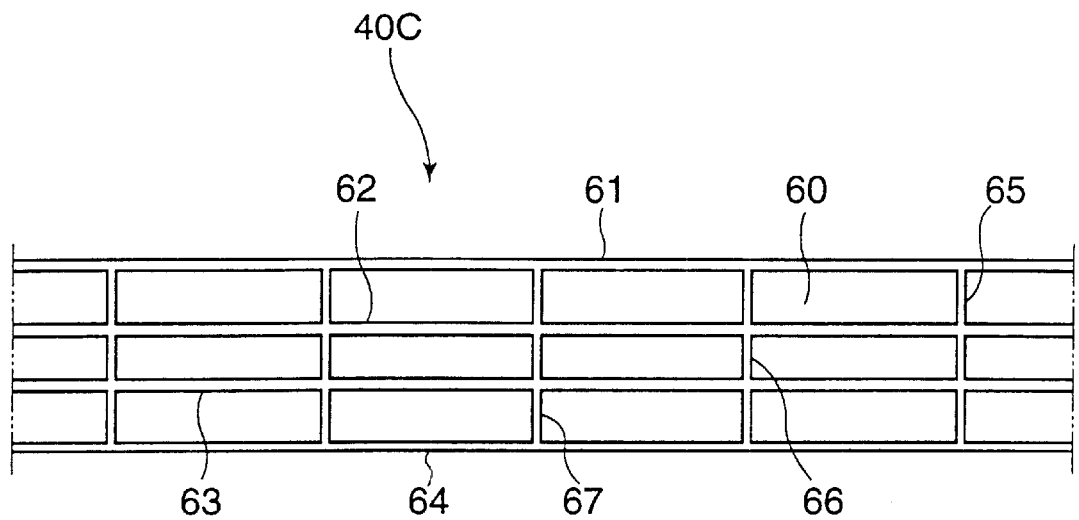
FIG. 44 is a front view of the energy absorber of FIG. 42.

FIGS. 42–44 show an energy absorber 40C (energy-absorbing ribs) in another variation of the tenth embodiment, in which the energy absorber 40C is integrally joined to the rear surface of the bumper face 3 by heat bonding, for instance, such that the energy absorber 40C is positioned face to face with the bumper reinforcement 7.

This energy absorber 40C is made of the same synthetic resin material as the bumper face 3, such as polypropylene (PP), and is constructed such that it extends in the direction of the vehicle width along the bumper face 3 ahead of the bumper reinforcement 7.

As shown in FIGS. 42–44, the energy absorber 40C is formed of a main structural part 60 extending in the direction of the vehicle width in an upright position, a plurality of horizontal ribs 61–64 extending frontward in a steplike fashion from a front surface of the main structural part 60, and a plurality of vertical ribs 65–67 which vertically connect the multiple horizontal ribs 61–64.

Figure 45:
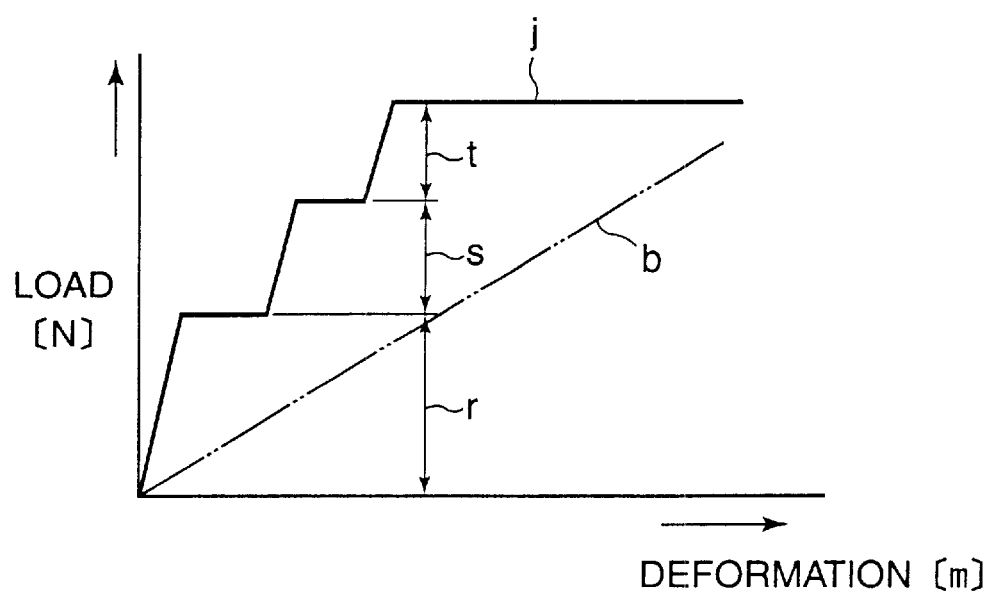
FIG. 45 is a graphical representation of the load characteristics of the energy absorber of FIG. 42.

In this energy absorber 40C, the ribs 61, 62 and 65 work as front ribs, the ribs 63 and 66 work as middle ribs, the ribs 64 and 67 work as rear ribs. In the event of a collision, the energy absorber 40C (energy-absorbing ribs) collapses in a region r shown in FIG. 42 with a relatively small impact load, collapses in a region s shown in FIG. 42 with a medium-level impact load and, then, collapses in a region t shown in FIG. 42 with a large impact load. Thus, the energy absorber 40C provides generally steplike load characteristics "j" (three-step energy-absorbing characteristics) as illustrated in FIG. 45. As a whole, the amount of energy absorbed by the energy absorber 40C is increased compared to the foregoing embodiments that provide the load characteristics "b".

FIG. 45 shows a graphical representation of the load characteristics "j" of the energy absorber 40C, in which the horizontal axis represents the amount of deformation (or collapse) while the vertical axis represents the load (dynamic collapsing load).

The energy absorber 40C thus constructed is integrally joined to a specific part of the rear surface of the bumper face 3 by heat bonding, for instance.

The energy absorber 40C of FIGS. 42–45 provides substantially the same functional features and advantages as the foregoing embodiments.

Figure 46:
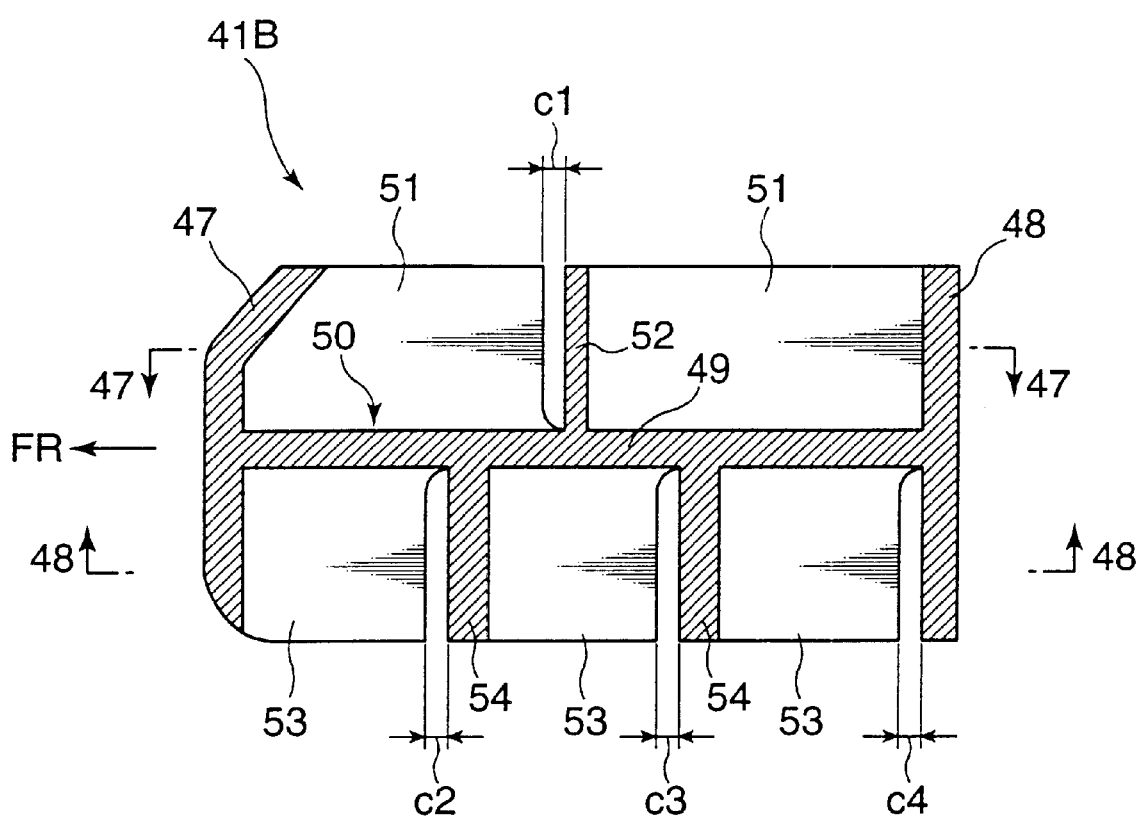
FIG. 46 is a sectional view showing another specific example of the construction of a lower leg supporting part in still another variation of the tenth embodiment.
Figure 47:
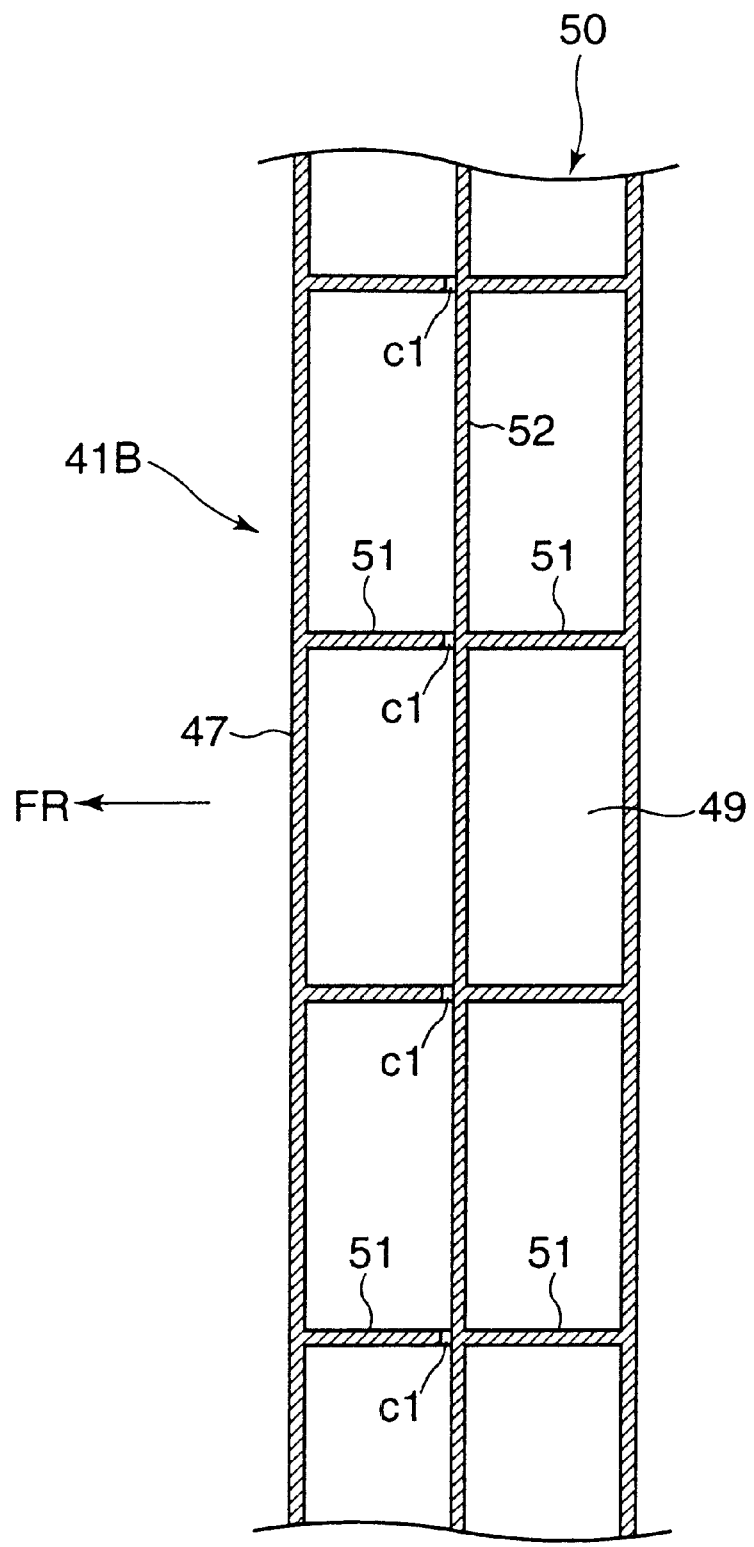
FIG. 47 is a sectional view taken along line 47—47 of FIG. 46.
Figure 48:
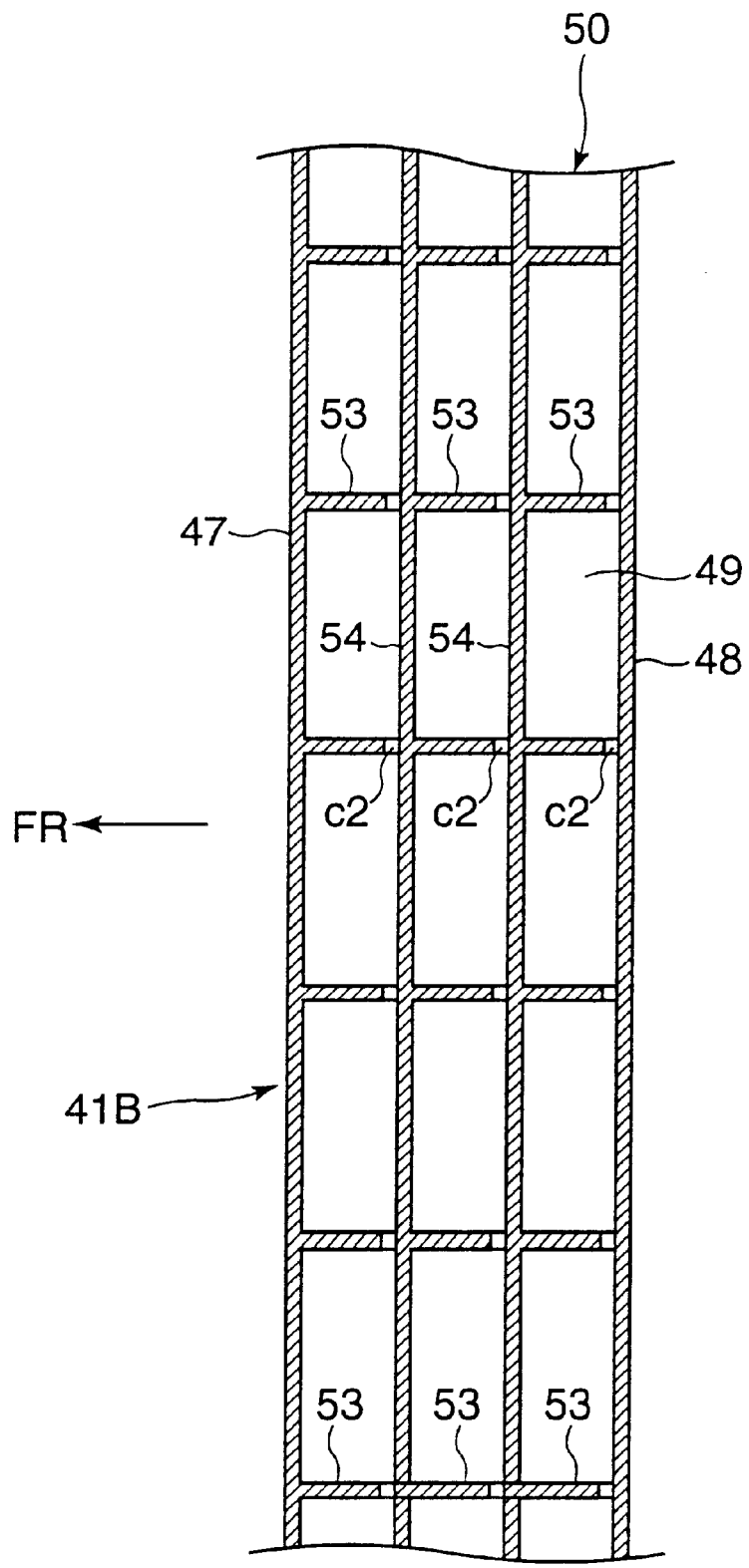
FIG. 48 is a sectional view taken along line 48—48 of FIG. 46.

FIGS. 46–48 show a lower leg supporting part 41B whose rear portion is supported by the front cross member 10 which is a structural member of the vehicle body in still another variation of the tenth embodiment, in which elements identical or equivalent to those depicted in FIGS. 35–37 are designated by the same reference numerals.

While the lower leg supporting part 41B of this variation of the tenth embodiment also has a plurality of ribs 51–54 like the lower leg supporting part 41A of FIGS. 35–37, the thickness of the upper rib 52 is made smaller and that of the lower rib 54 is made larger.

Since the lower leg supporting part 41B of this variation shown in FIGS. 46–48 is formed of the multiple ribs 51–54, and the thickness of the upper rib 52 is made smaller and that of the lower rib 54 is made larger, it allows deflection of the lower leg supporting part 41B and provides an increased approach angle when a load is exerted from the road surface.

It is to be pointed out that if the thicknesses of both the upper rib 52 and the lower ribs 54 are large, deflection of the lower leg supporting part 41B would be hindered. The lower leg supporting part 41B of FIGS. 46–48 otherwise provides substantially the same functional features and advantages as the foregoing embodiments.

Figure 49:
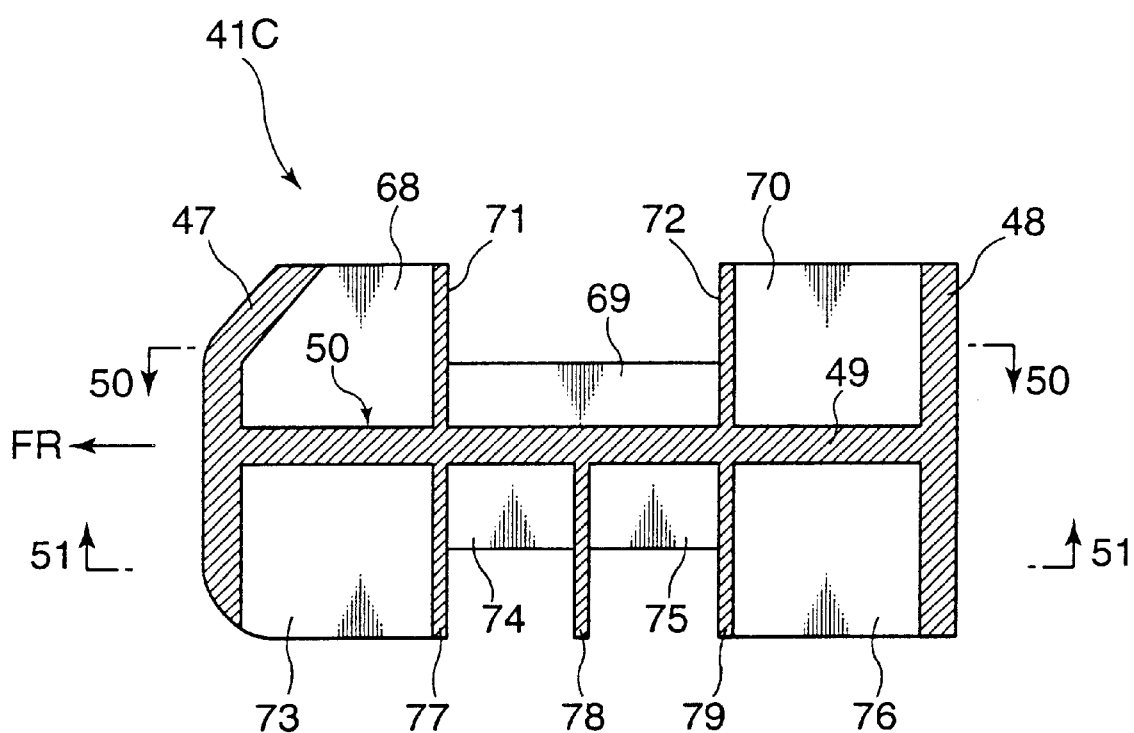
FIG. 49 is a sectional view showing another specific example of the construction of a lower leg supporting part in yet another variation of the tenth embodiment.
Figure 50:
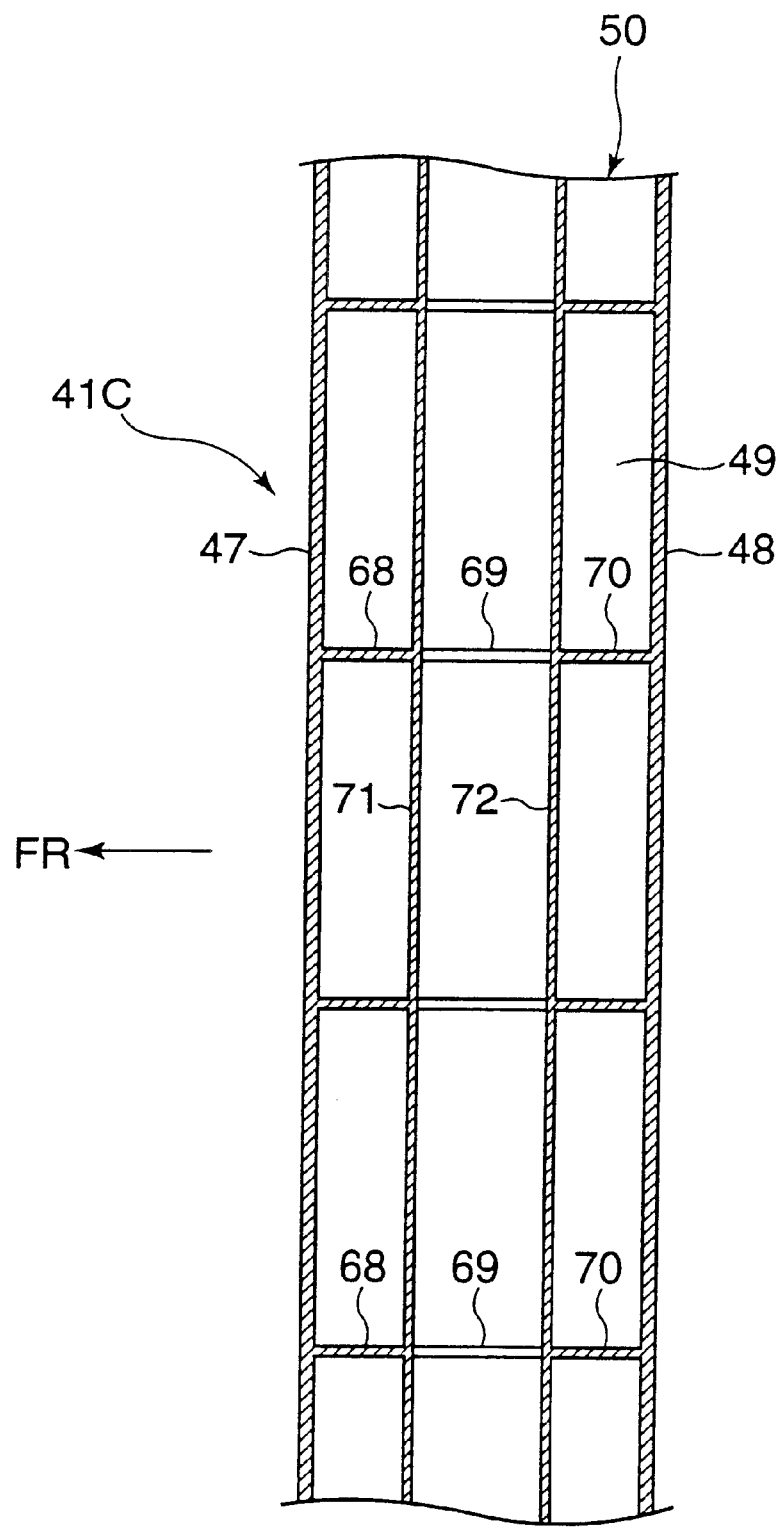
FIG. 50 is a sectional view taken along line 50—50 of FIG. 49.
Figure 51:
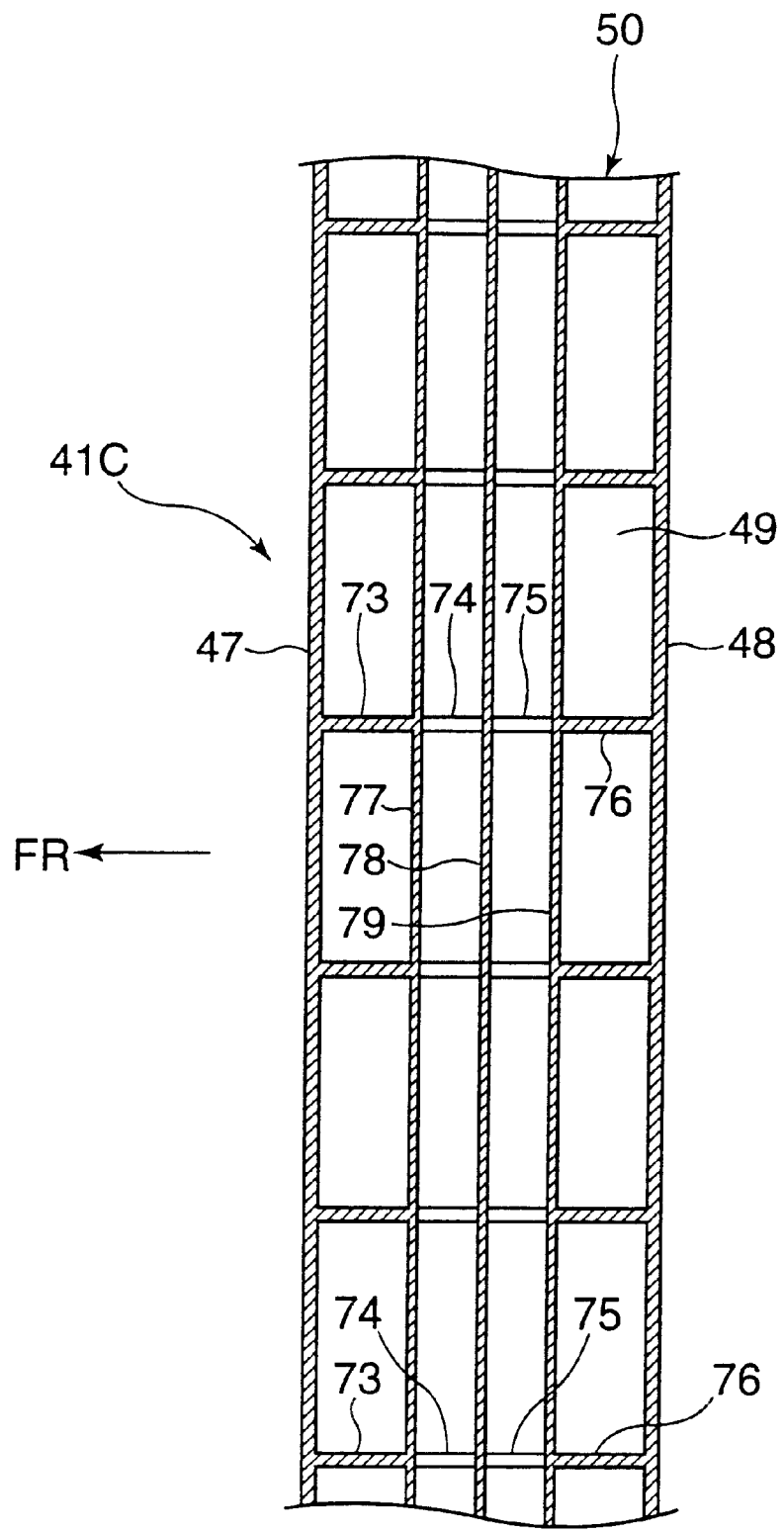
FIG. 51 is a sectional view taken along line 51—51 of FIG. 49.

FIGS. 49–51 show a lower leg supporting part 41C whose rear portion is supported by the front cross member 10 which is a structural member of the vehicle body in yet another variation of the tenth embodiment, in which elements identical or equivalent to those depicted in FIGS. 35–37 are designated by the same reference numerals.

The lower leg supporting part 41C of FIGS. 49–51 has a main structural part 50 formed of a front strip 47, a rear strip 48 and a horizontal main stiffening plate 49 which together form a generally H-shaped cross section like the lower leg supporting part 41A of FIGS. 35–37. A plurality of upper ribs 68–70 formed parallel to the vehicle's longitudinal direction and upper ribs 71, 72 formed parallel to the direction of the vehicle width extend upward from a top surface of the main stiffening plate 49 of the main structural part 50 while a plurality of lower ribs 73–76 formed parallel to the vehicle's longitudinal direction and lower ribs 77–79 formed parallel to the direction of the vehicle width extend downward from a bottom surface of the main stiffening plate 49 of the main structural part 50.

The spacings between the front strip 47, the upper ribs 71, 72 and the rear strip 48 in the vehicle's longitudinal direction and the spacings between the upper ribs 68–70 in the vehicle's lateral direction are made rather large on the top side of the main stiffening plate 49, whereas the spacings between the front strip 47, the lower ribs 77–79 and the rear strip 48 in the vehicle's longitudinal direction and the spacings between the lower ribs 73–76 in the vehicle's lateral direction are made smaller on the bottom side of the main stiffening plate 49.

In this lower leg supporting part 41C, the height of the upper ribs 68, 70 is determined such that they become generally flush with upper ends of the upper ribs 71, 72 and the height of the upper ribs 69 located in the middle of the longitudinal dimension of the lower leg supporting part 41C is made smaller (one-half in this variation of the tenth embodiment) than that of the upper ribs 68, 70.

Similarly, the amount of downward projection of the lower ribs 73, 76 is determined such that they become generally flush with lower ends of the lower ribs 77–79 and the amount of downward projection of the lower ribs 74, 75 located in the middle of the longitudinal dimension of the lower leg supporting part 41C is made smaller (one-half in this variation of the tenth embodiment) than that of the lower ribs 73, 76. In this construction, the aforementioned ribs 69, 74, 75 together constitutes a portion which allows deflection of the lower leg supporting part 41C.

It would be recognized from the above discussion that since the height of the upper ribs 69 and the amount of projection of the lower ribs 74, 75 which are located in the middle of the longitudinal dimension of the lower leg supporting part 41C are made smaller, the lower leg supporting part 41C produces substantially the same effects as the lower leg supporting parts 41A and 41B without the provision of the clearances C1, C2 shown in FIGS. 35–37, 46–48.

In other words, the lower leg supporting part 41C of FIGS. 49–51 is so constructed as to enable its own deflection and provide an increased approach angle when a load is exerted from the road surface by decreasing the height of the upper ribs 69 and the amount of projection of the lower ribs 74, 75.

The lower leg supporting part 41C thus constructed is integrally joined to a specific part of the rear surface of the bumper face 3 by heat bonding, for instance.

The lower leg supporting part 41C of FIGS. 49–51 provides substantially the same functional features and advantages as the foregoing embodiments.

Although the energy absorbers 40A, 40B, 40C and the lower leg supporting parts 41A, 41B, 41C of the foregoing embodiments each employ a rib structure in which two sets of parallel ribs intersect at right angles, these ribs may be arranged such that they intersect at other than right angles. In one alternative, a honeycomb structure may be employed instead of the rib structure. Another alternative approach would be to construct the rib structure in such a manner that at least part of the ribs are formed at an oblique angle to achieve a uniform distribution of loads.

Also, a desired combination of an energy absorber and a lower leg supporting part which are assembled integrally with the bumper face 3 may be selected from the energy absorbers 40A, 40B, 40C and the lower leg supporting parts 41A, 41B, 41C of the foregoing embodiments. For example, the energy absorber 40A may be combined with the lower leg supporting part 41C, or the energy absorber 40B may be combined with the lower leg supporting part 41A, as appropriate.

Alternatively, one of the lower leg supporting parts 41A, 41B, 41C may be combined with the earlier-mentioned energy absorber 8.

Furthermore, one each of the energy absorbers 40A, 40B, 40C and the lower leg supporting parts 41A, 41B, 41C may be integrally joined to the bumper face 3 by adhesive bonding or any of other appropriate methods instead of heat bonding.

In the appended claims, the expression "bumper" corresponds to the front bumper 9 referred to in the foregoing embodiments. Similarly, "lateral supporting member" corresponds to the bumper reinforcement 7, "support member"

corresponds to the supporting arm 27, "damping device" corresponds to the oil damper 33, "structural member of the vehicle body" corresponds to the front cross member 10, the rectangular frame 23 or stays, and "a gap between energy-absorbing ribs and bumper reinforcement" corresponds to the gap g. It is to be noted, however, that the present invention is not limited to the structures of the foregoing embodiments.

Furthermore, the energy absorbers 40A, 40B, 40C and the lower leg supporting parts 41A, 41B, 41C need not necessarily be made of polypropylene (PP) but may be made of other appropriate resin material.

Figure 52:
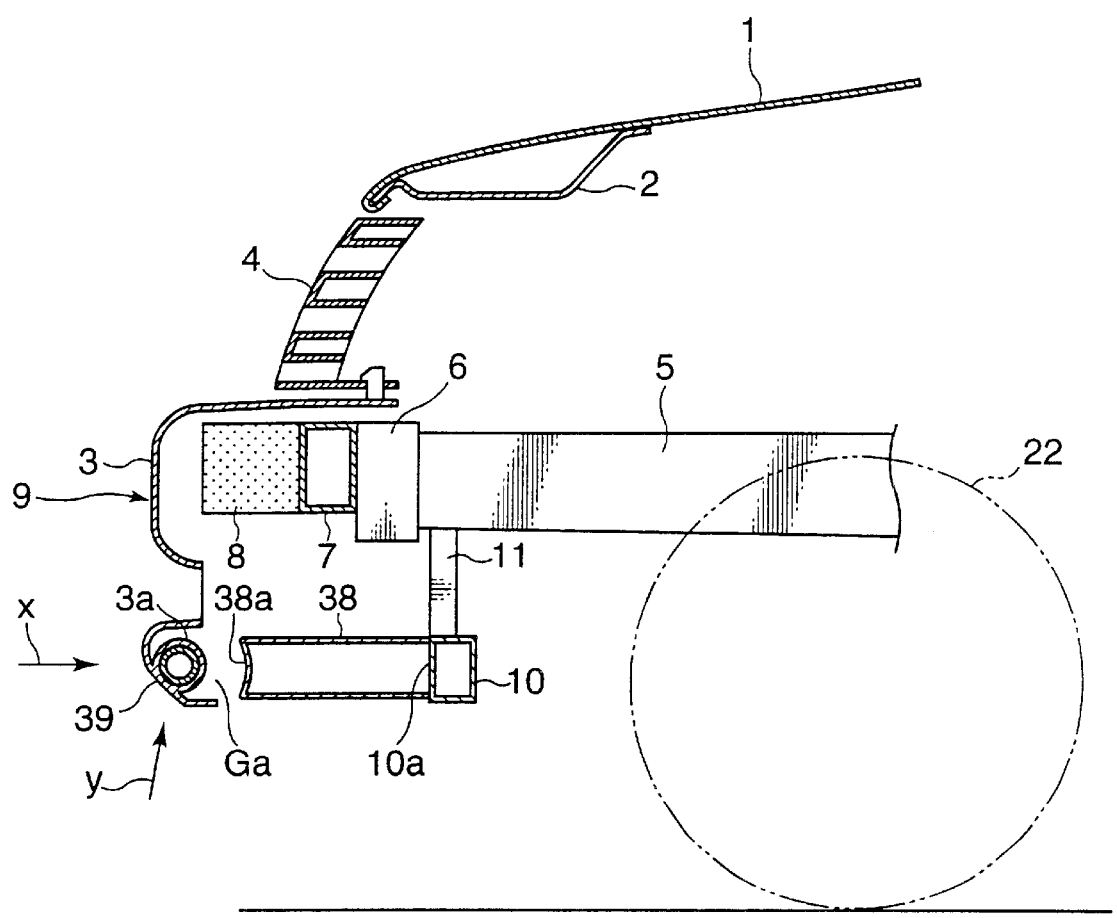
FIG. 52 is a side view showing the structure of a front part of a vehicle body according to an eleventh embodiment of the invention.
Figure 53:
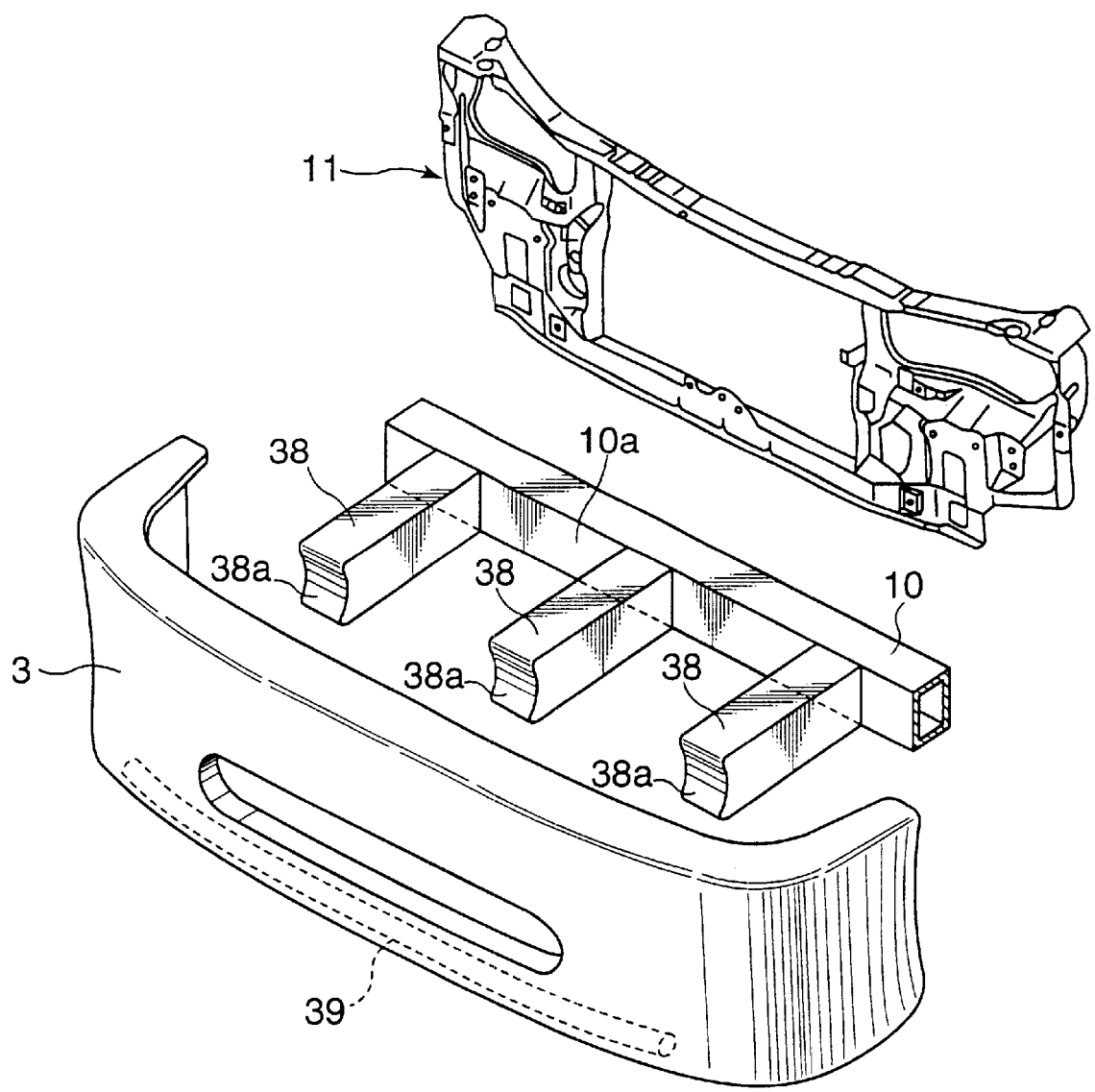
FIG. 53 is a perspective view showing a principal portion of the structure of FIG. 52.

FIGS. 52 and 53 show the structure of a front part of a vehicle body according to an eleventh embodiment of the invention. The structure of this embodiment includes a front cross member 10 extending widthwise which serves as a structural member of the vehicle body, and a bracket 11 such as a radiator support member is connected to the front cross member 10.

A plurality of hollow impact-receiving members 38 made of metal plates like iron plates are attached to the front of the front cross member 10. Although there are provided three impact-receiving members 38 in this embodiment as shown in FIG. 53, the central impact-receiving member 38 may be eliminated in a varied form of the embodiment.

The impact-receiving members 38 are designed such that their yield strength is lower than that of the bumper reinforcement 7 and a front surface 38a of each impact-receiving member 38 is recessed rearward in the middle of its height forming a recess.

There is further provided a backing bar 39 at a lower part of the rear surface of a bumper face 3. This backing bar 39 extends in the direction of the vehicle width and is integrally attached to the bumper face 3.

In this embodiment, a round metal pipe made of iron, for instance, is used as the backing bar 39. This round pipe is bent before installation to give it a curved shape (camber) that would properly fit on the bumper face 3 and is embedded in a lower cylindrical bulging portion 3a on the rear surface of the bumper face 3 which is made of resin.

The aforementioned impact-receiving members 38 are installed behind the backing bar 39 in such a manner that they are positioned face to face with each other with a specified gap Ga between the rearmost part of the backing bar 39 and front surfaces 38a of the impact-receiving members 38. The longitudinal positions of the bumper reinforcement 7 and the impact-receiving members 38 are determined such that the backing bar 39 would come in contact with the impact-receiving members 38 ahead of the front surface of the bumper reinforcement 7 in the event of a collision. This arrangement is used to prevent impact which could be caused if the bumper face 3 directly hits against the bumper reinforcement 7 when displaced rearward.

Figure 54:
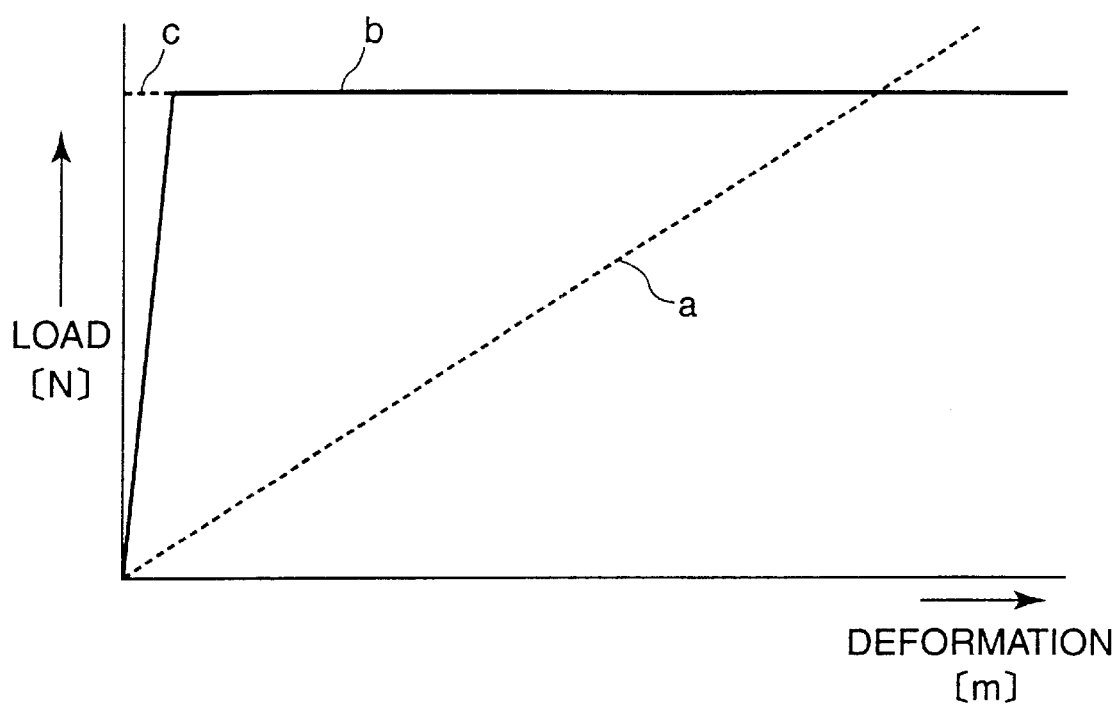
FIG. 54 is a graphical representation of the load characteristics of impact-receiving members and an energy absorber of FIG. 53.

FIG. 54 is a graphical representation of the load characteristics "a" of the energy absorber 8 and the load characteristics "b" of the impact-receiving members 38.

The load characteristics "a" of the energy absorber 8 are determined such that input load and the amount of deformation are proportional to each other. On the other hand, the load characteristics "b" of the impact-receiving members 38 are determined such that the input load (expressed in newtons) first increases rapidly from the zero point to a specific load level c in proportion to the amount of deformation and, then, after the impact-receiving members 38 have begun to plastically deform when the input load has reached the load level c, the amount of deformation increases under approximately a constant load. The modulus of elasticity of the impact-receiving members 38 is set to a value larger than that of the energy absorber 8.

The impact-receiving members 38 exhibit the load characteristics "b" depicted in FIG. 54 after the aforementioned gap Ga has been zeroed when the backing bar 39 mounted on the bumper face 3 has been displaced rearward and gone into contact with the front surfaces 38a of the impact-receiving members 38 in the event of a collision between the vehicle and a pedestrian. It is preferable that the load level c of the load characteristics "b" of the impact-receiving members 38 be set to a value not exceeding 7000 N (newtons) to prevent damage to the legs of the pedestrian.

In the structure of this embodiment, the load is exerted on the resin bumper face 3 in the direction of an arrow x shown in FIG. 52 in the event of a collision between the vehicle and a pedestrian and, as a consequence, the backing bar 39 is displaced rearward together with the bumper face 3 while absorbing impact energy and comes into contact with the front surfaces 38a of the impact-receiving members 38.

Since a load exerted on the impact-receiving members 38 is usually smaller than the load level c shown in FIG. 54, the input load on the bumper face 3 (represented by the arrow x) is received by the impact-receiving members 38 whose rear ends are supported by the front cross member 10.

Thus, in the event of a collision between the vehicle and a pedestrian, the pedestrian is swept by parts of his or her legs lower than the knees by the backing bar 39 and thrown over toward the vehicle. After the impact energy exerted on the pedestrian when his or her legs come in contact with a portion of the bumper face 3 where the energy absorber 8 is located has been absorbed, the pedestrian is caused to drop onto the top of the hood 1.

On the other hand, when a lower part of the bumper face 3 fitted with the backing bar 39 hits against an obstacle on the road surface, an impact load is exerted from underneath as shown by an arrow y in FIG. 52. Should this occur, the backing bar 39 embedded in the resin bumper face 3 is displaced upward together with the lower part of the bumper face 3 and, when the upward impact load has been released, the backing bar 39 returns to its original position.

Since the pedestrian is swept by parts of his or her legs lower than the knees by the backing bar 39 and caused to drop onto the top of the hood 1 upon collision as described above, it is possible to protect the pedestrian from secondary damage.

The structure of this embodiment also provides such an advantageous effect that it is possible to protect the legs of the pedestrian by properly determining the load characteristics "b" of the impact-receiving members 38. Furthermore, since the backing bar 39 is integrally fitted to the bumper face 3, the embodiment provides extra ease of assembly. Also, the structure of this embodiment is simple and the occurrence of malfunction is prevented as it is not necessary to provide sensors and an air bag unlike the earlier-mentioned conventional structure.

Furthermore, since the backing bar 39 is embedded in the resin bumper face 3 in the structure of this embodiment, it is possible to reliably retain the backing bar 39 which is a functional component in the lower part of the bumper face 3 and enhance productivity and ease of assembly.

Figure 55:
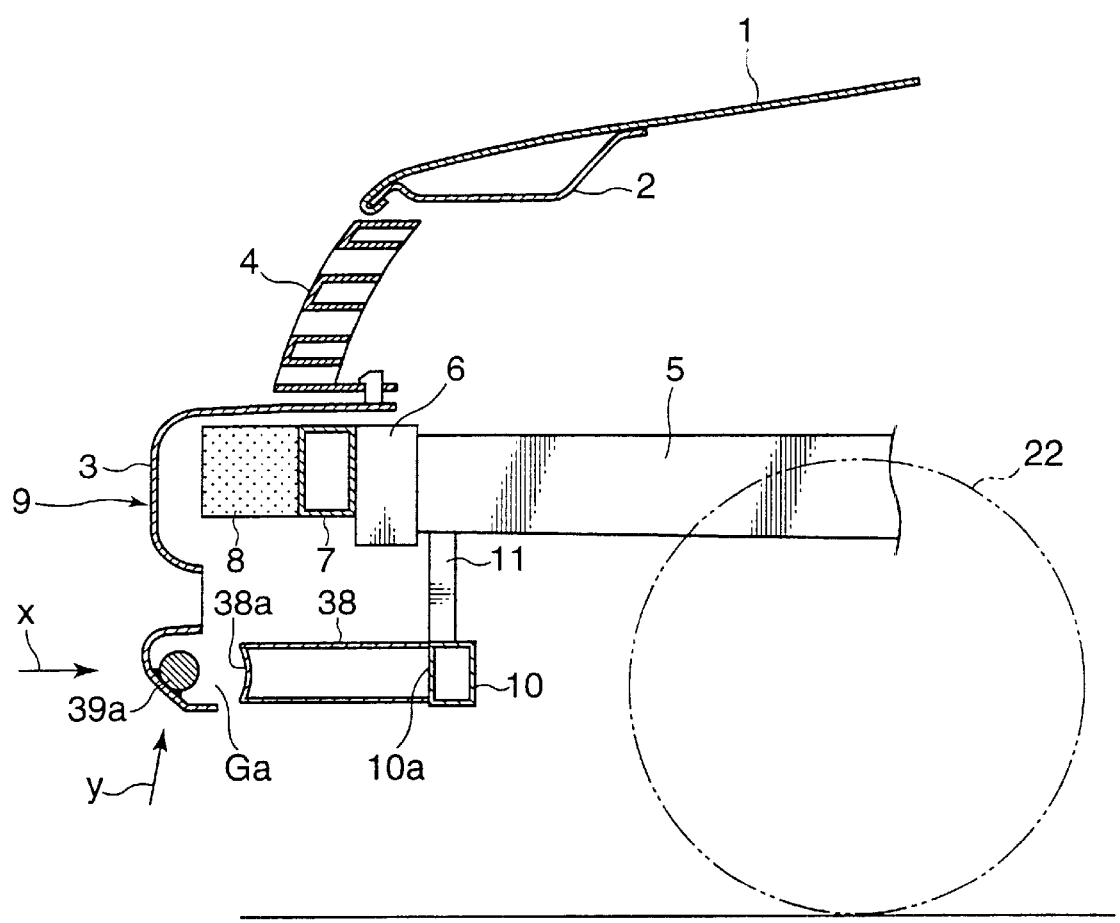
FIG. 55 is a side view showing the structure of a front part of a vehicle body according to a twelfth embodiment of the invention.

Although the backing bar 39 made of a round iron pipe is embedded in the lower part of the bumper face 3 in the structure of the eleventh embodiment, a backing bar 39a made of a round resin pipe may be integrally bonded to a lower part of the rear surface of a bumper face 3 by adhesive bonding or heat bonding as shown in FIG. 55. In this twelfth embodiment, the bumper face 3 and the backing bar 39a may be made of such thermoplastic materials as synthetic resin as polypropylene (PP), acrylonitrile butadiene styrene (ABS) resin or polyethylene (PE).

The structure of this twelfth embodiment in which the backing bar 39a is fixed to the lower part of the bumper face 3 made of resin facilitates molding process compared to the eleventh embodiment in which the backing bar 39 made of metal is embedded in the bumper face 3. In addition, this embodiment provides such an advantageous effect that the strength of the backing bar 39a can be easily adjusted by changing its diameter, for example.

Figure 56:
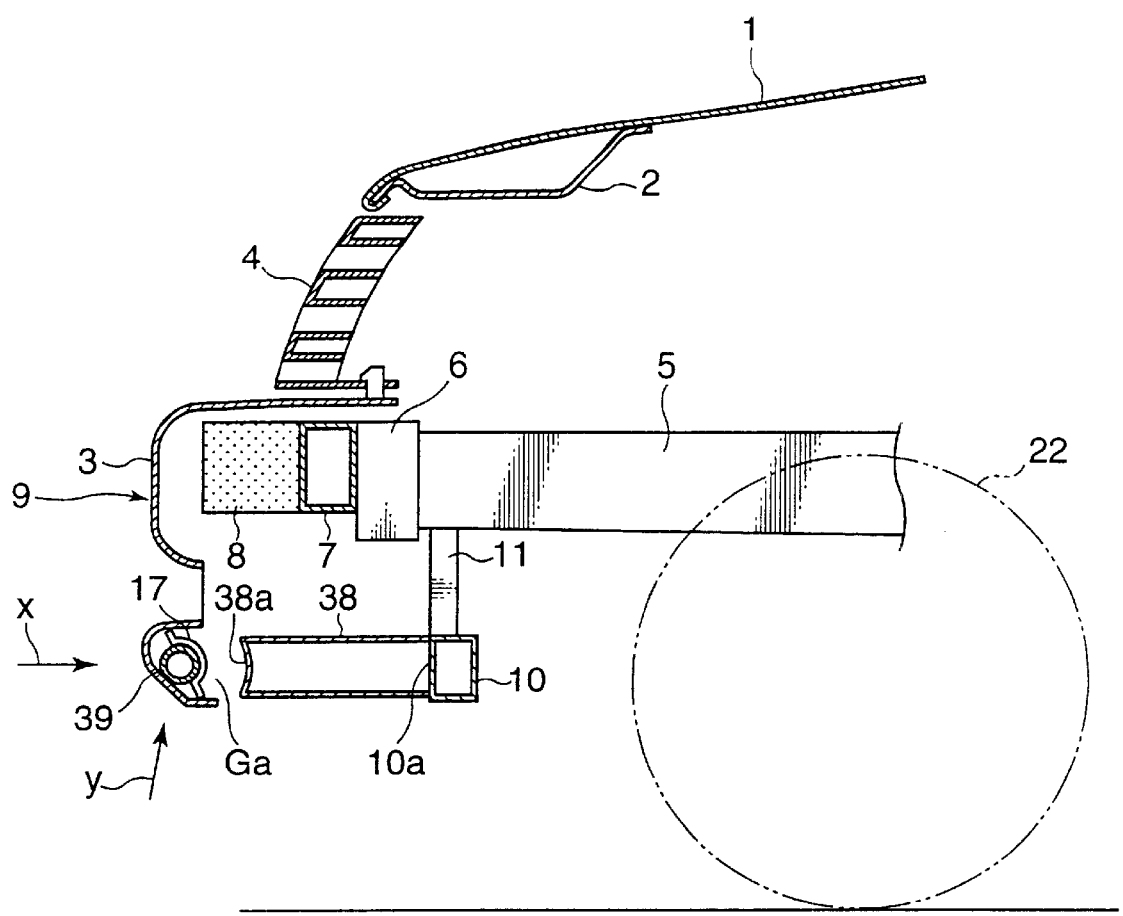
FIG. 56 is a side view showing the structure of a front part of a vehicle body according to a thirteenth embodiment of the invention.
Figure 57:
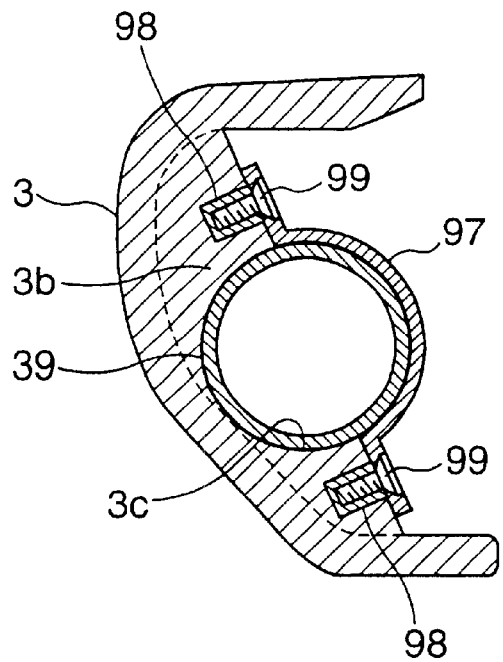
FIG. 57 is a sectional view showing a principal portion of the structure of FIG. 56.

FIGS. 56 and 57 show the structure of a front part of a vehicle body according to a thirteenth embodiment of the invention, in which a backing bar 39 made of a round metal pipe is integrally fixed to a lower part of the rear surface of a bumper face 3 by a plurality of clamps 97.

Specifically, there are formed a plurality of ribs 3b on the lower part of the rear surface of the bumper face 3 at specific intervals in the direction of the vehicle width. A mounting groove 3c having a semicircular cross section which properly fits on the curved outer surface of the backing bar 39 is formed in each rib 3b and fixing nuts 98 are embedded therein. With the backing bar 39 made of the round metal pipe placed in the mounting grooves 3c in the ribs 3b, the backing bar 39 is fixed by securing the clamps 97 with fastening parts 99 such as bolts.

Figure 58:
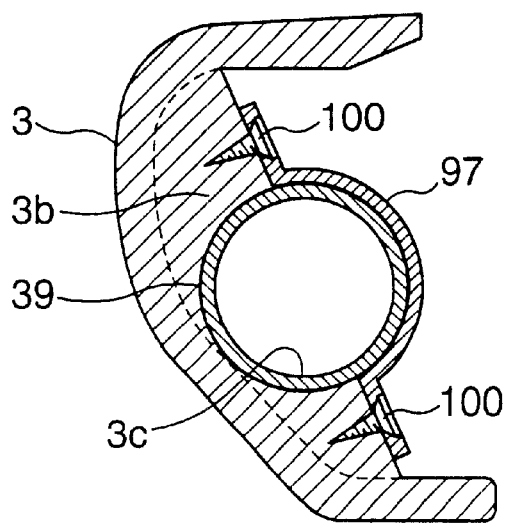
FIG. 58 is a sectional view showing an alternative structure in one variation of the thirteenth embodiment.

In one varied form of the thirteenth embodiment, the clamps 97 may be fixed to the bumper face 3 by using tapping screws 100 as shown in FIG. 58.

In the appended claims, the expression "backing bar" corresponds to the backing bar 39, 39a made of a round metal pipe or round resin bar referred to in the foregoing embodiments. Similarly, "structural member of the vehicle body" corresponds to the front cross member 10, and "impact-receiving member" corresponds to the hollow impact-receiving member 38 made of iron plates. It is to be noted, however, that the present invention is not limited to the structures of the foregoing embodiments.

For example, the front cross member 10 serving as a structural member (reinforcing member) of the vehicle body may be replaced by a specific part of a rectangular frame.

Furthermore, although the impact-receiving members 38 of the structure of FIG. 52 are made of metal plates, they may be replaced such members as mechanical damping devices or structural resin members.

Also, the bumper face 3 and the resin backing bar 39a may be one-piece molded using an injection blow molding machine.

Furthermore, although the backing bar 39 is made of a round metal pipe in the structure of FIG. 52, it may be replaced by a pipe having a varying diameter or by a combination of pipes having a stepped cross section. Another alternative construction is to integrally attach the backing bar 39 made of a round metal pipe to a lower part of the rear surface of the bumper face 3 by adhesive bonding.

In a first aspect of the invention, a structure of a front part of a vehicle body in which a bumper is provided at a lower front position of a hood at the front of the vehicle comprises a lateral supporting member provided in the front part of the vehicle body and extending in the direction of vehicle width, an energy-absorbing member provided ahead of the lateral supporting member, and a projecting part provided at a lower part of the bumper in such a manner that a forward end of the projecting part juts out more frontward than the lateral supporting member.

Since the energy-absorbing member is provided ahead of the lateral supporting member and the projecting part is provided at the lower part of the bumper with the forward end of the projecting part jutting out more frontward than the lateral supporting member in the aforementioned structure, the projecting part first sweeps the pedestrian by parts of his or her legs lower than the knees in the event of a collision between the vehicle and the pedestrian, and after the energy-absorbing member has absorbed the impact energy exerted on the legs of the pedestrian who is thrown over toward the vehicle, the pedestrian is caused to drop onto the top of the hood. Consequently, there is produced such an advantageous effect that the pedestrian can be protected from secondary damage.

Another advantageous effect is that it is possible to provide increased safety of the legs of the pedestrian by properly selecting the strength of the projecting part, simplify the structure of the front of the vehicle and prevent the occurrence of malfunction.

In one form of the invention, the lateral supporting member is formed of a bumper reinforcement. Since the laterally extending bumper reinforcement is used as the lateral supporting member in this structure, it is made possible to effectively use the already existing member.

In another form of the invention, the forward end of the projecting part is located at a more frontward or rearward position than a forward end of the energy-absorbing member. This structure is advantageous in that it enables the projecting part to sweep the pedestrian by parts of his or her legs lower than the knees in a reliable fashion in the event of a collision between the vehicle and the pedestrian.

In another form of the invention, the energy-absorbing member is located ahead of a line connecting a forward end of the hood and the forward end of the projecting part. This structure is advantageous in that the energy-absorbing member absorbs impact energy exerted on the legs of the pedestrian who is thrown over toward the vehicle even more effectively, making it possible to protect the legs of the pedestrian from the impact energy.

In another form of the invention, the rigidity of the projecting part is set to a value larger than that of the energy-absorbing member. This approach is advantageous in that it enables the projecting part to sweep the pedestrian by his or her lower legs in a reliable fashion.

In another form of the invention, the projecting part is formed of a resin member. This structure is advantageous in that it provides improved moldability of the projecting part, ease of its assembly to the vehicle body, and gives the projecting part more flexibility to match the vehicle design.

In another form of the invention, the projecting part includes a backing bar extending along a lower part of a bumper face and a support member which holds the backing bar at the front of the vehicle body. This is advantageous in that the pedestrian can be effectively swept by his or her lower legs with a simple construction.

In another form of the invention, the energy-absorbing member is an energy-absorbing metal member, a structural resin member or a mechanical damping device. This structure is advantageous in that the energy-absorbing member can positively absorb the impact energy before the pedestrian comes into contact with the hood, reduce the speed of the pedestrian as he or she is thrown over, and allow the pedestrian to drop onto the top of the hood in a more reliable fashion.

In another form of the invention, the projecting part is attached to a structural member of the vehicle body provided in its front part. This structure is advantageous in that the projecting part can effectively receive a frontal impact load in the event of a collision and sweep the pedestrian by his or her legs in a reliable fashion give the projecting part sufficient strength to bear the impact load.

In another form of the invention, the lateral supporting member is attached to forward ends of left and right front side frame members, the projecting part is installed ahead of and below the front side frame members, and the strength of the projecting part in the vehicle's longitudinal direction increases from its left and right ends to its middle part. This structure is advantageous in that it prevents the middle of the projecting part from becoming liable to flex an the distribution of longitudinal load received by the projecting part in the event of a collision can be made approximately uniform.

In another form of the invention, the lateral supporting member is attached to forward ends of left and right front side frame members, the projecting part is installed ahead of and below the front side frame members, and the projecting part has a U-shaped or channel-like cross section whose open side is directed rearward. As the projecting part having either the U-shaped or the channel-like cross section can easily be deformable upon receipt of the impact energy at the time of collision, compared to the projecting part having a completely filled in cross section. Thus this structure is advantageous in that it can effectively absorb the impact energy in the event of a collision.

In another form of the invention, the projecting part has a corrugated surface having alternating furrows and ridges formed parallel to the vehicle's longitudinal direction. This structure is advantageous in that the alternating furrows and ridges prevents a rapid decline in yield strength of the projecting part due to its deformation in the vehicle's longitudinal direction when an impact load is exerted on the projecting part in the event of a collision between the vehicle and a pedestrian and, as a consequence, the projecting part can absorb the impact energy at a constant input load as it deforms rearward.

In another form of the invention, the lateral supporting member is formed of an already existing bumper reinforcement. This structure is advantageous in that it can provide an enhanced load-carrying strength of the projecting part by effectively using the existing member.

In a second aspect of the invention, a structure of a front part of a vehicle body in which a bumper is provided at a lower front position of a hood at the front of the vehicle comprises a lateral supporting member provided behind a bumper face of the bumper and extending in the direction of vehicle width, and a lower leg supporting part provided at a lower part of the bumper and extending in the direction of the vehicle width with a rear portion of the lower leg supporting part supported by a structural member of the vehicle body, wherein a forward end of the lower leg supporting part juts out relatively frontward compared to the lateral supporting member when the bumper face is displaced rearward. This structure provides the following advantageous effects.

Specifically, since the bumper face is first displaced rearward in the event of a collision between the vehicle and a pedestrian, the forward end of the lower leg supporting part juts out relatively frontward compared to the lateral supporting member and the lower leg supporting part whose rear portion is supported by the structural member of the vehicle body receives a frontal impact load. Thus, the pedestrian is swept by parts of his or her legs lower than the knees by the lower leg supporting part upon collision so that the pedestrian thrown over toward the vehicle is caused to drop onto the top of the hood in a reliable fashion. There is produced such an advantageous effect that the pedestrian can be protected from secondary damage.

The above structure is also advantageous in that it is possible to provide increased safety of the legs of the pedestrian by properly selecting the strength-(or load characteristics) of the lower leg supporting part, simplify the structure of the front of the vehicle and prevent the occurrence of malfunction. Furthermore, there are no limitations in the design of the bumper so that its assembly can be simplified.

In another form of the invention, the lateral supporting member is formed of a bumper reinforcement. This is advantageous in that it is possible to effectively use the already existing member.

In another form of the invention, the structure of the front part of the vehicle body, the structure further comprises an energy-absorbing member provided ahead of the lateral supporting member, wherein the rigidity of the lower leg supporting part is set to a value larger than that of the energy-absorbing member. This structure is advantageous in that it is made possible to sweep the pedestrian by his or her lower legs in a reliable fashion and the energy-absorbing member can effectively absorb impact energy exerted on the lower legs of the pedestrian who is thrown over toward the vehicle.

In another form of the invention, the lower leg supporting part has upper ribs and lower ribs, wherein the thickness of the upper ribs is set to a value smaller than that of the lower ribs. This structure is advantageous in that it allows deflection of the lower leg supporting part and provides an increased approach angle when a load is exerted from the road surface. It is to be noted that if the thicknesses of both the upper ribs and the lower ribs are large, deflection of the lower leg supporting part would be hindered.

In still another form of the invention, the lower leg supporting part has upper ribs and lower ribs, wherein the spacing of the upper ribs is made larger than that of the lower ribs. This structure is advantageous in that it allows deflection of the lower leg supporting part and provides an increased approach angle when a load is exerted from the road surface. It is to be noted that if the spacings between both the upper ribs and the lower ribs are small, deflection of the lower leg supporting part would be hindered.

In a third aspect of the invention, a structure of a front part of a vehicle body in which a bumper is provided at a lower front position of a hood at the front of the vehicle comprises a bumper reinforcement provided behind a bumper face of the bumper and extending in the direction of vehicle width, a backing bar extending in the direction of the vehicle width at a lower part of the bumper face and integrally attached to the bumper face, and an impact-receiving member provided behind the backing bar and projecting frontward from a structural member of the vehicle body, the impact-receiving member having a smaller yield strength than the bumper reinforcement, wherein a specified gap is provided between a rear surface of the backing bar and a forward end of the impact-receiving member, and wherein the backing bar comes into contact with the impact-receiving member ahead of a front surface of the bumper reinforcement when the bumper face is displaced rearward.

In the event of a collision between the vehicle and a pedestrian, the backing bar integrally attached to the lower part of the bumper face is displaced rearward as much as the aforementioned gap and comes into contact with the impact-receiving member ahead of the bumper reinforcement, whereby an impact load is received by the impact-receiving member. This structure is advantageous in that the pedestrian is swept by parts of his or her legs lower than the knees by the backing bar and caused to drop onto the top of the hood upon collision between the vehicle and the pedestrian, thereby protecting the pedestrian from secondary damage. Furthermore, since the backing bar is integrally fitted to the bumper face, this structure provides extra ease of assembly. Also, the structure is simple and the occurrence of malfunction is prevented as it is not necessary to provide sensors and an air bag unlike the conventional structure.

In yet another form of the invention, the backing bar is embedded in the bumper face made of resin. This structure is advantageous in that the backing bar working as a functional component can be reliably retained in the lower part of the bumper face and the structure helps to enhance productivity and ease of assembly.

This application is based on Japanese applications serial Nos. 11-181556; 11-181557; 11-223877; and 11-274278, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A structure of a front part of a vehicle body in which a bumper is provided at a lower front position of a hood at the front of the vehicle, said structure comprising:
   a lateral supporting member provided in the front part of the vehicle body and extending in the direction of vehicle width;
   an energy-absorbing member provided ahead of the lateral supporting member; and
   a projecting part provided at a lower part of the bumper and beneath the lateral supporting member in spaced relationship, the projecting part arranged such that a forward end of the projecting part protrudes more frontward than the lateral supporting member,
   wherein the rigidity of the projecting part is set to a value larger than that of the energy-absorbing member.

2. The structure of the front part of the vehicle body according to claim 1, wherein the lateral supporting member is formed of a bumper reinforcement.

3. The structure of the front part of the vehicle body according to claim 1, wherein the forward end of the projecting part is located at a more frontward position than a forward end of the energy-absorbing member.

4. The structure of the front part of the vehicle body according to claim 1, wherein the energy-absorbing member is located ahead of a line connecting a forward end of the hood and the forward end of the projecting part.

5. A The structure of the front part of the vehicle body according to claim 1, wherein the projecting part is formed of a resin member.

6. The structure of the front part of the vehicle body according to claim 1, wherein the projecting part includes a backing bar extending along a lower part of a bumper face and a support member which holds the backing bar at the front of the vehicle body.

7. The structure of the front part of the vehicle body according to claim 1, wherein the energy-absorbing member is a structural resin member or a mechanical damping device.

8. The structure of the front part of the vehicle body according to claim 1, wherein the projecting part is attached to a structural member of the vehicle body provided in its front part.

9. The structure of the front part of the vehicle body according to claim 1, wherein the lateral supporting member is attached to forward ends of left and right front side frame members, the projecting part is installed ahead of and below the front side frame members, and the strength of the projecting part in the vehicle's longitudinal direction increases from its left and right ends to its middle part.

10. The structure of the front part of the vehicle body according to claim 1, wherein the lateral supporting member is attached to forward ends of left and right front side frame members, the projecting part is installed ahead of and below the front side frame members, and the projecting part has a U-shaped or channel-like cross section whose open side is directed rearward.

11. The structure of the front part of the vehicle body according to claim 10, wherein the projecting part has a corrugated surface having alternating furrows and ridges formed parallel to the vehicle's longitudinal direction.

12. The structure of the front part of the vehicle body according to claim 10 wherein the lateral supporting member is formed of a bumper reinforcement.

13. A structure of a front part of a vehicle body in which a bumper is provided at a lower front position of a hood at the front of the vehicle, said structure comprising:
   a lateral supporting member provided behind a bumper face of the bumper and extending in the direction of vehicle width;
   an energy-absorbing member provided ahead of the lateral supporting member; and
   a lower leg supporting part provided at a lower part of the bumper and extending in the direction of the vehicle width with a rear portion of the lower leg supporting part supported by a structural member of the vehicle body;
   wherein a forward end of the lower leg supporting part protrudes relatively frontward compared to the lateral supporting member when the bumper face is displaced rearward, and the rigidity of the lower leg supporting part is set to a value larger than that of the energy-absorbing member.

14. The structure of the front part of the vehicle body according to claim 13, wherein the lateral supporting member is formed of a bumper reinforcement.

15. The structure of the front part of the vehicle body according to claim 13, wherein the lower leg supporting part has upper ribs and lower ribs, and wherein the thickness of the upper ribs is set to a value smaller than that of the lower ribs.

16. The structure of the front part of the vehicle body according to claim 13, wherein the lower leg supporting part has upper ribs and lower ribs, and wherein the spacing of the upper ribs is made larger than that of the lower ribs.

* * * * *